(12) United States Patent
Singer et al.

(10) Patent No.: US 12,516,387 B2
(45) Date of Patent: *Jan. 6, 2026

(54) METHODS AND DEVICES FOR IDENTIFYING MICROBIAL INFECTIONS

(71) Applicant: HelixBind, Inc., Boxborough, MA (US)

(72) Inventors: Alon Singer, Concord, MA (US); Ranjit Prakash, Northborough, MA (US); Jork Nolling, Hopedale, MA (US)

(73) Assignee: HelixBind, Inc., Boxborough, MA (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/488,632

(22) Filed: Oct. 17, 2023

(65) Prior Publication Data

US 2024/0068050 A1 Feb. 29, 2024

Related U.S. Application Data

(63) Continuation of application No. 16/499,515, filed as application No. PCT/US2018/025681 on Apr. 2, 2018, now Pat. No. 11,840,721.

(60) Provisional application No. 62/480,953, filed on Apr. 3, 2017.

(51) Int. Cl.
  *C12Q 1/68* (2018.01)
  *C12Q 1/689* (2018.01)
  *C12Q 1/6895* (2018.01)

(52) U.S. Cl.
  CPC .......... *C12Q 1/689* (2013.01); *C12Q 1/6895* (2013.01)

(58) Field of Classification Search
  None
  See application file for complete search history.

(56) References Cited

U.S. PATENT DOCUMENTS

| | | | |
|---|---|---|---|
| 1,109,184 A * | 9/1914 | Schulz | D04B 17/00 83/423 |
| 7,960,360 B2 | 6/2011 | Grandis et al. | |
| 9,132,426 B2 | 9/2015 | Prakash | |
| 9,663,830 B2 | 5/2017 | Singer | |
| 11,091,814 B2 | 8/2021 | Singer | |
| 11,414,712 B2 * | 8/2022 | Singer | C12Q 1/689 |
| 11,840,721 B2 | 12/2023 | Singer et al. | |
| 2003/0082535 A1 | 5/2003 | Leushner et al. | |
| 2004/0010129 A1 | 1/2004 | Hsu et al. | |
| 2005/0079490 A1 | 4/2005 | Stuber et al. | |
| 2006/0046246 A1 | 3/2006 | Zeng et al. | |
| 2006/0160121 A1 | 7/2006 | Mounts et al. | |
| 2007/0031850 A1 | 2/2007 | Mounts et al. | |
| 2007/0042422 A1 | 2/2007 | Stuber et al. | |
| 2009/0208933 A1 | 8/2009 | Pachot et al. | |
| 2009/0286249 A1 | 11/2009 | Becker et al. | |
| 2010/0021910 A1 | 1/2010 | Cao et al. | |
| 2011/0177960 A1 | 7/2011 | Murphy et al. | |
| 2012/0276530 A1 | 11/2012 | Meller et al. | |
| 2012/0329050 A1 | 12/2012 | Nadeau et al. | |
| 2013/0203610 A1 | 8/2013 | Meller et al. | |
| 2013/0256118 A1 | 10/2013 | Meller et al. | |
| 2013/0267429 A1 | 10/2013 | Gardner et al. | |
| 2015/0099657 A1 * | 4/2015 | Singer | C12Q 1/689 506/18 |
| 2015/0284764 A1 | 10/2015 | Tets et al. | |
| 2017/0218434 A1 * | 8/2017 | Singer | C12Q 1/6816 |
| 2017/0259257 A1 | 9/2017 | Singer et al. | |
| 2017/0292146 A1 * | 10/2017 | Singer | B01L 3/502753 |
| 2020/0331938 A1 | 10/2020 | Singer et al. | |
| 2022/0002786 A1 | 1/2022 | Singer | |
| 2023/0183820 A1 * | 6/2023 | Singer | B01L 3/502753 435/6.11 |

FOREIGN PATENT DOCUMENTS

| | | | | |
|---|---|---|---|---|
| CN | 105063759 A | 11/2015 | | |
| WO | WO 2004/033720 A2 | 4/2004 | | |
| WO | WO 2004/061085 A2 | 7/2004 | | |
| WO | WO 2007/056463 A2 | 5/2007 | | |
| WO | WO 2007/106407 A2 | 9/2007 | | |
| WO | WO 2011/087789 A2 | 7/2011 | | |
| WO | WO 2012/138955 A2 | 10/2012 | | |
| WO | WO 2013/074601 A1 | 5/2013 | | |
| WO | WO-2013176992 A2 * | 11/2013 | ........... C12Q 1/6816 | |
| WO | WO-2016044621 A1 * | 3/2016 | ........ B01L 3/502715 | |
| WO | WO 2016/176992 A1 | 11/2016 | | |
| WO | WO-2018187206 A1 * | 10/2018 | ............... C12Q 1/04 | |

OTHER PUBLICATIONS

Nolling, J., Rapireddy, S., Amburg, J.I., Crawford, E.M., Prakash, R.A., Rabson, A.R., Tang, Y.W. and Singer, A., 2016. Duplex DNA-invading γ-modified peptide nucleic acids enable rapid identification of bloodstream infections in whole blood. MBio, 7(2), pp. e00345-16. (Year: 2016).*

International Search Report and Written Opinion for PCT/US2018/025681 mailed Jul. 19, 2018.

International Preliminary Report on Patentability for PCT/US2018/025681 mailed Oct. 17, 2019.

Ahmad et al., A high-throughput and rapid method for accurate identification of emerging multidrug-resistant Candida auris. Mycoses. Jun. 2019;62(6):513-518. doi: 10.1111/myc.12907. Epub Apr. 4, 2019.

Al-Griw et al., Comparative Assessment of SepsiTest™ Platform to BactScreen™ and "in-house" MGB-based All Bacteria Assay for Detection of Bacteraemia in Whole Blood Samples. Libyan J Vet Med Sci. Dec. 2016;2(2):1-8.

(Continued)

*Primary Examiner* — Gary Benzion
*Assistant Examiner* — Olayinka A Oyeyemi
(74) *Attorney, Agent, or Firm* — Wolf, Greenfield & Sacks, P.C.

(57) ABSTRACT

The present disclosure generally relates to the field of microbial pathogen detection and identification utilizing genomic sequence recognition.

20 Claims, 10 Drawing Sheets

Specification includes a Sequence Listing.

(56) References Cited

OTHER PUBLICATIONS

Al-Griw, Molecular Detection of Bloodstream Pathogens in Critical Illness. PhD Dissertation. The University of Manchester, School of Medicine. 2011:351 pages.
Ben-Ami et al., Multidrug-Resistant Candida haemulonii and C. auris, Tel Aviv, Israel. Emerg Infect Dis. Feb. 2017;23(1):195-203. doi: 10.3201/eid2302.161486.
Feehery et al., A method for selectively enriching microbial DNA from contaminating vertebrate host Dna. PLos One. Oct. 28, 2013;8(10):e76096. doi: 10.1371/journal.pone.0076096.
Gaitan et al., Nosocomial fungemia by Candida auris: First four reported cases in continental Europe. Rev Iberoam Micol. Jan.-Mar. 2017;34(1):23-27. doi: 10.1016/j.riam.2016.11.002. Epub Jan. 25, 2017.
Gebert et al., Rapid detection of pathogens in blood culture bottles by real-time PCR in conjunction with the pre-analytic tool MolYsis. J Infect. Oct. 2008;57(4):307-16. doi: 10.1016/j.jinf.2008.07.013. Epub Aug. 29, 2008.
GENBANK Submission; NIH/NCBI, Accession No. KC692045. Candida auris isolate VPCI_677/P/12 internal transcribed spacer 1, partial sequence; 5.8S ribosomal RNA gene and internal transcribed spacer 2, complete sequence; and 28S ribosomal RNA gene, partial sequence, Chowdhary et al., Oct. 21, 2013.
GENBANK Submission; NIH/NCBI, Accession No. KX518348. [*Candida*] *auris* strain TA002-14 18S ribosomal RNA gene, partial sequence; internal transcribed spacer 1, 5.8S ribosomal RNA gene, and internal transcribed spacer 2, complete sequence; and 28S ribosomal RNA gene, partial sequence, Finn et al., Aug. 7, 2016.
Hansen et al., Evaluation of new preanalysis sample treatment tools and DNA isolation protocols to improve bacterial pathogen detection in whole blood. J Clin Microbiol. Aug. 2009;47(8):2629-31. doi: 10.1128/JCM.00821-09. Epub Jun. 17, 2009.
Hansen et al., Pre-analytical sample treatment and DNA extraction protocols for the detection of bacterial pathogens from whole blood. Methods Mol Biol. 2013;943:81-90. doi: 10.1007/978-1-60327-353-4_4.
Horz et al., Selective isolation of bacterial DNA from human clinical specimens. J Microbiol Methods. Jan. 2008;72(1):98-102. doi: 10.1016/j.mimet.2007.10.007. Epub Nov. 28, 2007.
Kathuria et al., Multidrug-Resistant Candida auris Misidentified as Candida haemulonii: Characterization by Matrix-Assisted Laser Desorption Ionization-Time of Flight Mass Spectrometry and DNA Sequencing and Its Antifungal Susceptibility Profile Variability by Vitek 2, CLSI Broth Microdilution, and Etest Method. J Clin Microbiol. Jun. 2015;53(6):1823-30. doi: 10.1128/JCM.00367-15. Epub Mar. 25, 2015.
Kuhn et al., Sequence specificity at targeting double-stranded DNA with a γ-PNA oligomer modified with guanidinium G-clamp nucleobases. Artif DNA: PNA & XNA. Jul.-Sep. 2010;1(1):45-53.
Leach et al., Development and Validation of a Real-Time PCR Assay for Rapid Detection of Candida auris from Surveillance Samples. J Clin Microbiol. Jan. 24, 2018;56(2):e01223-17. doi: 10.1128/JCM.01223-17.
Leggieri et al., Molecular diagnosis of bloodstream infections: planning to (physically) reach the bedside. Curr Opin Infect Dis. Aug. 2010;23(4):311-9. doi: 10.1097/QCO.0b013e32833bfc44.
Loonen et al., Acceleration of the direct identification of *Staphylococcus aureus* versus coagulase-negative staphylococci from blood culture material: a comparison of six bacterial DNA extraction methods. Eur J Clin Microbiol Infect Dis. Mar. 2011;30(3):337-42. doi: 10.1007/s10096-010-1090-0. Epub Oct. 24, 2010.
Loonen et al., Comparison of pathogen DNA isolation methods from large volumes of whole blood to improve molecular diagnosis of bloodstream infections. PLoS One. Aug. 15, 2013;8(8):e72349. doi: 10.1371/journal.pone.0072349.
Mccann et al., Evaluation of MolYsis™ Complete5 DNA extraction method for detecting *Staphylococcus aureus* DNA from whole blood in a sepsis model using PCR/pyrosequencing. J Microbiol Methods. Apr. 2014;99:1-7. doi: 10.1016/j.mimet.2014.01.013. Epub Feb. 3, 2014.
Mizusawa et al., Can Multidrug-Resistant Candida auris Be Reliably Identified in Clinical Microbiology Laboratories? J Clin Microbiol. Feb. 2017;55(2):638-640. doi: 10.1128/JCM.02202-16. Epub Nov. 23, 2016.
Nolling et al., Duplex DNA-Invading γ-Modified Peptide Nucleic Acids Enable Rapid Identification of Bloodstream Infections in Whole Blood. mBio. Apr. 19, 2016;7(2):e00345-16. doi: 10.1128/mBio.00345-16.
Santalucia Jr., Physical principles and visual-OMP software for optimal PCR design. Methods Mol Biol. 2007;402:3-34. doi: 10.1007/978-1-59745-528-2_1.

* cited by examiner

METHODS AND DEVICES FOR IDENTIFYING MICROBIAL INFECTIONS

RELATED APPLICATIONS

This application is a Continuation of U.S. application Ser. No. 16/499,515, filed Sep. 30, 2019, which is a national stage filing under 35 U.S.C. § 371 of international application number PCT/US2018/025681, filed Apr. 2, 2018, which claims the benefit of U.S. Provisional Patent Application Ser. No. 62/480,953, filed Apr. 3, 2017. The entire contents of these applications are incorporated herein by reference in their entirety.

GOVERNMENT SUPPORT

This invention was made with government support under contract Nos. R430D016466 and No. R44AI109913 awarded by the National Institutes of Health (NIH). The government has certain rights in the invention.

REFERENCE TO AN ELECTRONIC SEQUENCE LISTING

The contents of the electronic sequence listing (H091670001US02-SEQ-CRS.xml; Size: 747,284 bytes; and Date of Creation: Oct. 11, 2023) is herein incorporated by reference in its entirety.

TECHNICAL FIELD

The present invention generally relates to the field of microbial pathogen detection and identification utilizing genomic sequence recognition.

BACKGROUND

Bloodstream infections (BSIs) have risen to become the 6th leading cause of death in the U.S. and the most expensive hospital-treated condition, at over $30B annually. BSIs account for 25% of all ICU usage and roughly 50% of all hospital deaths in the U.S. BSIs are typically caused by bacteria or fungi, and effective disease management requires their early and accurate identification. BSIs are typically identified through a series of blood-cultures that take up to several days to identify potential pathogens. Blood-cultures are widely considered the barrier to a hypothesis driven first-line antimicrobial intervention.

Modern molecular approaches have the potential to revolutionize this field, however limitations including lack of sensitivity, inaccurate performance, narrow coverage, and insufficient diagnostic detail have prevented these methods from making an impact. Indeed, in contrast to numerous infectious diseases, a clear capability gap remains despite the immense clinical need. It is the combined challenges of extremely low pathogen loads (1-100 CFU/ml), the requirement for broad coverage with high levels of detail (20 pathogens are responsible for roughly 90% of cases where species level information is clinically required), a difficult specimen matrix (blood), and the need for a rapid turnaround; all of which when combined, have proven difficult to overcome.

SUMMARY

The present disclosure generally relates to the field of microorganisms, e.g., microbial pathogens, detection and identification utilizing genomic sequence recognition. In particular, the claimed methods, devices, and kits provide for identification and evaluation of microorganisms in a sample, e.g., in blood, without the need for culturing the sample, or performing other manipulations of the sample that are likely to cause over- or under-representation of any one microbial species.

In some aspects, provided herein are methods of identifying one or more specific microbial species in a sample from a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs), wherein the plurality of DIANAs comprise one or more sequences selected from the group consisting of SEQ ID NOs: 20-571; and detecting binding of one or more of the plurality of DIANAs to the microbial genetic material of its respective single species or group of microbes, wherein the detection of binding indicates the presence of one or more specific microbial species or groups of microbes in the sample.

In other aspects, provided herein are methods of identifying one or more specific microbial species in a sample from a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; incubating the amplified microbial genetic materials with a plurality of DNA Invading Artificial Nucleic Acids (DIANAs) for less than 10 minutes, and detecting binding of one or more of the plurality of DIANAs to the microbial genetic material of its respective single species or group of microbes, wherein the detection of binding indicates the presence of one or more specific microbial species or groups of microbes in the sample.

In some embodiments, the incubating the amplified microbial genetic materials with a plurality of DNA Invading Artificial Nucleic Acids (DIANAs) is at a temperature that is between about 20° C. to about 65° C. In some embodiments, the temperature is between about 20° C. to about 64° C. In some embodiments, the temperature is between about 30° C. to about 64° C. In some embodiments, the temperature is between about 37° C. to about 64° C. In some embodiments, the temperature is between about 40° C. to about 64° C. In some embodiments, the temperature is between about 50° C. to about 64° C. In some embodiments, the temperature is between about 37° C. to about 60° C. In some embodiments, the temperature is between about 40° C. to about 60° C. In some embodiments, the temperature is between about 50° C. to about 60° C.

In some embodiments, the amplified microbial genetic materials are incubated with a plurality of DNA Invading Artificial Nucleic Acids (DIANAs) in an incubation solution comprising a monovalent salt. In some embodiments, the monovalent salt is present at a concentration above 50 mM.

In some embodiments, the amplified microbial genetic materials are incubated with a plurality of DNA Invading Artificial Nucleic Acids (DIANAs) in an incubation solution comprising a divalent salt. In some embodiments, the divalent salt is present at a concentration above 5 mM.

In some embodiments, the amplified microbial genetic materials are incubated with a plurality of DNA Invading Artificial Nucleic Acids (DIANAs) in an incubation solution comprising a trivalent salt. In some embodiments, the trivalent salt is present at a concentration above 0.1 mM.

In some embodiments, the amplified microbial genetic materials are incubated with a plurality of DNA Invading Artificial Nucleic Acids (DIANAs) in an incubation solution having a pH between about 10.2 and about 12.2.

In other aspects, provided herein are methods of monitoring pathogen load of one or more specific microbial species over time in a subject. The methods comprise: measuring the pathogen load of the one or more specific microbial species in a first sample obtained from the subject at a first time and measuring the pathogen load in a second sample obtained from the subject at a second time, wherein the second sample is obtained from the subject at a time that is at least about 1 hour after the first sample was obtained from the subject, wherein eukaryotic DNA is depleted from the first sample and the second sample, one or more microbial cells is lysed in the first sample and the second sample, wherein the lysing of the one or more microbial cells releases a plurality of microbial genetic materials, the plurality of microbial genetic materials is isolated, the plurality of microbial genetic materials is amplified, the amplified microbial genetic materials are contacted with a plurality of DNA Invading Artificial Nucleic Acids (DIANAs), and binding of one or more of the plurality of DIANAs to the microbial genetic material of its respective single species or group of microbes is detected, wherein the detection of binding indicates the presence of one or more specific microbial species or groups of microbes in the sample.

In some embodiments, the second biological sample is obtained from the subject at least about 1, 2, 3, 4, 5, 6, 7, 8, 9, 10, 11, or 12 hours after the first biological sample was obtained from the subject.

In other aspects, provided herein are methods of determining susceptibility of one or more specific microbial species in a subject to one or more antimicrobials. The methods comprise: obtaining one or more samples from the subject, optionally dividing any one or more of the one or more samples into multiple samples; measuring the pathogen load of the one or more specific microbial species in one of the one or more samples obtained from the subject or in one of the multiple samples; incubating at least one of the one or more samples obtained from the subject or incubating at least one of the multiple samples with the one or more antimicrobials for at least 1 hour to obtain a sample treated with one or more antimicrobials; and measuring the pathogen load of the one or more specific microbial species in the sample treated with the one or more antimicrobials, wherein the pathogen load of the one or more specific microbial species in the sample incubated with the one or more antimicrobials is used to determine antimicrobial susceptibility of the pathogen.

In some embodiments, the multiple samples equals 2, 3, 4, 5, or 6 or more samples.

In some embodiments, the one or more antimicrobials are selected from ampicillin, amoxycillin, aureomicin, bacitracin, ceftazidime, ceftriaxone, cefotaxime, cephachlor, cephalexin, cephradine, ciprofloxacin, clavulanic acid, cloxacillin, dicloxacillan, erythromycin, flucloxacillan, gentamicin, gramicidin, methicillan, neomycin, oxacillan, penicillin, vancomycin, capsofungin, flucytosine, fluconazole, itraconazole, ketoconazole, and miconazole.

In some embodiments, the antimicrobial selected is an antibiotic. In some embodiments, the antibiotic selected may be a compound relating to the following antibiotic classes selected from penicillins, tetracyclines, cephalosporins, quinolones, lincomycins, macroslides, sulfomides, glycopeptides, aminoglycosides, and/or carapenems. In some embodiements, the antibiotic selected may be slected from an alternative class of antibitioics.

In some embodiments, the antimicrobial selected is an antifungal. In some embodiments, the antifungal selected may be a compound relating to the following antifungal classes selected from azoles, allylamines, echinocandins, nucleoside analogs, and/or polyenes. In some embodiments, the antifungal selected may be slected from an alternative class of antifungals.

In other aspects, provided herein are methods of identifying which microbial species of a group of microbial species in a sample from a subject having an infection contains genetic material which confers resistance or reduced susceptibility to antimicrobials. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs) that bind to a single species or group of microbes, wherein the plurality of DIANAs comprise a sequence selected from the group consisting of SEQ ID NOs: 1-4 and 20-31; contacting the amplified microbial genetic materials with a plurality of DNA Invading Artificial Nucleic Acids (DIANAs) that bind to microbial genetic material which confers resistance or reduced susceptibility to antimicrobials, wherein the plurality of DIANAs comprise a sequence selected from the group consisting of SEQ ID NOs: 141-493;

detecting and quantifying binding of one or more of the plurality of DIANAs to the microbial genetic material of its respective single species or group of microbes and detecting binding of one or more of the plurality of DIANAs to the microbial genetic material which confers resistance or reduced susceptibility to antimicrobials; and determining the stoichiometry between the signal obtained from the detected single species or group of microbes and the signal obtained from the detected genetic material which confers resistance or reduced susceptibility to antimicrobials; wherein the stoichiometry is used to determine which microbial species contains the genetic material that confers resistance or reduced susceptibility to antimicrobials.

In other aspects, provided herein are methods of identifying a single species or group of microbes which is associated with endocarditis and/or sepsis in a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs) that bind to the single species or group of microbes associated with endocarditis and/or sepsis, wherein the plurality of DIANAs comprise one or more sequences selected from the group consisting of SEQ ID NOs: 20-131; and detecting binding of the one or more of the plurality of DIANAs to the microbial genetic material of its respective single species or group of microbes, wherein the detection of binding indicates the presence of the one or more specific microbial species or groups of microbes associated with endocarditis and/or sepsis in the sample.

In other aspects, provided herein are methods of identifying a single species or group of microbes which is associated with neonatal sepsis in a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs) that bind to the single species or group of microbes associated with neonatal sepsis, wherein the plurality of DIANAs comprise one or more sequences selected from the group consisting of SEQ ID NOs: 132-140; and detecting binding of the one or more of the plurality of DIANAs to the microbial genetic material of its respective single species or group of microbes, wherein the detection of binding indicates the presence of the one or more specific microbial species or groups of microbes associated with neonatal sepsis in the sample.

In some embodiments, the sample has a volume of between 0.1 and 1 ml. In some embodiments, the sample has a volume of between 0.5 and 2.0 ml.

In other aspects, provided herein are methods of identifying a genetic material which confers reduced susceptibility or resistance to antimicrobials in a pathogen in a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs) that bind to genetic material which confers reduced susceptibility or resistance to antimicrobials, wherein the plurality of DIANAs comprise one or more sequences selected from the group consisting of SEQ ID NOs: 141-493; and detecting binding of the one or more of the plurality of DIANAs to the microbial genetic material, wherein the detection of binding indicates the presence of the genetic material which confers reduced susceptibility or resistance to antimicrobials in a pathogen in the sample.

In other aspects, provided herein are methods of of identifying a fungal species or groups of fungi in a subject. The methods comprise: depleting eukaryotic DNA from the sample; lysing one or more microbial cells in the sample, wherein the lysing of one or more microbial cells releases a plurality of microbial genetic materials; isolating the plurality of microbial genetic materials; amplifying the plurality of microbial genetic materials; contacting the amplified microbial genetic materials with a plurality of DNA Invading Artificial Nucleic Acids (DIANAs), wherein the plurality of DIANAs comprise one or more sequences selected from the group consisting of SEQ ID NOs: 494-571; and detecting binding of one or more of the plurality of DIANAs to the microbial genetic material of its respective single fungal species or group of fungi, wherein the detection of binding indicates the presence of the one or more specific fungal species or groups of fungi in the sample.

In another aspect, also provided herein are compositions comprising one or more DIANAs comprising a sequence selected from the group consisting of SEQ ID NOs: 20-571.

In a further aspect, also provided herein are kits comprising one or more DIANAs, wherein the DIANAs comprise one or more sequences selected from the group consisting of SEQ ID NOs: 20-571.

In some embodiments, one or more of the plurality of DIANAs is modified to comprise one or more binding moieties. In some embodiments, the one or more binding moieties are non-covalent binding moieties. In some embodiments, the one or more binding moieties are covalent binding moieties.

In some embodiments, one or more of the plurality of DIANAs comprise a linker.

In some embodiments, one or more of the plurality of DIANAs further comprises a spacer.

In some embodiments, the sample is a blood sample. In some embodiments, the blood sample is a whole blood sample.

In other aspects, provided herein are methods for identifying one or more specific microbial species in a sample from a subject. The methods comprise: applying the sample to a fluidic device comprising: a sample inlet; a fluidic channel in fluidic communication with the sample inlet, wherein the fluidic channel has a length of at least 1 cm and a channel length-to-width ratio of at least 5:1; a first lysis region in fluidic communication with the fluidic channel; a first isolation region in fluidic communication with first lysis region; a second lysis region in fluidic communication with the first isolation region; a second isolation region in fluidic communication with the second lysis region; at least one reaction region in fluidic communication with the second isolation region; an amplification region in fluidic communication with at least one of the reaction regions; a plurality of processing chambers, each in fluidic communication with at least one of the reaction regions and/or the amplification region; and one or more detection regions, wherein the detection regions comprise one or more DNA Invading Artificial Nucleic Acids (DIANAs) comprising one or more sequences selected from the group consisting of SEQ ID NOs: 20-571.

In some embodiments, the methods comprise a detection region in fluidic communication with each processing chamber.

In some embodiments, the fluidic device has n detection regions and is capable of identifying n+x specific microbial species, and wherein x is greater than or equal to 1.

In other aspects, provided herein are methods for identifying one or more specific microbial species in a sample from a subject. The methods comprise: applying the sample to a fluidic device comprising: a fluidic reservoir; a gas chamber in fluidic communication with the fluidic reservoir; a fluidic channel in fluidic communication with the fluidic reservoir; and one or more detection regions, wherein the detection regions comprise one or more DNA Invading Artificial Nucleic Acids (DIANAs) comprising one or more sequences selected from the group consisting of SEQ ID NOs: 20-571, wherein a longitudinal axis of the fluidic reservoir is substantially perpendicular to a longitudinal axis of the fluidic channel, performing the steps of: introducing a first fluid in the fluidic reservoir, wherein the first fluid is a liquid; introducing a second fluid in the gas chamber, wherein the second fluid is a gas; and applying a pressure to the second fluid such that the second fluid flows from the gas chamber to the fluidic reservoir and pushes the first fluid from the fluidic column into the fluidic channel, wherein binding of the one or more DIANAs to the sample indicates the presence of one or more specific microbial species or groups of microbes in the sample.

In some embodiments, the methods comprise flowing a first fluid having a volume of at least 0.1 mL into the fluidic reservoir via the fluidic channel.

In some embodiments, the methods comprise introducing a stream or bubbles of a gas in the fluidic reservoir to cause the first fluid and the reagent to mix, wherein the gas is transported from the fluidic channel.

In some embodiments, the methods comprise flowing the gas from the fluidic reservoir into the gas chamber and substantially inhibiting the first fluid and/or the reagent from flowing into the gas chamber.

In some embodiments, the fluidic device has n detection regions and is capable of identifying n+x specific microbial species, and wherein x is greater than or equal to 1.

In some embodiments, the subject is a mammal, e.g., a human. In some embodiments, the subject is suspected of having an infection, e.g., a bacterial or fungal infection.

In another aspect, provided herein are fluidic devices comprising one or more processing chambers and one or more detection regions, wherein one or more DNA Invading Artificial Nucleic Acids (DIANAs) comprising one or more sequences selected from the group consisting of SEQ ID NOs: 20-571 are contained within at least one of the detection regions.

In some embodiments, each fluidic reservoir has a volume of at least 0.1 mL.

In some embodiments, each gas chamber is in fluidic communication with a fluidic reservoir.

In some embodiments, each gas chamber has a volume of at least 0.1 mL.

In some embodiments, each fluidic channel is in fluidic communication with one or more fluidic reservoirs.

In some embodiments, each fluidic channel has a volume of less than 2000 µL.

In some embodiments, a longitudinal axis of at least one fluidic reservoir is substantially perpendicular to a longitudinal axis of at least one fluidic channel having a length of at least 1 cm.

In some embodiments, the fluidic channel has a length of at least 1 cm.

In some embodiments, the fluidic channel has a channel length-to-width ratio of at least 5:1.

In some embodiments, a fluidic device described herein comprises at least 10 branching channels branching from the fluidic hub.

In some embodiments, a fluidic device described herein comprises a plurality of valves, each valve positioned between the branching channels and the fluidic hub.

In some embodiments, a fluidic device described herein comprises a plurality of fluidic reservoirs, each fluidic reservoir connected to a branching channel.

In some embodiments, one or more of the plurality of DIANAs is modified to comprise one or more binding moieties. In some embodiments, the one or more binding moieties are non-covalent binding moieties. In some embodiments, the one or more binding moieties are covalent binding moieties.

In some embodiments, one or more of the plurality of DIANAs comprise a linker.

In some embodiments, one or more of the plurality of DIANAs further comprises a spacer.

In some embodiments, the sample is a blood sample. In some embodiments, the blood sample is a whole blood sample.

In another aspect, a kit is provided comprising reagents and protocols for detecting and/or identifying and/or evaluating one or more microorganisms from a sample without prior enrichment. In some embodiments, this kit contains reagents and protocols for the following processes: (i) depleting eukaryotic DNA from the sample; (ii) lysing one or more microbial cells in the sample, wherein the lysing of one or more microbial cells releases a plurality of microbial genetic materials; (iii) isolating the plurality of microbial genetic materials; (iv) amplifying the plurality of microbial genetic materials; and (v) contacting the amplified microbial genetic materials with a plurality of DNA Invading Artificial Nucleic Acids (DIANAs) that bind to the single species or group of microbes associated with a bloodstream infection, wherein the plurality of DIANAs comprise one or more sequences selected from the group consisting of SEQ ID NOs: 20-571; and (vi) detecting binding of the one or more of the plurality of DIANAs to the microbial genetic material of its respective single species or group of microbes, wherein the detection of binding indicates the presence of the one or more specific microbial species or groups of microbes associated with bloodstream infections in the sample.

In some embodiments, a kit may be able to provide both the load (relative and/or absolute) and microbial composition of the sample (herein defined as 'microbial spectra') should more than a single microorganism be present in the sample.

Other advantages and novel features of the methods, devices, and kits described herein will become apparent from the following detailed description of various non-limiting embodiments when considered in conjunction with the accompanying figures. In cases where the present specification and a document Incorporated by reference include conflicting and/or inconsistent disclosure, the present specification shall control.

BRIEF DESCRIPTION OF THE FIGURES

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
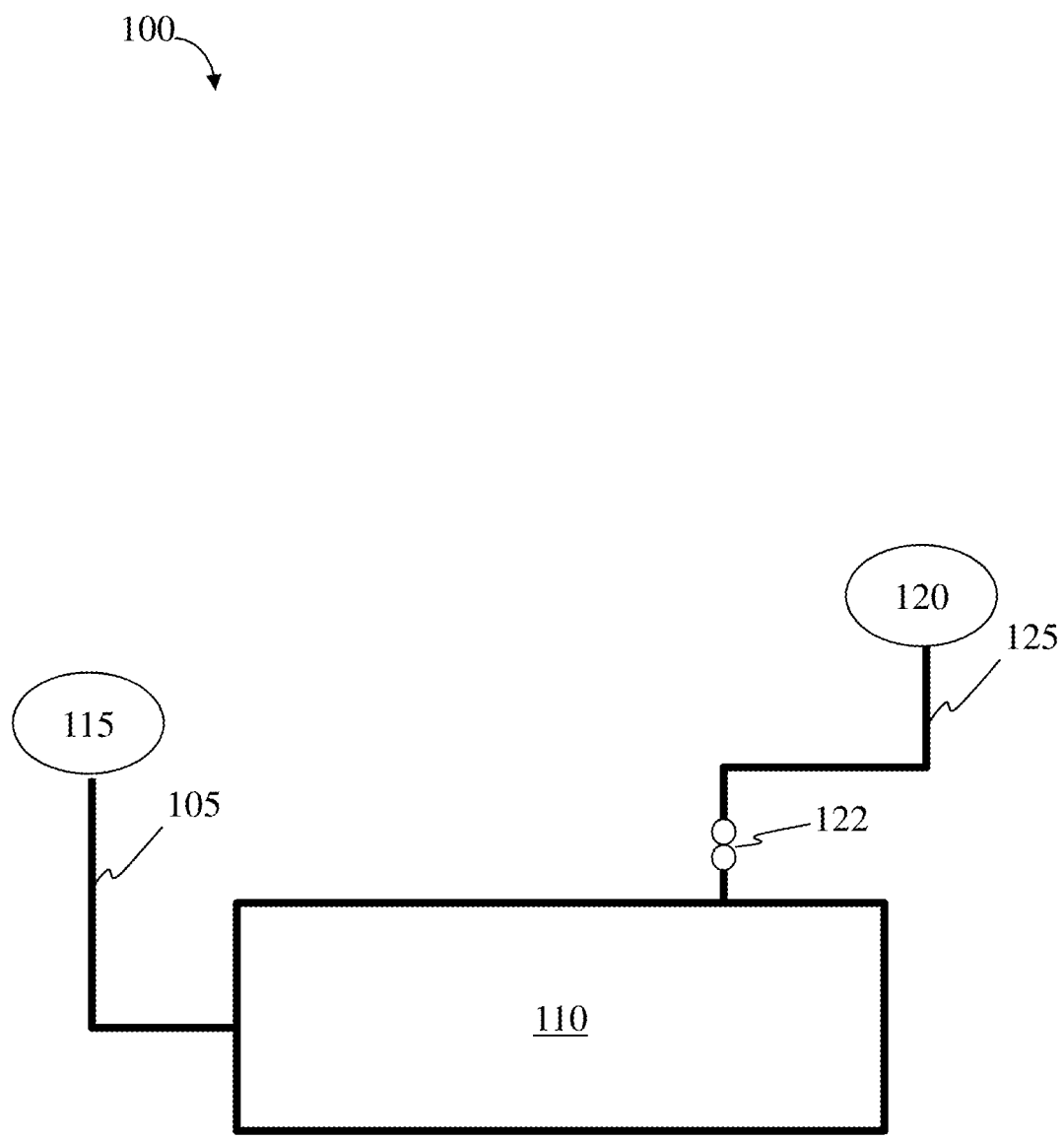
FIG. 1 is a schematic illustration of a fluidic device, according to one set of embodiments.

Described herein are methods, devices, and kits for detecting, identifying, monitoring, and evaluating microorganisms, e.g., pathogens, in a sample from a subject by detecting the genetic material of the microorganisms. These methods, devices, and kits employ DNA Invading Artificial Nucleic Acids (DIANAs) and novel DIANAs are disclosed herein. Whereas art known methods rely on hybridization to detect microbial DNA, which has difficulty discriminating among highly similar sequences with high confidence, DIANAs have specificity down to single base-pair resolution, allowing the differentiation of highly homologous sequences.

These methods, devices and kits are particularly useful in evaluating mircoorganisms present at low levels in a sample. Methods in the art commonly use culturing to increase microbial levels. Major drawbacks of culturing are that it takes time for the microorganisms to grow to sufficient concentrations, and that different species of microorganisms in a population may have different growth rates, such that information concerning the relative freaquency of different species of microorganisms in a population may be lost. Indeed, some microorganisms are not culturable and may not be detected in techniques using culturing.

The claimed methods, devices, and kits not only allow for the identification of microorganisms present at low levels, but they also allow for the identification of microbial spectra—the types and relative amounts or loads of different microorganisms present in a sample. Moreover, this identification can be highly detailed and can include the identification of microorganisms and their resistance conferring genes from a broad range of species simultaneously. Further, the methods can provide this information quickly.

The methods, devices, and kits are particularly useful in the context of evaluating blood samples and evaluating subjects for the presence or progression of blood stream infections (BSIs), e.g., sepsis, infective endocarditis, and neonatal sepsis. Whole blood is a complex solution that contains multiple cell types such as leukocytes, erythrocytes, and thrombocytes, as well as naturally occurring organic and inorganic components. The blood components can hinder (and may even completely prevent) additional or downstream processing of DNA and/or RNA, such as, e.g., enzymatic PCR or isothermal amplification. Additionally, anticoagulants and preservatives, which are commonly used during bodily fluid sample collection, can further interfere with enzymatic or other process. Assaying blood can also require large volumes due to the low frequency (low loads) of microorganisms in BSIs. The methods, devices, and kits described herein provide for sensitive and accurate evaluation of microorganisms in blood samples. As is described herein, the methods, devices, and kits are particularly useful for identifying microorganisms associated with bloodstream infections in general, and specifically infectious endocartidis and/or neonatal sepsis and/or fungal infections in the blood.

The methods, kits, and devices described herein may be useful, for example, for clinical purposes (e.g., diagnosing a disease or aliment via the presence of specific pathogen), or for research purposes (e.g., for monitoring the changes in microbial spectra within a sample over time due to the addition and/or administration of a compound). Because the approach described herein, among other things, can be fully integrated (i.e., is sample-in/results-out), does not require culturing, and uses DIANAs, it offers significant performance advantages over the art including, for example, improved kinetics, sensitivity, specificity, dynamic range, and the ability to detect the relative amounts of different microorganisms.

The various aspects and embodiments of the present technology that are introduced above and discussed in greater detail below may be implemented in any number of ways, and as described herein, are not limited to any particular manner of implementation. Examples of specific implementations and applications are provided primarily for illustrative purposes.

As used herein, the singular forms "a," "an," and "the" include plural referents unless the content clearly dictates otherwise. For example, reference to "a cell" includes a combination of two or more cells, and the like.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same DNA Invading Artificial Nucleic Acids (DIANAs)

In some embodiments, DNA Invading Artificial Nucleic Acids (DIANAs) are used to detect microbial genetic materials.

DIANA-based invasion can be fast and can require only minutes. This is in contrast to techniques using DNA or RNA hybridization probes, which can require hours to reach high stringency. DIANAs also can have unmatched specificity, down to single base pair resolution, leading to a more accurate process than DNA or RNA hybridization. Without wishing to be bound by theory, the physical rationale behind this specificity is as follows. During invasion, a localized 'bubble' within the duplex DNA is formed, allowing the DIANA oligomer to bind to a specific sequence along one of the two DNA strands. Throughout, the DNA complement to that sequence remains on the opposing strand, as the DNA is not denatured. Thus, if a single mismatch between the DNA and the DIANA probe is evident, the opposing strand can 'snap-back' and 'kick-out' the DIANA. It is this consistent and localized energetic battle between the DIANA oligomer and the DNA complement which make the invasion process immensely specific.

As used herein, the term "invasion" refers to the binding of DIANAs to microbial genomic material (e.g., RNA or DNA). Similar to that which is common in the field of molecular biology, sequence recognition is through Watson-Crick basepairing rules, while not ruling out alternative mechanisms such as, but not limited to, Hoogstein and reverse-Hoogstein base-pairing rules. In some embodiments, the DIANA binds to double stranded DNA or RNA. In some embodiments, the DIANA binds to a predominantly single-stranded DNA or RNA. It is to be understood that the process of DIANA invasion to a DNA or RNA molecule may take place despite the DNA and/or RNA being predominantly single-stranded due to the presence of secondary structures, such as, but not limited to, hairpins. It is to be understood that the process of 'invasion' is localized, and the local conditions are those which dictate whether the process is inherently hybridization or invasion based.

In some embodiments, the DIANAs take the form of a specialized type or class of Peptide Nucleic Acids (PNAs). In some embodiments, the DIANAs are not limited to a specific class of PNAs. In some embodiments, the DIANAs take the form of a specialized type or class of Locked or Bridged Nucleic Acids (LNAs and/or BNAs). In some embodiments, DIANAs that locally invades duplex DNA have the required affinity and sequence specificity to be used in the methods disclosed herein.

In some embodiments, PNA oligomer based DIANAs have a chiral stereo-center at the gamma-position of the backbone (also known as γPNA). γPNAs are oligomers, comprised of monomers which make up the sequence composition for that oligomer. By way of example by not by way of limitation, the γPNA oligomer with a sequence AGTCAG will be comprised for two 'A' monomers, two 'G' monomers, a single 'T' monomer, and a single 'C' monomer. A γPNA oligomer is a specific class of PNA oligomer wherein at least a single monomer contains a chiral stereo-center at the gamma-position of the monomer backbone (herein a 'gamma-modified monomer'). A PNA oligomer that is pre-oriented structurally into a right-handed helix is energetically favored to perform duplex DNA invasion. In some embodiments, the microbial DNA is detected using γPNA as taught in WO 2013/176992, the contents of which are incorporated by reference in its entirety. In some embodiments, use of DIANAs is advantageous for long amplicons (e.g., amplicons between about 400 to 4000 bp). It is to be understood, that DIANAs, in some embodiments, could be used in DNA/RNA hybridization processes. However, we identify improved performance when experimental conditions are those which favor invasion in-place of hybridization.

In some embodiments, the oligomer contains more than 5% gamma-modified monomers, more than 10% gamma-modified monomers, more than 25% gamma-modified monomers, more than 50% gamma-modified monomers, more than 75% gamma-modified monomers, or 100% gamma-modified monomers. Suitable modifications at the gamma-site are well known to those skilled in the art and include by way of example, but not by way of limitation, non-polar groups such as methyl groups, ethyl group, etc, or polar groups such as ethylene glycol-based groups, or semi-polar groups, such as those which are ester based.

In some embodiments, the DIANA target genetic material from a microorganism. In some embodiments, the DIANA targets genetic material from a bacteria, e.g., a Gram positive or a Gram negative bacteria. In some embodiments, the DIANA targets genetic material from a fungi. In some embodiments, the oligomer sequences for DIANAs useful in microbial identification are as shown in Table 1, Table 2, Table 3, Table 4, or Table 5, below:

Table 1 Shows DIANA Sequences for Identifying Microorganisms

TABLE 1

| Microorganism | SEQ ID NO: | DIANA Sequence |
| --- | --- | --- |
| Staphylococcus aureus | 1 | AACGGACGAGAAGCT |
| Coagulase Negative Staphylococci | 2 | GTAACCATTTGGAGCT |
| | 3 | GTAACCATTTATGGAG |
| Enterococcus faecalis | 4 | GGACGTTAGTAACTGAA |
| Streptococcus pneumoniae | 5 | TTAACCATAGTAGGCC |
| Streptococcus agalactiae | 6 | AAGAGTAATTAACACAT |
| Streptococcus pyogenes | 7 | ATAAGAGAGACTAACG |
| Enterococcus faecium | 8 | GGATGAGAGTAACTGTT |
| Enterobacter spp./ Klebsiella spp. | 9 | CACAGAGAGCTTGCTC |
| Pseudomonas aeruginosa | 10 | TGAGATCATAGTGGCGC |
| | 11 | TGAGATCTTAGTGGCGC |
| Acinetobacter baumannii | 12 | TACCTAGAGATAGTGG |
| Serratia marcescens | 13 | AAGGTGGTGAACTTAA |
| | 14 | AAGGTGGTGAGCTTAA |
| Candida albicans | 15 | GGGTAGCCATTTATG |
| Candida parapsilosis | 16 | ACGCATCAAAAAAGAT |
| Candida krusei | 17 | CCGTGGAAAATCTAG |
| Candida glabrata | 18 | CGTGTACTGGAATGCA |
| Candida tropicalis | 19 | CAATGTCTTCGGACT |

Table 2 Shows DIANA Sequences for Identifying Microorganisms Commonly Associated with Infective Endocarditis

TABLE 2

| Microorganism | SEQ ID NO: | DIANA Sequence |
| --- | --- | --- |
| Coagulase Negative Staphylococci | 20 | AGCGAACAGACGAGGAGCTT |
| | 21 | CGAGGAGCTTGCTCCTCTGA |
| | 22 | GCTCCTCTGACGTTAGCGGC |
| | 23 | AGCGAACAGATAAGGAGCTT |
| | 24 | TAAGGAGCTTGCTCCTTTGA |
| | 25 | GCTCCTTTGACGTTAGCGGC |
| | 26 | AATACCGGATAATATATTGA |
| | 27 | GGATAATATATTGAACCGCA |
| | 28 | TATATTGAACCGCATGGTTC |
| | 29 | AATACCGGATAATATGTTGA |
| | 30 | GGATAATATGTTGAACCGCA |
| | 31 | TATGTTGAACCGCATGGTTC |
| Eikenella corrodens | 32 | GGTAGTGCTTGCACTACTGT |
| | 33 | GCTTGCACTACTGTCCGGCG |
| | 34 | ACTACTGTCCGGCGAGTGGC |
| | 35 | TGTAAAGTACTTTTGTTAGG |
| | 36 | GGAAGAAAAGGGAAGTGCTA |
| | 37 | AAAGGGAAGTGCTAATACCA |
| | 38 | AAGTGCTAATACCACTTTTT |

TABLE 2-continued

| Microorganism | SEQ ID NO: | DIANA Sequence |
|---|---|---|
| Kingella kingae | 39 | GTTATTCGAGCGGCCAATAA |
| | 40 | CGAGCGGCCAATAACTGATT |
| | 41 | GCCAATAACTGATTAGCTAG |
| | 42 | TTTGTTAGGGAGAAAAGGT |
| | 43 | AGGGAAGAAAAGGTTGATGC |
| | 44 | GAAAAGGTTGATGCTAATAT |
| | 45 | CAGACGGTTAGTTAAGCAAG |
| Aggregatibacter actinomycetemcomitans | 46 | TAGCAGGTAAGTACTTGTAC |
| | 47 | TTCGGTGATGAGGAAGGTTG |
| | 48 | TTTAGCCCTGGTGCCCGAAG |
| | 49 | CTTGACATCCGAAGAAGAAC |
| | 50 | AGAGGGTAACCAACCAGCGA |
| Haemophilus parainfluenzae | 51 | AAGGCATTTAGTTTAATAGA |
| | 52 | GTTGAGCTTTAAGTTTGGCG |
| Haemophilus influenzae | 53 | CGGAAGATGAAAGTGCGGGA |
| | 54 | ATGAAAGTGCGGGACTGAGA |
| | 55 | GTGCGGGACTGAGAGGCCGC |
| | 56 | ATGTGTTAATAGCACATCAA |
| | 57 | TAATAGCACATCAAATTGAC |
| | 58 | CACATCAAATTGACGTTAAA |
| Viridans streptococci | 59 | CATGTTAGATGCTTGAAAG |
| | 60 | CTCTGTTGTAAGAGAAGAAC |
| | 61 | TGTGAGAGTGGAAAGTTCA |
| | 62 | TGTGAGAATGGAAAGTTCA |
| | 63 | AGGTGTTAGGTCCTTTCCGG |
| Bartonella spp. | 64 | CACTCTTTTAGAGTGAGCGG |
| | 65 | GATCGCGGAAGGTGGAGACA |
| | 66 | GGAAGGTGGAGACACCCTCC |
| | 67 | TGGAGACACCCTCCTTCAGT |
| | 68 | AATGAAATGGACCCACCCCT |
| | 69 | ACGGCGTCATAATGCGCCAA |
| | 70 | AATTTCTATTTTCAAAAAAA |
| | 71 | AGGTCCATGAAAGATATTAA |
| | 72 | TGGGTGTTGATATTGCAAAA |
| | 73 | TTTTCAACTGTGTGGAATTG |
| | 74 | TGGGGTAAAGTGATCTACAC |
| | 75 | GGGTTAAGCGTGCTCAGTAT |
| | 76 | CACCGTAGCCAGTCTTAAGG |
| | 77 | TGCGTGGTGATGGAAGCGTG |
| | 78 | GAGCGAACCATTGGTATCGG |
| | 79 | TATGGGGATGGGTATCCCAA |
| | 80 | TTGATCAGTCCGCAGCACGT |
| | 81 | CGTATGTCAAAAGTAACAAG |
| | 82 | TCGTAACGATGCGCAGGCGA |
| | 83 | GAAGCGGCTTCCCGCGCCTC |
| | 84 | GGTTTGTGCGGGTAAAACG |
| | 85 | ACAACAAGACGTTCAAGCGC |
| | 86 | AAGATACGCGATCGTTTAGT |
| | 87 | GCCGCACGGCGCTGATCAAT |
| | 88 | TCGGGGGTTGTTGCAAGAAT |
| | 89 | CTCACGATGGCGCGTGGTGC |
| | 90 | GATTTTATGAAGAGCTCCCG |
| | 91 | TTTAGCGAGCGAAGCGGTGG |
| | 92 | ACACCGCGGATGAAACGGGT |
| | 93 | ATTGTTTGTATACCGAATTG |
| | 94 | CCGGGACGAAGCGATTGGTG |
| | 95 | GAGGAGGAATTAAAAGCGGT |
| | 96 | AAGCCAATGAGGATTGTCAA |
| | 97 | ACAGAGCATCCCGGGGGTGG |
| | 98 | TTAACGGCGCTCTCGGTTTA |
| | 99 | GCGTGGGTGACATTCATCAA |
| | 100 | TCGTTCCCGCAGTTGTCGG |
| | 101 | ATTGGGTTGGTCCCTCGACA |
| | 102 | CGAGTGGGAATAAGGAGGTG |
| Coxiella burnetii | 103 | GGGGATTAGTAAACGCGGCA |
| | 104 | ATGTTAAGGACGTTATTGAT |
| | 105 | GCGCCCGTGCGCTATTGCGT |
| | 106 | AAAAAATAAAACGGATAAAA |
| | 107 | CTGTGGTTAAAAGCACTCAT |
| | 108 | GCCGCGGAATGAATCGCGCT |

TABLE 2-continued

| Microorganism | SEQ ID NO: | DIANA Sequence |
|---|---|---|
| | 109 | GGCGTTAGCGAATAAAAATG |
| | 110 | ATCATTTGGGCGCTTTTAAC |
| | 111 | AAGAAACGTATCGCTGTGGC |
| | 112 | AACACCGCCGTGGGTAAAAA |
| | 113 | ATTAACAAAAGGAGACACAC |
| | 114 | GAGTTCGAAACAATGAGGGC |
| | 115 | AAAGTAAGGTAAAACCTGAG |
| | 116 | TTAAGCTGATTCATACGGTG |
| | 117 | GTGAAGCCGATAGCCCGATA |
| | 118 | CAACCTTGCATAATTCATCA |
| | 119 | CCAATGGTGGCCAATTTAAA |
| | 120 | ATGCCGGATATACGAATGCA |
| | 121 | TTTCTTTTCATCAAAACTGA |
| | 122 | GACAACAAGGGTGGGTCCAT |
| | 123 | TATGCAGCGAAGCGGAATAC |
| | 124 | TGAAATCATTTTCTCCGTAT |
| Cardiobacterium hominis | 125 | GAACGAAACGATGGAGCTT |
| | 126 | AAACGATGGAGCTTGCTCCA |
| | 127 | TGGAGCTTGCTCCAGGCGTC |
| | 128 | TTGCTCCAGGCGTCGAGTGG |
| | 129 | TGGGAATCTGCCTTTTGCTG |
| | 130 | TCTGCCTTTTGCTGGGGGAT |
| | 131 | TTTTGCTGGGGGATAACGTA |

Table 3 Shows DIANA Sequences for Identifying Microorganisms Commonly Associated with Neonatal Sepsis

TABLE 3

| Microorganism | SEQ ID NO: | DIANA Sequence |
|---|---|---|
| Listeria monocytogenes | 132 | TAATACCGAATGATAAAGTG |
| | 133 | CGAATGATAAAGTGTGGCGC |
| | 134 | ATAAAGTGTGGCGCATGCCA |
| | 135 | TGTGGCGCATGCCACGCTTT |
| | 136 | GCATGCCACGCTTTTGAAAG |
| | 137 | CACGCTTTTGAAAGATGGTT |
| Neisseria meningitidis | 138 | AGGCTGTTGCTAATATCAGC |
| | 139 | TAATATCAGCGGCTGATGAC |
| Escherichia coli | 140 | GCATCTGATACTGGCA |

Table 4 Shows DIANA Sequences Commonly Associated with Antimicrobial Resistance

TABLE 4

| Target | SEQ ID NO: | DIANA Sequence |
|---|---|---|
| Gene(s) conferring resistance to antistaphylococcal | 141 | TGTCACTTTCAACATACAAT |
| | 142 | TGAAGAAATTGTATTTAAGG |
| | 143 | GTAACAGCACTTATTAATAA |
| | 144 | AATAAAACAGTGAAGCAACC |
| | 145 | TACGGATTGCTTCACTGTTT |
| | 146 | TTCATCTATATCGTATTTTT |
| | 146 | CCGTTCTCATATAGCTCATC |
| | 148 | CTTTACCTGAGATTTTGGCA |
| | 149 | GCTAGCCATTCCTTTATCTT |
| | 150 | TCTTTAACATTAATAGCCAT |
| | 151 | TGTTTGGATTATCTTTATCA |
| | 152 | TATAAACCACCCAATTTGTC |
| | 153 | GTTTCTCCTTGTTTCATTTT |
| | 154 | CTGCAGTACCGGATTTGCCA |
| | 155 | GTTTGCATAAGATCTATAAA |
| | 156 | TCTTTATGTGTTTTATTTAC |
| | 157 | TGTTTGGATTATCTTTATCA |
| | 158 | GTTGCATACCATCAGTTAAT |
| | 159 | GATATTTTCTTTGGAAATAA |

TABLE 4-continued

| Target | SEQ ID NO: | DIANA Sequence |
|---|---|---|
| | 160 | TTCTTCCAAACTTTGTTTTT |
| | 161 | CTTTTAATAAGTGAGGTGCG |
| | 162 | ATTGCCATTATTTTCTAATG |
| | 163 | TAGATTGAAAGGATCTGTAC |
| | 164 | TAATCAGTATTTCACCTTGT |
| | 165 | ACCTGAATCAGCTAATAATA |
| | 166 | TTATCTAAATTTTTGTTTGA |
| | 167 | GAGCATTATAAAATGGATAA |
| | 168 | TGGTATATCTTCACCAACAC |
| | 169 | TTTTTCATGCCTTTTTCAAA |
| | 170 | TACTGCCTAATTCGAGTGCT |
| | 171 | AGCAAAGAAAATGTTATCTG |
| | 172 | TCTATTGCTTGTTTTAAGTC |
| | 173 | TACCATTTACCACTTCATAT |
| | 174 | AACGTTGTAACCACCCCAAG |
| | 175 | TCTTTTTGCCAACCTTTACC |
| | 176 | TTTTATAACTTGTTTTATCG |
| | 177 | CTGGTGAAGTTGTAATCTGG |
| | 178 | GTTGAGCAGAGGTTCTTTTT |
| | 179 | TCGGTTAATTTATTATATTC |
| | 180 | TACTCATGCCATACATAAAT |
| | 181 | GACGTCATATGAAGGTGTGC |
| | 182 | AGTGCTAATAATTCACCTGT |
| | 183 | GGTGGATAGCAGTACCTGAG |
| | 184 | ATCATTTTTCATGTTGTTAT |
| | 185 | CTCTTTTGAACTTTAGCATC |
| | 186 | TTAGTTGAATATCTTTGCCA |
| | 187 | TTTCTTTTTCTCTATTAATG |
| | 188 | GCGATTGTATTGCTATTATC |
| | 189 | CGATTGTGACACGATAGCCA |
| | 190 | ATGTTGGAGCTTTTTATCGT |
| | 191 | TTTTCGAGTCCCTTTTTACC |
| | 192 | CTGCATCATCTTTATAGCCT |
| | 193 | TTCTTTTTGTTTTAATTCTT |
| | 194 | TTAATGGGACCAACATAACC |
| | 195 | GATGTGAAGTCGCTTTTTCT |
| | 196 | GAAGTCGCTTTTCCTAGAGG |
| | 197 | ATAGTTACGACTTTCTGTTT |
| | 198 | GTTGTAAGATGAAATTTTTT |
| | 199 | AATCACTTAAATATTCATCC |
| | 200 | AATCTCTTAAATATTCATCC |
| | 201 | TTTAACGGTTTTAAGTGGAA |
| | 202 | GTATCATCTTGTACCCAATT |
| | 203 | CCATTTGTTGTTTGATATAG |
| | 204 | AGAAATACTTAGTTCTTTAG |
| | 205 | GCTTTATAATCTTTTTTAGA |
| | 206 | TCTTTGGAACGATGCCTATC |
| | 207 | TGCTGTTCCTGTATTGGCCA |
| | 208 | ACATTGTTTCGGTCTAAAAT |
| | 209 | CACGTTCTGATTTTAAATTT |
| | 210 | ATGTATGCTTTGGTCTTTCT |
| | 211 | CCTGGAATAATGACGCTATG |
| | 212 | AATCTAACTTCCACATACCA |
| | 213 | TTTAACAAAATTAAATTGAA |
| | 214 | CGATCAATGTTACCGTAGTT |
| | 215 | TAATTTATATTGAGCATCT |
| | 216 | TTTTTTATTTTAGATACTT |
| | 217 | ATGAAAAAATTTATATTAG |
| | 218 | GTGTTCTAGTTCTTTTGCTA |
| | 219 | TAGTTCTTTTACTAATTATG |
| | 220 | AATAACTTGGTTATTCAAAG |
| | 221 | TTATTCAGAGATAACGATAT |
| | 222 | GATATTGAGAAAACAATTAG |
| | 223 | GAAAACAATTATTCTATTG |
| | 224 | TTGAAAAGGAAACTATAAC |
| | 225 | AAACTATAACAAGTATATA |
| | 226 | ATATAAAAATAGTTCAGAAA |
| | 227 | TAGTTCAGAAGCATCTAAAC |
| | 228 | AAACTGGCATATGGAGAAGA |
| | 229 | AGAAGAAATTATAGATAGGA |
| | 230 | TTGTAGATAGGAATAAAAAA |
| | 231 | CAAAGATTTAAGTGTCAATA |
| | 232 | AAAATTACTAATCATGAAAT |
| | 233 | CATAAAACTAAAAAAATCGG |
| | 234 | AAACTGGAAAAGATAAAAAG |
| | 235 | AGTTGATGTTAGATATAACA |
| | 236 | TGATGTTAAATATAACATAT |
| | 237 | ATGGAAATATACGCCGTAAT |
| | 238 | AAATATGGAACTATACGACG |
| | 239 | TTATGAAGAAAAGCATTGGA |
| | 240 | CACAATTAAACTTTATTTAT |
| | 241 | TGGACCAGGGAGTAATAATA |
| | 242 | TAAGCATTGGAAATTAGATT |
| | 243 | GGATTGAAAAATAGGCAAAA |
| | 244 | CCAGACGTAATAGTACCTGG |
| | 245 | AAAATGGACAGAAAATTAAT |
| | 246 | TAAAATCAGAACGAGGCAAA |
| | 247 | AACATTAAAATCAGAGCGAG |
| | 248 | ATAAAAGATAGAAATGGTAT |
| | 249 | GTATAGAGTTGGCTAAAACT |
| | 250 | TAGCTAAAACTGGAAATACA |
| | 251 | AATCGGTATTGTCCCTAACA |
| | 252 | GAAATACATACGAAATCGGT |
| | 253 | TAAAACACCCAAAAATAAGT |
| | 254 | CCCAAAGAAAAATATGATGA |
| | 255 | GACGATATTGCTCGTGGTTT |
| | 256 | CTCGTGACTTACAAATTGAT |
| | 257 | AGCTATAACCAATAAAGTTA |
| | 258 | AAATGGGTTCAGCCAGATTC |
| | 259 | AAAATGGGTACAGCCAGATT |
| | 260 | TACCAATTAAAAAGATAAAT |
| | 261 | AGATGAATATATAGACAAAT |
| | 262 | ATAAAAAGACGAATCTATAG |
| | 263 | AAATCATACAATTTACAAAT |
| | 264 | CTATAAAAAGCCGTGTTTAT |
| | 265 | AAATACTGTAAAAAGTCGTG |
| | 266 | GAACGAAGCAACAGTACACC |
| | 267 | TATCCATTGAATGAAGCAAC |
| | 268 | GGTTATGTGGGTCCAATTAA |
| | 269 | TATGTGGGCCCCATTAATTC |
| | 270 | ACGAGTTAAAAAGTAAGCAA |
| | 271 | TAAGCAATTTGGAAACTATA |
| | 272 | AAACTATAGCAAAAATACTG |
| | 273 | GGAAAAAAAGGCTTAGAACG |
| | 274 | AAAAAGGGGATTAGAGCGCC |
| | 275 | ATGATAAACAATTGCAAAAC |
| | 276 | TGGTTTTAAGGTATCCATTG |
| | 277 | TTTAGGGTATCCATTGCTAA |
| | 278 | ACTTATGACAATAAACCTTT |
| | 279 | ACTTACGATAATAAATCTTT |
| | 280 | CATTATTGGAGAAAAAGGCT |
| | 281 | AGAAAAAAGCTAAAACGGA |
| | 282 | CGGAAAAGATCTTCATTTAA |
| | 283 | AACAATAGATGCTAGGGTAC |
| | 284 | GATGCTAGAGTACAAGAAAG |
| | 285 | GTATTTATAATCATATGAAA |
| | 286 | ATAAACATATGAAAAATGAC |
| | 287 | AAAAATGACTTTGGATCTGG |
| | 289 | ATCTGGTACAGCATTACAAC |
| | 290 | ACTGGAGAATTTTAGCTTTT |
| | 291 | CAACCTAAAACTGGGGAAAT |
| | 292 | GTACCCCATCGTACGATGTT |
| | 293 | TACCCCTTCATATGATGTTT |
| | 294 | ATTCATGAATGGATTAAGCA |
| | 295 | TCATTAATGGAATTAGCAAT |
| | 296 | AATCATGATTATCATAAATT |
| | 297 | GACTACCGTAAATTAACTAA |
| | 298 | AAAAAGAGCCTTTGCTCAAC |
| | 299 | GAGCCGTTACTCAATAAATT |
| | 300 | TCAAATCACTACATCACCAG |
| | 301 | ACCCAAAAAATATTAACATC |
| | 302 | CTACATCACCGGGTTCAACC |
| | 303 | ATTAACGTCTATTATTGCCT |
| | 304 | TAGCCTTAAAAGAAAATAAA |
| | 305 | TAAACTAGACGACAATACTA |
| | 306 | CAAAAATACTAATTTTGATA |
| | 307 | GGTAAGGGTTGGCAAAAAGA |
| | 308 | TTATGGTAAAGGATGGCAAA |
| | 309 | CATGGGGAATTATAATATC |
| | 310 | GATGTATCTTGGGGAGATTA |
| | 311 | ATTTAAGTAGTAGACGGCA |
| | 312 | TAACAAGATTTAAAGTGGTA |
| | 313 | GATTTAAAGCAAGCAATGA |
| | 314 | GACGGTAAGATAGATTTAAA |

TABLE 4-continued

| Target | SEQ ID NO: | DIANA Sequence |
|---|---|---|
| | 315 | CAGACAACATATTTTTTGCC |
| | 316 | TTTTTTGCACGTATTGCATT |
| | 317 | TGCATTAGCATTAGGAGCCA |
| | 318 | TAGCTTTAGGAGCTAAAAAA |
| | 319 | TTTGAGCAAGGTATGCAAGA |
| | 320 | AAGATTTAGGTGTTGGTGAA |
| | 321 | GAATCGGTGAAAATATCCCG |
| | 322 | TCCCGAGCGATTACCCCTTT |
| | 323 | TTATCCCTTTTATAAAGCAC |
| | 324 | GCACAAATTTCAAATAGTAA |
| | 325 | TCAAATAGTAATTTAAAAAA |
| | 326 | TATTATTAGCAGATTCAGGA |
| | 327 | AAATAATGACATATTACTAG |
| | 328 | CCAAGGCGAGATACTAGTAA |
| | 329 | TACTAGTAAATCCTATACAA |
| | 330 | ATACAAATTTTATCAATATA |
| | 331 | AATTTTGTCAATCTACAGTG |
| | 332 | CTTTAGAAAATAACGGAAAT |
| | 333 | AAATAACGGAATATACAAA |
| | 334 | AAATCCTCATGTTTTACGTA |
| | 335 | TTACGTGAAACAAAGTCTCA |
| | 336 | AAATCTCAAATATGGAAAAA |
| | 337 | TTGGAAAAAGTCTATTATAT |
| | 338 | TTATACCTAAAAAAGACATA |
| | 339 | ATTAACTAATGGTATGGAAC |
| | 340 | ACGTGTAGTGACTAAAACAC |
| | 341 | GTTAATAAAACACATAGGGA |
| | 342 | TAGAGATGTATCTACAAAA |
| | 343 | TATACAAAAATTATGCCCGA |
| | 344 | CCCGAATTATAGGTAAATCT |
| | 345 | TGGTAAATCTGGCACAGCAG |
| | 346 | AAAATGAATCAAGGGGAAAC |
| | 347 | TGAAACAAGGTGAAACCGGA |
| | 348 | GACAAATAGGTTGGTTTGTT |
| | 349 | TAATAAAAATAATCCTAATA |
| | 350 | ATGATAAACATAACCCCAAT |
| | 351 | ATGGCGATTAATGTTAAAGA |
| | 352 | TATGCTAATGGCAATTAATG |
| | 353 | AAAATAAAGGGATGGCCAGC |
| | 354 | GGCTAGCTATAATGCTGCTA |
| | 355 | TGCTACTATATCTGGAAAAG |
| | 356 | GATGATTTGTATGATAATGG |
| | 357 | ATGATTTATATGATTATGGA |
| | 358 | CTCAATTTGATATAGATCAG |
| | 359 | CTAAATTTGACATAGATGAG |
| | 360 | GAAGCAATAGAATCATCAGA |
| | 361 | AATGAAATATTATTAGCAGA |
| | 362 | ATCACCAGGTTCAACCCAAA |
| | 363 | ATTTTACGATCCTGAATGTT |
| | 364 | CTTTAACGCCTAAACTATTA |
| | 365 | TTTTATCGGACGTTCAGTCA |
| | 366 | ACTTCACCATTATCGCTTTT |
| | 367 | TATAACTGCTATCTTTATAA |
| | 368 | TTTGAAATTTTTATCTTCAA |
| | 369 | TCAATAGTATTATTAATTTC |
| | 370 | CTTTTGAAGCATAAAAATAT |
| | 371 | AAACCCGACAACTACAACTA |
| | 372 | ATAAGTGGAACAATTTTTAT |
| Gene(s) conferring resistance to vancomycin | 373 | ATGAATAGAATAAAAGTTGC |
| | 374 | TGTTTGGGGGTTGCTCAGAG |
| | 375 | TGACGTATCGGTAAAATCTG |
| | 376 | GAGATAGCCGCTAACATTAA |
| | 377 | AAAAATACGAGCCGTTATAC |
| | 378 | AATTACGAAATCTGGTGTAT |
| | 379 | ATGTGCGAAAACCTTGCGC |
| | 380 | GGGAAAACGACAATTGCTAT |
| | 381 | TGTACTCTCGCCGGATAAAA |
| | 382 | CACGGATTACTTGTTAAAAA |
| | 383 | ATGAATATGAAATCAACCAT |
| | 384 | TGTAGCATTTTCAGCTTTGC |
| | 385 | AAGTCAGGTGAAGATGGATC |
| | 386 | AAGGTCTGTTTGAATTGTCC |
| | 387 | CCCTTTTGTAGGCTGCGATA |
| | 388 | AGCTCAGCAATTTGTATGGA |
| | 389 | CGTTGACATACATCGTTGCG |
| | 390 | TGCTGGGATAGCTACTCCCG |
| | 391 | TGGGTTATTAATAAAGATGA |
| | 392 | TGTTTTTGTTAAGCCGGCGC |
| | 393 | GGCTCATCCTTCGGTGTGAA |
| | 394 | TCAATAGCGCGGACGAATTG |
| | 395 | CGCAATTGAATCGGCAAGAC |
| | 396 | GACAGCAAAATCTTAATTGA |
| | 397 | CTGTTTCGGGCTGTGAGGTC |
| | 398 | TGCGGTATTGGGAAACAGTG |
| | 399 | TTAGCTGTTGGCGAGGTGGA |
| | 400 | TCAGGCTGCAGTACGGAATC |
| | 401 | TATTCATCAGGAAGTCGAGC |
| | 402 | AAAGGCTCTGAAAACGCAGT |
| | 403 | CCGTTCCCGCAGACCTTTCA |
| | 404 | GGAGCGAGGACGGATACAGG |
| | 405 | GCAAAAAAAATATATAAAGC |
| | 406 | GCTGTAGAGGTCTAGCCCGT |
| | 407 | TATGTTTTTACAAGATAACG |
| | 408 | ATTGTACTGAACGAAGTCAA |
| | 409 | TGCCCGGTTTCACGTCATAC |
| | 410 | TTATCCCCGTATGATGGCCG |
| | 411 | GGTATTGCACTTCCCGAACT |
| | 412 | ACCGCTTGATCGTATTAGCG |
| | 413 | GGCTGTGATATTCAAAGCTC |
| | 414 | GGCTGCGATATTCAAAGCTC |
| | 415 | AAAAATCTTAATTGAGCAAG |
| | 416 | TGATTACATTGGCGTTAAAG |
| | 417 | TGATTACATTGGCGATAAAG |
| | 418 | ATTTCGGTCTGTGAGGTCGG |
| | 419 | CGAGCCGGAAAAGGCTCTG |
| | 420 | ATGAATAGAATAAAAGTCGC |
| | 421 | ATGAATAAAATAAAAGTCGC |
| | 422 | GTCGCAATCATCTTCGGCGG |
| | 423 | GTCGCAATTATCTTCGGCGG |
| | 424 | GTCGCAACTATCTTCGGCGG |
| | 425 | TCTTCGGCGGTTGCTCGGAG |
| | 426 | TGATGTGTCGGTAAAATCCG |
| | 427 | GAAATTGCTGCGAACATTGA |
| | 428 | GAACATTGATACGGAAAAAT |
| | 429 | GAACATTAATACTGAAAAAT |
| | 430 | AAAAATTCGATCCGCACTAC |
| | 431 | AATTACAAAAACGGTGTAT |
| | 432 | AATTACAAAAACGGCGTAT |
| | 433 | CTATGCAAGAAGCCATGTAC |
| | 434 | GGGAAGCCGACAGTCTCCCC |
| | 435 | GGGAAGCCGATAGTCTCCCC |
| | 436 | ATACTCTCCCCGGATAGGAA |
| | 437 | ATATTCTCCCCGGATAGGAA |
| | 438 | GCATGGGCTGCTTGTCATGA |
| | 439 | GCATGGTCTGCTTGTCATGA |
| | 440 | AAAGCGAATACGAAACACGG |
| | 441 | AAAGAGAATACGAAACTCGG |
| | 442 | GCGTATTGATGTGGCTTTCC |
| | 443 | GCGTATTGACGTGGCTTTCC |
| | 444 | GGCTTTCCCGGTTTTGCATG |
| | 445 | AAATGCGGGAGGATGGTGC |
| | 446 | AGGGGCTGTTTGTATTGTCT |
| | 447 | AGGGTCTGTTTGAATTGTCT |
| | 448 | CTATGTGGGCTGTGATATTC |
| | 449 | CTATGTAGGCTGCGATATTC |
| | 450 | TCCGCAGCTTGCATGGACAA |
| | 451 | TGGCCTACATTCTTACAAAA |
| | 452 | GGGCATCGCCGTTCCCGAAT |
| | 453 | GGGCATCGCCGTCCCCGAAT |
| | 454 | TTCAAATGATTGATAAAGGT |
| | 455 | TTCAAATTATTGATAAAGGT |
| | 456 | TTCAAATGATTGAAAAAGGT |
| | 457 | CAAGCCGGAGGCGGGTGCGC |
| | 458 | CAAACCGGAGGCGGAGGACA |
| | 459 | AGGCGGGTGCGCTTACCTAC |
| | 460 | CTTTGTGAAGCCGGCACGGT |
| | 461 | TCGTCCTTTGGCGTAACCAA |
| | 462 | GATAGAAGCGGCAGGACAAT |
| | 463 | GATAGAAGCAGCAGGACAAT |
| | 464 | GAAAATCTTAATTGAGCAA |
| | 465 | CTGTGAGGTCGGGTGTGCGG |
| | 466 | CTGTGAGGTCGGCTGCGCGG |
| | 467 | GGTCATGGGAAACGAGGATG |

TABLE 4-continued

| Target | SEQ ID NO: | DIANA Sequence |
|---|---|---|
| | 468 | GGTCATGGGGAACGAGGATG |
| | 469 | ATTGTCGGCGAAGTGGATCA |
| | 470 | CCGGCTGAGCCACGGTATCT |
| | 471 | CCGGTTGAGCCACGGTATCT |
| | 472 | CCATCAGGAAAACGAGCCGG |
| | 473 | GGCTCAGAAAATGCGATGAT |
| | 474 | GGCTCAGAGAATGCGATGAT |
| | 475 | ATTACAGTTCCCGCAGACAT |
| | 476 | ATTATCGTTCCAGCAGACAT |
| | 477 | ATCACGCTTCCTGCACTGAT |
| | 478 | ATCACGCTTCCCGCACTAAT |
| | 479 | ACATTCCGGTCGAGGAACGA |
| | 480 | ATCGGGTGCAAGAGACGGCA |
| | 481 | ATCGGGTGCAAGAAACGGCA |
| | 482 | ATCGGGTGCAGGAAACGGCA |
| | 483 | AAGAAAGTATATCGGGTGCT |
| | 484 | GCAGAGGGCTTGCCCGTGTT |
| | 485 | GCAGAGGGCTTGCTCGTGTT |
| | 486 | TTTTTTGCAGGAGGATGGCG |
| | 487 | GTTCTAAATGAGGTCAATAC |
| | 488 | GTTCTAAACGAGGTCAATAC |
| | 489 | CAATACCATGCCCGGTTTTA |
| | 490 | CAATACCATGCCAGGTTTTA |
| | 491 | TACCCACGTATGGTGGCCGC |
| | 492 | TATCCACGCATGGCGGCTGC |
| | 493 | TACCCACGTATGATGGCCGC |

Table 5 Shows DIANA Sequences for Identifying Fungi

TABLE 5

| Target | SEQ ID NO: | DIANA Sequence |
|---|---|---|
| Candida parapsilosis | 494 | GGTATCAGTATTCAGTAGTC |
| | 495 | AGTATTCAGTAGTCAGAGGT |
| | 496 | CAGTAGTCAGAGGTGAAATT |
| | 497 | CAGAATGAAAGTGCTTAAC |
| | 498 | TGCATTTTTTCTTACACATG |
| | 499 | GGTAGGCCTTCTATATGGGG |
| | 500 | TAATGTCAACCGATTATTTA |
| Candida tropicalis | 501 | GGCCGGTCCATCTTTCTGAT |
| | 502 | TCCATCTTTCTGATGCGTAC |
| | 503 | TTTCTGATGCGTACTGGACC |
| | 504 | CTGATTTGCTTAATTGCACC |
| | 505 | ACATGTGTTTTTATTGAAC |
| | 506 | AAATTTCTTTGGTGGCGGGA |
| | 507 | GCAATCCTACCGCCAGAGGT |
| | 508 | TATAACTAAACCAAACTTTT |
| | 509 | TATTTACAGTCAAACTTGAT |
| | 510 | TTATTATTACAATAGTCAAA |
| Candida auris | 511 | GGGTTTTGGAGGGAGGTCCA |
| | 512 | GGGAGGTCCACCTCACGGTG |
| | 513 | CCTCACGGTGAGTACTTCCA |
| | 514 | GTACTTCCATATCCAAGACC |
| | 515 | TATCCAAGACCTTTCCTCTG |
| | 516 | CTTTCCTCTGCTTCCTCGCA |
| | 517 | TGATATTTTGCATACACACT |
| | 518 | TGATTTGGATTTTAAAACTA |
| | 519 | AACCCAACGTTAAGTTCAAC |
| | 520 | CTAAAACAAAAACATAAAAC |
| Candida lusitaniae | 521 | TCCTCCTCCTCTTAGCAATA |
| | 522 | CTTAGCAATAAGAGGAGGAC |
| | 523 | AGAGGAGGACTGTTACTTTG |
| | 524 | AAAAATACATTACACATTGT |
| | 525 | TGTTTTTGCGAACAAAAAA |
| | 526 | AAATAAATTTTTTTATTCGA |
| | 527 | TTCGAATTTCTTAATATCAA |

TABLE 5-continued

| Target | SEQ ID NO: | DIANA Sequence |
|---|---|---|
| Candida kefyr | 528 | CTTTGGGTCTGGTTGGCCGG |
| | 529 | CCGGTCCGATTTTATGTCGC |
| | 530 | TCGCGCACTGGTTTTCAACC |
| | 531 | AACCGGATCTTTCCTTCTGG |
| | 532 | CTGGCTAACCTGTACTCCTT |
| | 533 | CCTTGTGGGTGCAGGCGAAC |
| | 534 | AGCAGGCGAAAGCTCGAATA |
| | 535 | GATCGTCTGAACAAGGCCTG |
| | 536 | GCCAGTTCTTGATTCTCTGC |
| | 537 | AGTTTTCTATTTCTCATCCT |
| | 538 | AACAATATTTTGTATTATGA |
| | 539 | CTATTATACTATAAAATTTA |
| Candida guilliermondii | 540 | TGGCTAACCATTCGCCCTTG |
| | 541 | GAAATTCTTAGATTTACTGA |
| | 542 | TTAATTATTTTTACAGTTAG |
| | 543 | ATTTTTACAGTTAGTCAAAT |
| | 544 | ACAGTTAGTCAAATTTTGAA |
| Candida rugosa | 545 | TTCGACGCATCTGAGGGGTC |
| | 546 | GGTGCGTACTCTGAGGGTGC |
| | 547 | GCGCCTTGCGGCAAGCCAGA |
| | 548 | AACAACAATACAACTTTGTG |
| | 549 | TGTGTCTGAACAATAACTTC |
| | 550 | CTTCAAGTACCGATCATCAA |
| | 551 | CATCAAATTGTTAAAACAAA |
| Candida famata | 552 | AGTATTCTTTTTGCCAGCGC |
| | 553 | TTAATTGCGCGGCGAAAAAA |
| | 554 | CCTTACACACAGTGTTTTTT |
| | 555 | GTTATTACAAGAACTTTTGC |
| | 556 | TTTGGTCTGGACTAGAAATA |
| | 557 | GTTTGGGCCAGAGGTTTACT |
| | 558 | GAACTAAACTTCAATATTTA |
| | 559 | TATTGAATTGTTACTTATTT |
| | 560 | AATTGTCAATTTGTTGATTA |
| | 561 | AATTCAAAAAATCTTCAAAA |
| Candida norvegensis | 562 | CTGTGATTTAAACTTCTTTC |
| | 563 | TTACACCGCGTGAGCGCACA |
| | 564 | ACAACACCTAAACACGAATA |
| | 565 | ACCATGTCACCCAGAGAAAA |
| | 566 | AAATCTCAAACGAGAAGAAA |
| Candida inconspicua | 567 | TGTGATTTTAACATCTTTAC |
| | 568 | ACACTGCGTGAGCGCACAAC |
| | 569 | ACAACACCTAAACATGAATA |
| | 570 | TACTTACTAGTCACTAAGAA |
| | 571 | GAAAAATCTAAAAGAAATAA |

In some embodiments, the preferred DIANA oligomer is between 7-20 bases in length (i.e. 7-20 mer). In other embodiments, the preferred DIANA oligomer is between 12-18 bases in length (i.e. 12-18 mer).

In some embodiments, the DIANAs provided herein comprise a sequence that is the complement, reverse, or reverse complement of a sequence described in Tables 1-5. In some embodiments, the DIANAs provided herein comprise a sequence that shares at least about 60-70% identity with a sequence described in Tables 1-5, or the complement, reverse, or reverse complement of a sequence described in Tables 1-5. In another embodiment, the DIANA has a sequence that shares at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% identity with the sequences of Tables 1-5, or the complement, reverse, or reverse complement of a sequence described in Tables 1-5. The terms "identity" or "homology" or "similarity" refer to sequence relationships between two DIANA sequences and can be determined by comparing a nucleotide position in each sequence when aligned for purposes of comparison. The term "identity" refers to the degree to which nucleic acids are the same between two sequences. The term "homology" or "similarity" refers to the relatedness of two functionally-equivalent DIANA sequences.

The DIANA sequences also include functional fragments of the sequence provided in Tables 1-5 and sequences sharing certain sequence identities with those in Tables 1-5, as described above, provided they function to specifically anneal to and identify microorganisms. In one aspect, these fragment sequences have 1, 2, 3, 4, 5, or 6 less bases at either or both ends of the original sequences in Tables 1-5. These shorter sequences are also within the scope of the present disclosure.

In addition, the DIANA sequences, including those provided in Tables 1-5 and sequences sharing certain sequence identities with those in Tables 1-5, as described above, can be incorporated into longer sequences, provided they function to specifically anneal to and identify microorganisms. In one aspect, the longer sequences have 1, 2, 3, 4, 5, 6, 7, 8, 9, or 10 additional bases at either or both ends of the original sequences. These longer sequences are also within the scope of the present disclosure.

In some embodiments, the DIANA oligomer may include one or more artificial nucleobases such as, but not limited to pseudo-cytosines, guanidinium G-clamps, diaminopurines, inosines, etc. It is to be understood, that those skilled in the art may utilize artificial or unnatural bases for a number of reasons. Notwithstanding the above, it is the base-pairing rules which dictate if binding (invasion) will occur or not. It is thus to be understood that, in a non-limiting example, the use of a pseudo-cytosines in a DIANA oligomer in place of a cytosine is defined as a homologous sequence.

In some embodiments, ssDNA are targeted rather than dsDNA. In some embodiments, ssDNA are created from dsDNA via denaturing protocols or through an asymmetric amplification process prior to DIANA tagging of the DNA molecule.

In some embodiments the DNA is entirely in duplex form. In some embodiments, the DNA is locally in duplex form.

In some embodiments, the DIANA oligomer is modified to contain a one or more binding moieties. In some embodiments, the binding moiety binds the DIANA to a solid substrate. In some embodiments, the binding DIANA to a solid substrate is useful for separation or washing steps downstream. By way of example, but not by way of limitation, in some embodiments, the binding moieties include, but are not limited to, non-covalent binding moieties (e.g., such as biotin, digoxin, digitoxin) or covalent binding moieties (e.g., COOH group, NHS-ester group, malemide chemistry, and Click chemistry).

In some embodiments, the binding moiety is spaced from the DIANA probe by one or more linkers. In some embodiments, the linker is a single molecule. In some embodiments the linker is comprised of a chain of multiple individual molecules, either linear or branched, that are combined to create a single linker molecule.

In some embodiments, the linker length is between about 20 to 200, about 40 to 180, about 60 to 160, about 80 to 140, or about 100 to 120 atoms. In some embodiments, the linker length is at least 40 atoms. The disclosed linker lengths are not commonly used in the art.

In some embodiments, one or more binding moieties are used along a single linker. In some embodiments, two or more binding moieties along a single linker, wherein each linker has one or more binding moieties and wherein each binding moiety is attached to a different location along the oligomer. In some embodiments, multiple binding moieties increase the surface binding kinetics and/or yield and/or efficiently, and/or strength.

In some embodiments, the DNA amplicon is first tagged with one or more DIANAs and then the hybrid complex is captured onto the solid-phase surface.

In some embodiments, the DIANA is incubated with a solid surface prior to capturing the microbial genetic material DNA.

In some embodiments, the solid-phase surface is a bead, nanoparticle, microparticle or flat substrate. In some embodiments, the solid-phase surface is further chemically modified to facilitate binding of the DIANA to it. In some embodiments, capturing a target amplicon and immobilizing it onto the solid-phase surface occurs in individuals wells or chambers on system (e.g., a plate or a chip).

In some embodiments, a well is activated with more than one DIANA probe for a single pathogen; for example, the detection region for *Staphylococcus aureus*. In some embodiments, one or more probes in a single well may be used for multiple pathogens; for example, a single well for *Staphylococcus aureus, Enterococcus faecalis*, and *Candida albicans*.

As used herein, "atom" refers to a carbon atom, a nitrogen atom, an oxygen atom, or any atom capable of making two or more covalent bonds. Alternatively, in some embodiments, "atom" refers to the distance between two covalently bound atoms. By way of example, but not by way of limitation, the following structure: DIANA-$(CH_2)_{40}$-(binding moiety) has a linker ($-(CH_2)_{40}-$) with a length of 40 atoms. By way of example, but not by way of limitation, the following structure: DIANA-$(CH_2)_{40}$—O—$(CH_2)_{40}$-(binding moiety) has a linker ($-(CH_2)_{40}$—O—$(CH_2)_{40}-$) with a length of 81 atoms. By way of example, but not by way of limitation, the following structure: DIANA-$(CH_2)_{40}$—O—NH—$(CH_2)_{30}$-(binding moiety) has a linker ($-(CH_2)_{40}-$O—NH—$(CH_2)_{30}-$) with a length of 72 atoms. By way of example, but not by way of limitation, the following structure: DIANA-$(CH_2)_{40}$—O—N$(CH_2)_3CH_3$—$(CH_2)_{30}$-(binding moiety) has a linker ($-(CH_2)_{40}$—O—N$(CH_2)_3CH_3$—$(CH_2)_{30}-$) with a length of 72 atoms (the $-(CH_2)_3CH_3$ component branches off of the nitrogen atom and does not contribute to the length of the linker).

Microbial Genetic Material

The methods, assays, and kits disclosed herein are directed to detecting binding of DIANAs to microbial genetic material. As is used herein, "microbial genetic material" comprises polynucleotides of microorganisms. Polynucleotides includes any compound and/or substance that comprises a polymer of nucleotides (nucleotide monomer). Polynucleotides include, for example, deoxyribonucleic acid (DNA) and ribonucleic acid (RNA). Exemplary polynucleotides of a microorganism include, e.g., genomic DNA, plasmid DNA, mRNA, tRNA, rRNA, and sRNA.

In some embodiments, microbial genetic material is from a bacterial cell. In some embodiments, the microbial genetic material is from a Gram positive bacterial cell. In some embodiments, the microbial genetic material is from a Gram negative bacterial cell. In some embodiments, the microbial genetic material is from a fungal cell.

Samples and Sample Collection

In some embodiments, the sample is about 1 µl, 10 µl, 20 µl, 30 µl, 40 µl, 50 µl, 60 µl, 70 µl, 80 µl, 90 µl, 100 µl, or any amount between any two of the previously listed amounts. In some embodiments, the sample is between about 100 µl to 2.5 ml, about 200 µl to 2 ml, about 300 µl to 1.5 ml, about 400 µl to 1 ml, or about 500 µl to 750 µl. In some embodiments, the sample is between about 0.5 ml to 10 ml, about 1 ml to 9 ml, about 2 ml to 8 ml, about 3 ml to 7 ml, or about 4 ml to 6 ml. In some embodiments, the sample is between about 1.0 ml to 3 ml. In some embodiments, the sample is between about 0.1 ml to 1.0 ml. In some embodiments, larger sample volumes provide greater sensitivity to microorganisms present at low concentrations.

In some embodiments, smaller sample volumes can be used, for example, when testing for neonatal septicemia. In some embodiments, the sample is about 0.5 ml to about 1.5 ml. In some embodiments, sample is about 0.1 ml to about 1.0 ml. In some embodiments, the sample is about 0.1 ml, about 0.2 ml, about 0.3 ml, about 0.4 ml, about 0.5 ml, about 0.6 ml, about 0.7 ml, about 0.8 ml, about 0.9 ml, about 1.0 ml, about 1.1 ml, about 1.2 ml, about 1.3 ml, about 1.4 ml, about 1.5 ml, about 1.6 ml, about 1.7 ml, about 1.8 ml, about 1.9 ml, or about 2.0 ml.

In some embodiments, the sample is from a subject. Subjects include, but are not limited to, mammals, avians, reptiles, insects, amphibians, and fish. In some embodiments, a mammalian subject is human. In some embodiments, the subject is an adult human. In some embodiments, the subject is a child human (i.e., 2-16 years of age). In some embodiments, the subject is an infant (i.e., under 2 years of age).

In some embodiments, the subject has or is suspected of having an infection, e.g., a microbial infection. Examples of microbial infections include, for example, sepsis, e.g., infective endocarditis, and neonatal septicemia. Other examples of microbial infections include, but are not limited to pneumonia, urinary track infections, joint infections, spinal fluid infections, etc.

In some embodiments, the microbial cells in the sample or suspected of being in the sample, include, but are not limited to bacterial cells, fungal cells, viral particles, or a combination thereof.

In some embodiments, the sample comprises a bodily fluid, bodily excretion, or bodily secretion, e.g., blood, urine, saliva, stool, or sputum. In some embodiments, samples are comprised of human blood. In some embodiments, it is advantageous to utilize whole-blood or unprocessed blood as this removes the need to separate the blood into its various components, a rather laborious process.

In some embodiments, the methods described herein comprise acquiring a sample from a subject.

For assays in blood, microbial loads can be low and the potential for contaminations is a serious concern. Contaminations may come in the form of free nucleic acids or microbes (microorganisms). Contaminating microbes may come from many sources, including the patient's skin, healthcare provider, hospital equipment, etc. Provided herein are improved methods for collecting blood samples. Without wishing to be bound by theory, collecting more than one blood sample in the same draw, for example, by collecting multiple vials of blood in sequence, from the same blood-draw, or intravenous line, can allow for reduced levels of contamination in the second and additional samples because the contaminants will be contained in the first sample. This reduction in the level of contaminants likewise results in improved performance in the assays described herein. In some embodiments, acquiring a sample from a subject comprises drawing one or more vials of blood from a subject, preferably from the same blood-draw, or intravenous line. In some embodiments, the blood is drawn from a single line in the subject, e.g., a peripheral blood line or from an IV line.

In some embodiments, more than one vial of blood are drawn from the patient from the same line. Without wishing to be bound by theory, the use of two or more sample tubes for collecting the patient blood is advantageous for, among other things, reducing false-positives, increasing sensitivity, and increasing accuracy. In some embodiments, the first vial of blood is not used in the assay described herein. In some embodiments, the first vial of blood is discarded or used for alternate purposes.

In some embodiments, the vial to be used in the methods described herein contains an anticoagulant such as, for example, EDTA, which is the preferred anticoagulant to be used in the test disclosed here. In some embodiments, a volume between about 0.05-5 ml of blood is collected into the first blood vial (that which is not tested). In some embodiments, the blood volume to be tested is between about 1-10 ml. In other embodiements the blood volume to be tested is between about 1.5 ml and 25 ml.

Integrated Methods for Identifying and Evaluating Microbial Species Using DIANAs In some embodiments, the present technology provides a method for monitoring and/or identifying and/or characterizing microbial cells in a subject. In some embodiments, the method includes one or more of the following steps: (i) depleting eukaryotic DNA from the sample, (ii) lysing one or more microbial cells in the sample, wherein the lysing of one or more microbial cells releases a plurality of microbial genetic materials, (iii) isolating the plurality of microbial genetic materials, (iv) amplifying the plurality of microbial genetic materials, (v) contacting or incubating the amplified microbial genetic materials with a plurality of duplex DNA Invading Artificial Nucleic Acids (DIANAs), and (vi) detecting binding of one or more DIANAs to their target microbial genetic material.

In some embodiments, all of steps (i)-(vi) are performed. In some embodiments, some of steps (ii)-(v) are performed. By way of example, but not by way of limitation, in some sample matrices, it might be possible to skip step (i) because of the relatively low concentration of eukaryotic cells. For example, certain samples, e.g., urine, commonly do not require step (i) because of the low concentration of eukaryotic cells. In another non-limiting example, it might be possible to skip step (i) if the concentration of microbial cells is high enough to allow the user to utilize a smaller sample volume such that the human DNA in the eukaryotic cells is not of sufficient quantity to hinder/inhibit/reduce sensitivity/etc of downstream processes such as, but not limited to, enzymatic amplifcation.

Depleting Eukaryotic DNA in a Sample

In some embodiments, the methods described herein comprise depleting eukaryotic DNA in a sample.

In some embodiments, for example, but not limited to, when the patient sample does not undergo preprocessing steps such as centrifugation, the first step in the procedure is to selectively remove the human DNA from the specimen through a selective lysis process employing osmotic stress, a combination of non-ionic detergents, and ion exchange resins as described in WO 2016/044621A1, the entirety of which is incorporated herein.

In some embodiments, depleting eukaryotic DNA from the sample includes adding a eukaryotic cell lysis solution to the sample, wherein the eukaryotic cell lysis solution predominantly lyses eukaryotic cells as opposed to microbial cells and removing the eukaryotic DNA released by the lysis of the eukaryotic cells from the sample, wherein one or more intact microbial cells remain in the sample. In some embodiments, the method includes terminating the eukaryotic cell lysis reaction.

Lysis of Eukaryotic Cells

In some embodiments, the eukaryotic cell lysis agent is a solution (hereinafter "a eukaryotic cell lysis solution"). Alternatively, in some embodiments, the eukaryotic cell lysis agent is pelleted and re-suspended in water or an aqueous buffer prior to use.

In some embodiments, the eukaryotic cell lysis solution includes one or more detergents or surfactants. In some embodiments, the detergents or surfactants are non-ionic, anionic, cationic, zwitterionic, or non-detergent sulfobetaines. Detergents and surfactants, include, but are not limited to BigCHAP, Deoxy BigCHAP, Brij 35, Brij 58P, Cymal-1, Cymal-2, Cymal-5, Cymal-6, Decyl-β-maltopyranoside, n-Dodecyl-D-maltoside, n-Hexadecyl-β-D-maltoside, Undecyl-β-D-maltoside, Decyl-β-D-1-thiomaltopyranoside, Octyl-β-D-glucopyranoside, Decyl-β-D-1-thioglucopyranoside, Octyl-β-Dthioglucopyranoside, Digitonin, Dimethyldecylphosphine oxide (APO-10), Dodecyldimethylphosphine oxide (APO-12), IGEPAL CO-520, IGEPAL CO-630, and IGEPAL CO-720, N-Octanoyl-N-methylglucamine (MEGA-8), N-nonanoyl-N-methylglucamine (MEGA-9), N-Decanoyl-N-methylglucamine (MEGA-10), nonidet P40-substitute, Pluronic F-68, saponin, thesit, Triton X-100, Triton X-1 14, TWEEN 20, TWEEN 40, TWEEN 80, sodium cholate, Sodium deoxycholate, sodium glycocholate, sodium taurocholate, sodium taurodeoxycholate, N-1-lauroylsarcosine, lithium dodecyl sulfate, sodium dodecyl sulfate (SDS), hexadecyltrimethyl ammonium bromide (CTAB), trimethyl(tetradecyl) ammonium bromide (TTAB), ASB-14 (amidosulfobetaine-14), ASB-16 (amidosulfobetaine-16), C7BzO, CHAPS, CHAPSO, EMPIGEN BB, 3-(N,N-Dimethyloctylammonio) propanesulfonate inner salt (SB3-8), 3-(decyldimethylammonio)-propanesulfonate inner salt (SB3-10), 3-(dodecyldimethylammonio)-propanesulfonate inner salt (SB3-12), 3-(N,N-dimethylmyristylammonio)-propanesulfonate (SB3-14), 3-(N,N-dimethylpalmitylammonio)-propanesulfonate (SB3-16), 3-(N,N-dimethyloctadecylammonio)-propanesulfonate (SB3-18), 3-(1-pyridinio)-1-propanesulfonate (NDSB 201), and 3-(benzyldimethylammonio) propanesulfonate (NDSB 256).

By way of example, but not by way of limitation, in some embodiments, the eukaryotic cell lysis solution has a concentration of surfactants between about 0.27% to 15% v/v, between about 0.39% to 13% v/v, between about 0.45% to 12% (v/v), or between about 0.60% to 10% (v/v) of a Tween surfactant and/or between about 0.22% to 10% (v/v), between about 0.16% to 8.25% (v/v), or between about 0.44% to 6.75% (v/v) of Triton or IGEPAL. In some embodiments, the Tween surfactant is selected from the group consisting of Tween-20, Tween-40, and Tween-80. In some embodiments, the Triton is Triton X-100 or Triton X-114. In some embodiments, the IGEPAL is selected from the group consisting of IGEPAL CO-520, IGEPAL CO-630, and IGEPAL CO-720.

In some embodiments, the surfactants are stored individually in dry form and re-suspended prior to use.

By way of example, but not by way of limitation, in some embodiments, the eukaryotic cell lysis reaction (e.g., eukaryotic cell lysis solution combined with the sample (herein after the "mixture")) comprise a final concentration of surfactants between about 0.25% to 1% (v/v), between about 0.35% to 0.85% (v/v), between about 0.45% to 0.75% (v/v), or between about 0.55% to 0.65% (v/v) of a Tween surfactant and/or between about 0.15% to 0.65% (v/v), between about 0.25% to 0.55% (v/v), or between about 0.35% to 0.45% (v/v) of Triton or IGEPAL. In some embodiments, the Tween surfactant is selected from the group consisting of Tween-20, Tween-40, and Tween-80. In some embodiments, the Triton is Triton X-100 or Triton X-1 14. In some embodiments, the IGEPAL is selected from the group consisting of IGEPAL CO-520, IGEPAL CO-630, and IGEPAL CO-720.

In some embodiments, the detergent or detergents reduce the structural integrity of the eukaryotic cell.

In some embodiments, at least one anti-foaming agent is combined with the eukaryotic cell lysis solution. Anti-foaming agents include, but are not limited to, Antifoam A, Antifoam 204, Antifoam B, Antifoam C, Antifoam Y-30, Antifoam SE-15, and simethicone-based antifoams.

In some embodiments, the mixture contains less than about 0.15 M of monovalent salts. Without wishing to be bound by theory, in some embodiments, when the mixture contains less than about 0.15 M of monovalent salts there is an induction of osmotic stress. In some embodiments, the mixture includes between about 0.15 M to 0.75 M, about 0.2 M to 0.7 M, about 0.25 M to 0.65 M, about 0.3 M to 0.6 M, about 0.35 M to 0.55 M, or about 0.4 M to 0.5 M or monovalent salts.

In some embodiments, the volume ratio of the eukaryotic cell lysis solution to the sample is about 0.25:1, 0.5:1, 0.75:1, 1:1, 2:1, 3:1, 4:1, 5:1, 6:1, 7:1, 8:1, 9:1, 10:1, or any ratio between any two of these ratios.

In some embodiments, the eukaryotic cell lysis reaction is carried out at about room temperature. In some embodiments, the eukaryotic cell lysis reaction is carried out at between about 5° C. to 20° C., about 9° C. to 16° C., or about 12° C. to 13° C. In some embodiments, the eukaryotic cell lysis reaction is carried at temperatures between about 25° C. to 75° C., about 30° C. to 70° C., about 35° C. to 65° C., about 40° C. to 60° C., or about 45° C. to 55° C.

In some embodiments, the eukaryotic cell lysis reaction is carried out for between about 0.01-20 minutes, between about 0.1-9.0 minutes, between about 1.0-8.0 minutes, between about 2.0-7.0 minutes, between about 3.0-6.0 minutes, between about 4.0-5.0 minutes. In some embodiments, the eukaryotic cell lysis process is stopped after about 5 minutes.

In some embodiments, the eukaryotic cell lysis solution does not contain a buffering agent. In other embodiments, the eukaryotic cell lysis solution contains a buffering agent. Examples of buffering agents include, but are not limited to 2-(N-morpholino)ethanesulfonic acid (MES), 2-Bis(2-hydroxyethyl)amino-2-(hydroxymethyl)-1,3-propanediol (Bis-Tris), 3-(-morpholino)propanesulfonic acid (MOPS), 4-(2-hydroxyethyl)-1-piperazineethanesulfonic acid (HEPES), tris(hydroxymethyl)aminomethane) (TRIS), Sodium Phosphate, Potassium Phosphate, Sodium Acetate, Sodium Carbonate/Bicaronate buffers, Sodium Acetate, N-cyclohexyl-2-hydroxyl-3-aminopropanesulfonic acid (CAPSO), N-(2-Hydroxyethyl)piperazine-N'-(4-butanesulfonic acid) (HEPBS), N-methylpiperazine, piperazine, diethanolamine, and propane 1,3-diamino.

In some embodiments, the pH of the eukaryotic cell lysis reaction is between about a pH of 6 to 9. In some embodiments, the pH is at or near neutral. Selective lysis of eukaryotic cells at a pH between about 6 to 9 or near neutral is in contrast to current methods, which emphasize alkaline conditions for eukaryotic cell lysis reactions (e.g., at pH 9.5-14). In some embodiments, performing the eukaryotic cell lysis reaction at a pH between about 6 to 9 or near neutral is advantageous over current methods known in the art due to an increase in the viability and/or structural integrity of microbial cells in the presence of some surfactants.

In some embodiments, the methods for eukaryotic cell lysis reactions described herein are advantageous over current methods known in the art because the eukaryotic cell lysis reaction methods described herein are suitable for automation in an integrated device.

Termination of Lysis of Eukaryotic Cells

In some embodiments, the eukaryotic cell lysis reaction is terminated by adding a lysis termination solution that includes at least one electrolyte to the mixture (i.e., the eukaryotic cell lysis solution/sample combination). In some embodiments, the final concentration of the electrolyte in the reaction is between about 25 mM to 850 mM, about 100 mM to 750 mM, about 150 mM to 650 mM, about 200 mM to 550 mM, about 250 mM to 450 mM, or about 300 mM to 400 mM. Electrolytes that can be added to the lysis termination buffer include, but are not limited to, monovalent salts and divalent salts. In some embodiments, the termination of the eukaryotic cell lysis reaction using at least one electrolyte improves downstream processes that use anion-exchange resins (e.g., removal of eukaryotic DNA, isolation of microbial cells, lysis of microbial cells, or isolation of microbial genomic material).

In some embodiments, the electrolyte added to the lysis termination buffer comprises at least one monovalent salt. Monovalent salts include, but are not limited to sodium chloride, potassium chloride, potassium iodide, sodium iodide, lithium chloride, lithium iodide, potassium bromide, sodium fluoride, and potassium fluoride. In some embodiments, the monovalent salt alone is added to the mixture to terminate the lysis reaction. In some embodiments, no termination of the lysis process is required. In some embodiments, the lysis termination buffer has a pH below about 9. In some embodiments, the pH of the lysis termination buffer is between about 6 and 9. In some embodiments, the lysis termination buffer does not have a pH below 4.0 or above 11.0. In some embodiments, the lysis termination buffer has a pH at about neutral.

In some embodiments, the lysis termination buffer and mixture combination has a pH below about 9. In some embodiments, the lysis termination buffer and mixture combination has a pH between about 6 to 9. In some embodiments, the lysis termination buffer and mixture combination has a pH at about neutral. In some embodiments, maintaining the combination of the lysis termination buffer and mixture at a pH between about 6 to 9 or at about neutral improves downstream processing (e.g., removal of eukaryotic DNA, isolation of microbial cells, lysis of microbial cells, or amplification of microbial DNA) of the intact microbial cells.

Removing Eukaryotic DNA/RNA

In some embodiments, the separation of the eukaryotic genomic material from the intact microbial cells in the mixture or lysis termination buffer and mixture combination is performed through "selective capture" of eukaryotic genomic material or immobilization of the eukaryotic DNA without capturing or immobilization of the intact microbial cells, eukaryotic cellular debris, or other non-nucleic acid material. In some embodiments, the eukaryotic genomic material captured is eukaryotic DNA and/or RNA.

In some embodiments, an anion exchange resin is used to capture/immobilize eukaryotic genomic material. In some embodiments, an anion exchange resin is one or more weak anion-exchange resins (WAX). Examples of WAX include, but are not limited to, carboxymethyl (CM), diethylaminopropyl (ANX), diethylethanolamine (DEAE), Amberlite Ira67, Purolite A847, Amberlite Ira96, Amberlite IRA96SB, Dowex Marathon WBA, Dowex Upcore Mono WB-500, Purolite A835, Dowex Monosphere 77, and Dowex Monosphere 66. In some embodiments, the WAX resin contains at least one tertiary amine functional group.

In some embodiments, an anion exchange resin is one or more strong anion-exchange resins (SAX). Examples of SAX include, but are not limited to, —O—CH$_2$—CHOH—CH$_2$—O—CH$_2$—CHOH—CH$_2$—N$^+$(CH$_3$)$_3$, Amberjet Up4000, Amberjet 9000 OH, Amberlite FPA40 CI, and Dowex Upcore Mono MA-600. In some embodiments a SAX based resin contains a quaternary amine functional group.

In some embodiments, the anion exchange resin is a combination of at least one WAX and at least one SAX.

In some embodiments, the form of the anion exchange resin is selected from fibers, membranes, sorbents, gels, and filter paper. In some embodiments, the sample with the lysed eukaryotic cells is passed through or contacted with the anion exchange resin. In some embodiments, the anion exchange resin is in a solution.

In some embodiments, the anion exchange resin is conjugated to a support substrate.

Examples of a support substrate include, but are not limited to, a particle, a bead, a surface, or a sphere. In some embodiments, the support substrate is magnetic, e.g., a magnetic particle or bead. In some embodiments, the anion exchange resin is conjugated to a support substrate is in a solution.

In some embodiments, the support substrate comprises silica, glass, metal, polystyrene-based material, cellulose-based material, agarose-based material, dextran-based material, methacrylate-based material, sepharose-based material, or a combination thereof. In some embodiments, the support substrate is porous.

In some embodiments, the support substrate is a bead or sphere has a diameter between about 10 to 100 µm, between about 20 to 90 µm, between about 30 to 80 µm, between about 40 to 70 µm, or between about 50 to 60 µm.

In another embodiment, the support substrate is a bead or sphere have a diameter between about 0.01 to 10 µm, about 0.1 to 9.0 µm, about 1.0 to 8.0 µm, about 2.0 to 7.0 µm, about 3.0 to 6.0 µm, or between about 4.0 to 5.0 µm.

In some embodiments, the mixture is incubated with the anion exchange resin between about 0.1 to 10 minutes, between about 2 to 9 minute, between about 3 to 8 minutes, between about 4 to 7 minutes, or between about 5 to 6 minutes. In some embodiments, the mixture is incubated with the anion exchange resin between about 10 to 30 minutes, between about 12 to 28 minutes, between about 15 to 25 minutes, between about 18 to 23 minutes, or between about 19 to 22 minutes. In some embodiments, the mixture is incubated with the anion exchange resin for less than 1 minute.

In some embodiments, the anion exchange resin is permanently immobilized on the support substrate. In some embodiments, the immobilized anion exchange resin is contacted and/or incubated with the mixture and then the mixture is removed.

In some embodiments, at least one anion exchange resin conjugated to a support substrate, e.g., a bead or a particle, is contacted and/or incubated with the mixture. In some embodiments, after contacting and/or incubation with the mixture, the anion exchange resin conjugated to a support substrate is removed from the mixture. In another embodiment, after contacting and/or incubation with the mixture, the anion exchange resin conjugated to a support substrate is immobilized and the mixture is removed. By way of example, but not by way of limitation, in some embodiments, the anion exchange resin conjugated to a support substrate is selectively immobilized when the support substrate is a magnetized or metal bead and the magnetized or metal bead is exposed to a magnet or magnetic field.

In some embodiments, contacting and/or incubating the mixture with the anion exchange resin extracts eukaryotic DNA, e.g., human DNA (hDNA), and/or RNA from the mixture. In some embodiments, the eukaryotic DNA (and/or RNA) binds to the anion exchange resin. In some embodiments, the anion exchange resin extracts between about 5% to 100%, between about 10% to 99%, between about 15% to 85%, between about 20% to 80%, between about 25% to 75%, between about 30% to 70%, between about 35% to 65%, between about 40% to 60%, or between about 45% to 55% of the eukaryotic DNA (and/or RNA), e.g., hDNA, from the mixture. In some embodiments, the anion exchange resin extracts over 95% of the eukaryotic DNA from the mixture.

Lysing of Microorganisms

In some embodiments, wherein it is desirable to assay the panel listed in Tables 1-5 inclusive for bacteria and/or fungi, it is preferred to ensure that the microbial lysis step be effective on all targets. This process, as well as the process for preparing the reagents, is illustrated in detail in WO 2016/044621A1. In some embodiments, the mixture (or lysis termination solution and mixture combination) with the eukaryotic DNA removed (hereinafter "isolated microbial cell sample") contains one or more microbial cells. In some embodiments, the isolated microbial cell sample is subjected to further processing. In some embodiments, the isolated microbial cell sample is contacted with a microbial cell lysis solution.

In some embodiments, the microbial cells are lysed using a lysis solution including one or more chemical lysis agents. In some embodiments, the chemical lysis agents include, but are not limited to, cationic detergents, non-ionic detergents, zwitterionic detergents, and enzymes.

In some embodiments, the microbial lysis reaction is performed at a pH between about 6 to 9 or at a neutral pH.

In some embodiments, the microbial lysis solution also includes one or more of the following: enzymes, detergents, and other components such as salts, buffering agents, and metal chelators.

In some embodiments, multiple lysis solutions are used. In some embodiments, the multiple lysis buffers are added in a step wise fashion. In some embodiments, only a single microbial lysis solution is used.

In some embodiments, the microbial lysis reaction is heated to between about 15° C. to 50° C., about 20° C. to 45° C., about 25° C. to 40° C., or about 30° C. to 35° C. In some embodiments, the microbial lysis reaction is performed at room temperature.

In some embodiments, the microbial lysis solution includes one or more of the following enzymes or enzyme groups: lysozyme, lyticase, zymolyase, mutanolysin, and lysostaphin. In some embodiments, the one or more enzymes are stored in dry or pelleted form, where upon re-suspension of the respective enzyme, the enzyme reaches the concentrations identified below.

In some embodiments, the lysozyme concentration in the microbial lysis solution is between about 5 to 200 mg/ml, about 1 to 150 mg/ml, 5 to 175 mg/ml, about 15 to 140 mg/ml, about 20 to 100 mg/ml, about 30 to 95 mg/ml, about 45 to 75 mg/ml, about 50 to 62 mg/ml, or between any two of the previously disclosed concentrations.

In some embodiments, the lysozyme concentration in the microbial lysis reaction (e.g., a solution including the microbial lysis solution and the isolated microbial cell sample) is between about 0.01 to 1 mg/ml, about 0.1 to 10 mg/ml, 0.5 to 15 mg/ml, about 1 to 20 mg/ml, about 0.3 to 8 mg/ml, about 0.7 to 7 mg/ml, about 0.2 to 0.9 mg/ml, about 0.05 to 0.35 mg/ml, or between any two of the previously disclosed concentrations.

In some embodiments, the lyticase concentration in the microbial lysis solution is between about 500 to 50,000 U/ml, about 250 to 10,000 U/ml, 425 to 8,000 U/ml, about 300 to 6,000 U/ml, about 400 to 5,000 U/ml, about 1,000 to 4,750 U/ml, about 1,500 to 4,500 U/ml, about 2,000 to 6,500 U/ml, about 2,500 to 5,500 U/ml, about 3,000 to 15,000 U/ml, or between any two of the previously disclosed concentrations.

In some embodiments, the lyticase concentration in the microbial lysis reaction is between about 1 to 1000 U/ml, about 5 to 200 U/ml, 20 U to 800 U/ml, about 30 to 700 U/ml, about 40 to 600 U/ml, about 50 to 500 U/ml, about 60 to 400 U/ml, about 70 to 300 U/ml, about 80 to 200 U/ml, about 90 to 100 U/ml, or between any two of the previously disclosed concentrations.

In some embodiments, the zymolyase concentration in the microbial lysis solution is between about 500 to 50,000 U/ml, about 250 to 10,000 U/ml, 425 U to 8,000 U/ml, about 300 to 6,000 U/ml, about 400 to 5,000 U/ml, about 1,000 to 4,750 U/ml, about 1,500 to 4,500 U/ml, about 2,000 to 6,500 U/ml, about 2,500 to 5,500 U/ml, about 3,000 to 15,000 U/ml, or between any two of the previously disclosed concentrations.

In some embodiments, the zymolyase concentration in the microbial lysis reaction is between about 1 to 1000 U/ml, about 5 to 200 U/ml, 20 U to 800 U/ml, about 30 to 700 U/ml, about 40 to 600 U/ml, about 50 to 500 U/ml, about 60 to 400 U/ml, about 70 to 300 U/ml, about 80 to 200 U/ml, about 90 to 100 U/ml, or between any two of the previously disclosed concentrations.

In some embodiments, the mutanolysin concentration in the microbial lysis solution is between about 500 to 50,000 U/ml, about 250 to 10,000 U/ml, 425 to 8,000 U/ml, about 300 to 6,000 U/ml, about 400 to 5,000 U/ml, about 1,000 to 4,750 U/ml, about 1,500 to 4,500 U/ml, about 2,000 to 6,500 U/ml, about 2,500 to 5,500 U/ml, about 3,000 to 15,000 U/ml, or between any two of the previously disclosed concentrations.

In some embodiments, the mutanolysin concentration in the microbial lysis reaction is between about 1 to 1000 U/ml, about 5 to 200 U/ml, 20 to 800 U/ml, about 30 to 700 U/ml, about 40 to 600 U/ml, about 50 to 500 U/ml, about 60 to 400 U/ml, about 70 to 300 U/ml, about 80 to 200 U/ml, about 90 to 100 U/ml, or between any two of the previously disclosed concentrations.

In some embodiments, the lysostaphin concentration in the microbial lysis solution is between about 500 to 50,000 U/ml, about 250 to 10,000 U/ml, 425 U to 8,000 U/ml, about 300 to 6,000 U/ml, about 400 to 5,000 U/ml, about 1,000 to 4,750 U/ml, about 1,500 to 4,500 U/ml, about 2,000 to 6,500 U/ml, about 2,500 to 5,500 U/ml, about 3,000 to 15,000 U/ml, or between any two of the previously disclosed concentrations.

In some embodiments, the lysostaphin concentration in the microbial lysis reaction is between about 1 to 1000 U/ml, about 5 to 200 U/ml, 20 to 800 U/ml, about 30 to 700 U/ml, about 40 to 600 U/ml, about 50 to 500 U/ml, about 60 to 400 U/ml, about 70 to 300 U/ml, about 80 to 200 U/ml, about 90 to 100 U/ml, or between any two of the previously disclosed concentrations.

In some embodiments, one or more salts are added to the microbial lysis solution. In some embodiments, the concentration of the monovalents salts is between about 50 mM and 6 M, about 150 mM and 5 M, about 350 mM and 4.5 M, about 550 mM and 4 M, about 900 mM and 3.75 M, about 1 M and 3.5 M, or between any two of the previously disclosed concentrations. In some embodiments, the salt comprises one or more monovalent salts. By way of example, but not by way of limitation, in some embodiments, the monovalent salt is one or more of NaCl, KCl, and/or LiCl.

In some embodiments, the salt concentration in the microbial lysis reaction is between about 50 mM and 800 mM, about 100 mM and 700 mM, about 200 mM and 600 mM, about 300 mM and 500 mM, and about 350 mM and 450 mM, or between any two of the previously disclosed concentrations.

In some embodiments, the one or more monovalents salts is stored in dry or pelleted form, where upon re-suspension of the respective salt, the salt reaches the concentrations identified above.

In some embodiments, an enzymatic reaction time is between about 1-60 minutes, about 5-55 minutes, about 10-45 minutes, about 15-40 minutes, about 20-35 minutes, or about 25-30 minutes.

In some embodiments, DNA contaminants in the enzymatic reaction are removed or rendered non-amplifiable or unamplifiable. In some embodiments, removal of DNA is achieved using ion exchange resins.

In some embodiments, at least one DNA intercalating dye is added to the microbial lysis solution. In some embodiments, the DNA intercalating dyes are dyes that create a covalent bond to both DNA strands after activation with a light source of the appropriate wavelength and dosage. Without wishing to be bound by theory, in some embodiments, the covalent bond renders at least some of the DNA present in the sample unamplifiable. By way of example, but not by way of limitation, in some embodiments, the DNA intercalating dye include, but are not limited to, ethidium monoazide (EMA) and propidium monoazide (PMA).

In some embodiments, the concentration of the DNA intercalating dye in the microbial lysis solution is between about 0.01 μM to 1.0 μM, about 0.1 μM to 0.9 μM, 0.2 μM to 0.8 μM, about 0.3 μM to 0.7 μM, or about 0.4 μM to 0.6 μM, or between any two of the previously disclosed concentrations.

In some embodiments, the microbial lysis solution also includes one or more nucleases. In some embodiments, the nucleases are neutralized prior to usage of the microbial lysis solution. The exact nucleases used depend on the downstream sequences of interest. By way of example, but not by way of limitation, in some embodiments, the nucleases are selected from, but not limited to, EcoRI, HindIII, SaiI, HhaI, DdeI, RsaI, Sau3AI and MspI.

In some embodiments, the microbial lysis solution includes one or more detergents. In some embodiments, the detergent is a zwitterionic detergent. In some embodiments, the zwitterionic detergent is from the sulfobetaine families. By way of example, but not by way of limitation, in some embodiments, sulfobetaine detergents include, but are not limited to, N-Decyl-N,N-dimethyl-3-ammonio-1-propanesulfonate, N-Decyl-N,N-dimethyl-3-ammonio-1-propanesulfonate, N-Dodecyl-N,N-dimethyl-3-ammonio-1-propanesulfonate, N-Hexadecyl-N,N-dimethyl-3-ammonio-1-propanesulfonate, N-Octadecyl-N,N-dimethyl-3-ammonio-1-propanesulfonate, and 3-[N,N-Dimethyl(3-myristoylaminopropyl)ammonio]propanesulfonate.

In some embodiments, the detergents are a non-ionic detergent from the glucopyranoside family. By way of example, but not by way of limitation, in some embodiments, non-ionic glucopyranoside detergents include, but are not limited to, 3-acetylumbelliferyl b-D-glucopyranoside, N-amyl b-D-glucopyranoside decyl b-D-thioglucopyranoside, n-dodecyl b-D-glucopyranoside, hexadecyl b-D-glucopyranoside, hexyl b-D-glucopyranoside, methyl a-D-glucopyranoside, octyl b-D-glucopyranoside, and phenyl-a-D-glucopyranoside.

In some embodiments, the detergent is a cationic detergent. By way of example, but not by way of limitation, in some embodiments, cationic detergents include, but are not limited to, alkyltrimethylammonium bromide, hexadecyltrimethylammonium bromide, hexadecylpyridinium bromide, myristyltrimethylammonium bromide, benzyldodecyldimethylammonium bromide, hexadecyl(2-hydroxyethyl)dimethylammonium, hexadecylpyridinium chloride, hexadecyltrimethylammonium chloride, or tetrakis(decyl)ammonium bromide. In some embodiments, the concentration of cationic detergents is between about 1-100× critical micelle concentration (CMC).

In some embodiments, a single detergent from the sulfobetaine and glucopyranoside family is added to the microbial lysis solution. In some embodiments, one or more detergents from the sulfobetaine family and the glucopyranoside family are added to the microbial lysis solution. Additionally, or alternatively, in some embodiments, the microbial lysis solution includes one or more cationic detergents. By way of example, but not by way of limitation, in some embodiments, cationic detergents include alkyltrimethylammonium bromide, amprolium hydrochloride, benzalkonium chloride, benzyldimethyldodecylammonium chloride, benzyldimethyltetradecylammonium chloride, benzyldodecyldimethylammonium bromide, cetylpyridinium chloride, cetyltrimethylammonium bromide, dimethyldioctadecylammonium bromide, dodecylethyldimethylammonium bromide, dodecyltrimethylammonium bromide, ethylhexadecyldimethylammonium bromide, hexadecylpyridinium bromide, hexadecylpyridinium chloride, hexadecyltrimethylammonium bromide, methylbenzethonium chloride, myristyltrimethylammonium bromide, oxyphenonium bromide, tetraheptylammonium bromide, tetrakis(decyl)ammonium bromide, tetrakis(decyl)ammonium bromide, and tricaprylylmethylammonium chloride.

In some embodiments, the concentration of the individual detergent is dependent on the critical micelle concentration (CMC) of the specific detergent in the microbial lysis reaction. In some embodiments, each detergent concentration in the microbial lysis solution is between about 10 to 11,000, about 25 to 12,500, about 50 to 8,000, about 75 to 7,000, about 95 to 8,500, or about 98 to 6,750 times the CMC. In some embodiments, the detergent concentration in the microbial lysis solution is between about 100 to 5,000, about 125 to 9,000, about 200 to 8,000, about 400 to 7,000, or about 500 to 6,000 times the CMC.

In some embodiments, the detergent concentration in the microbial lysis solution is between about 100 to 1000, about 200 to 900, about 300 to 800, about 400 to 700, or about 500 to 600 times the CMC. In some embodiments, each detergent concentration in the microbial lysis reaction is between about 0.1 to 100, about 1.0 to 90, about 10 to 80, about 20 to 70, about 30 to 60, or about 40 to 50 times the CMC.

In some embodiments, the detergents (either as a group or individually, or any combination thereof) are stored in dry or pelleted form, where upon re-suspension of the respective detergent, the detergent reaches the concentrations identified above.

In some embodiments, the microbial lysis solution includes one or more metal chelators. By way of example, but not by way of limitation, in some embodiments, metal chelators include, but are not limited to, ethylene-glycol-tetra acetic acid (EGTA) and ethylenediaminetetraacetic acid (EDTA). In some embodiments, the concentration of the metal chelators in the microbial lysis solution is between about 50 mM to 1.0 M, about 100 mM to 0.75 M, about 110 mM to 500 mM, about 125 mM to 500 mM, about 125 mM to 450 mM, or between any two of the previously disclosed concentrations. In some embodiments, the concentration of the metal chelators in the microbial lysis reaction is between about 5 mM to 250 mM, about 10 mM to 100 mM, about 15 mM to 90 mM, about 20 mM to 80 mM, about 125 mM to 450 mM, or between any two of the previously disclose concentrations.

In some embodiments, the metal chelators are stored in dry or pelleted form, where upon re-suspension of the metal chelators, the metal chelators reach the concentrations identified above.

In some embodiments, the microbial lysis solution includes one or more reducing agents. By way of example, but not by way of limitation, in some embodiments, the reducing agent is 2-mercaptoethanol or dithiothreitol. In some embodiments, the concentration of the reducing agent in the microbial lysis solution is between about 10 mM to 20 M, about 15 mM to 15 M, about 50 mM to 14 M, about 100 mM to 14 M, or about 1 10 mM to 15 M, or between any two of the previously disclosed concentrations.

In some embodiments, the concentration of the reducing agent in the microbial lysis reaction is between about 1 mM to 100 mM, about 10 mM to 90 mM, about 20 mM to 80 mM, about 30 mM to 70 mM, about 40 mM to 60 mM, or about 45 mM to 55 mM, or between any two of the previously disclosed concentrations.

In some embodiments, the reducing agents are stored in dry or pelleted form, where upon re-suspension of the respective reducing agent, the reducing agent reaches the concentrations identified above.

In some embodiments, the microbial cell lysis reaction is performed at a pH below about 9. In some embodiments, the microbial cell lysis reaction is performed at a pH between about 6 to 9.

In some embodiments, the microbial cell lysis reaction is performed at about a neutral pH. In some embodiments, the microbial cell lysis methods disclosed herein, lead to the release of high molecular weight microbial DNA. Without wishing to be beyond by theory, in some embodiments, the microbial cell lysis methods disclosed herein lead to reduced shearing of microbial genetic materials during the microbial cell lysis and promote the presence of high molecular weight microbial DNA in the lysis solution. In some embodiments, high molecular weight microbial DNA is between about 2 kbp to 200 kbp, about 10 kbp to 190 kbp, about 20 kbp to 180 kbp, about 30 kbp to 170 kbp, about 40 kbp to 160 kbp, about 50 kbp to 150 kbp, about 60 kbp to 140 kbp, about 70 kbp to 130 kbp, about 80 kbp to 120 kbp, or about 90 kbp to 110 kbp.

Isolation of Microbial Genomic Material

Having lysed the microbial content of the blood-based solution, in some embodiments it is preferred to isolate or purify the microbial genomic-DNA (herein 'gDNA') from the non-DNA components of the sample. In contrast to the majority of current methods employing the addition of chaotropic salts to achieve the same, our preferred method entails the use of anion exchange resins for capturing free microbial gDNA, and washing away non-DNA components from the system. Upon elution, and in some embodiments, the isolated gDNA has the advantage of being of sufficient purity such that it does not need to be diluted prior to downstream enzymatic amplification.

In some embodiments, after microbial cell lysis, the microbial genetic material is isolated and/or purified. In some embodiments, the genetic material isolated and/or purified is RNA or DNA. In some embodiments, the DNA is single stranded DNA (ssDNA) or double stranded DNA (dsDNA).

In some embodiments, microbial genetic material is isolated by contacting the microbial lysis reaction solution with anion exchange materials packed into columns, wherein the anion exchange material is used for the adsorption and subsequent elution of microbial genetic material. In some embodiments, a solution of known ionic strength and pH enable binding of nucleic acids to the anion exchange column and enable lesser-bound contaminants to be washed away. By way of example, but not by way of limitation, in some embodiments, conditions for selectively binding microbial genetic material with anion exchange materials include contacting the microbial lysis reaction solution with anion exchange in one or more of the following conditions: the contacting reaction is performed at a pH of between about 6 to 9, about 4.5 to 7, or about 8 to 9.5, and the contacting reaction has a monovalent salt concentration of between about 100 mM to 750 mM, about 450 mM to 1.75 M, or about 50 mM to 350 mM. The bound genetic material may then be eluted after contaminants have been removed. In some embodiments, an anion exchange resin is used to capture/immobilize microbial genomic material. In some embodiments, an anion exchange resin is one or more weak anion-exchange resins (WAX). Examples of WAX include, but are not limited to, carboxymethyl (CM), diethylaminopropyl (ANX), diethylethanolamine (DEAE), Amberlite Ira67, Purolite A847, Amberlite Ira96, Amberlite IRA96SB, Dowex Marathon WBA, Dowex Upcore Mono WB-500, Purolite A835, Dowex Monosphere 77, and Dowex Monosphere 66. In some embodiments, the WAX resin contains a tertiary amine functional group.

In some embodiments, an anion exchange resin is one or more strong anion-exchange resins (SAX). Examples of SAX include, but are not limited to, —O—$CH_2$—CHOH—$CH_2$—O—$CH_2$—CHOH—$CH_2$—$N^+(CH_3)_3$, Amberjet Up4000, Amberjet 9000 OH, Amberlite FPA40 CI, and Dowex Upcore Mono MA-600. In some embodiments, a SAX based resin contains a quaternary amine functional group.

In some embodiments, the anion exchange resin is a combination of WAX and SAX.

In some embodiments, the form of the anion exchange resin is selected from fibers, membranes, sorbents, gels, and filter paper. In some embodiments, the sample with the lysed eukaryotic cells is passed through or contacted with the anion exchange resin. In some embodiments, the anion exchange resin is in a solution.

In some embodiments, the anion exchange resin is conjugated to a support substrate. Examples of a support substrate include, but are not limited to, a particle, a bead, a surface, or a sphere. In some embodiments, the support substrate is magnetic, e.g., a magnetic particle or bead. In some embodiments, the anion exchange resin is conjugated to a support substrate is in a solution.

In some embodiments, the support substrate comprises silica, glass, metal, polystyrene-based material, cellulose-based material, agarose-based material, dextran-based material, methacrylate-based material, sepharose-based material, or a combination thereof. In some embodiments, the support substrate is porous.

In some embodiments, the support substrate is a bead or sphere has a diameter between about 10 to 100 µm, between about 20 to 90 µm, between about 30 to 80 µm, between about 40 to 70 µm, or between about 50 to 60 µm.

In another embodiment, the support substrate is a bead or sphere have a diameter between about 0.1 to 10 µm, between about 1.0 to 9.0 µm, between about 2.0 to 8.0 µm, between about 3.0 to 7.0 µm, or between about 4.0 to 6.0 µm.

In some embodiments, the microbial lysis reaction is incubated with the anion exchange resin between about 0.1 to 10 minutes, between about 2 to 9 minute, between about 3 to 8 minutes, between about 4 to 7 minutes, or between about 5 to 6 minutes. In some embodiments, the microbial lysis reaction is incubated with the anion exchange resin between about 10 to 30 minutes, between about 12 to 28 minutes, between about 15 to 25 minutes, between about 18 to 23 minutes, or between about 19 to 22 minutes. In some embodiments, the microbial lysis reaction is incubated with the anion exchange resin for less than 1 minute.

In some embodiments, the microbial lysis reaction is incubated with the anion exchange resin between about 0.01 to 10 minutes, about 0.1 to 9 minutes, 1 to 8 minutes, about 2 to 7 minutes, 3 to 6 minutes, or about 4 to 5 minutes beyond that which is required to lysis the microbial cells.

In some embodiments, the anion exchange resin is permanently immobilized on the support substrate. In some embodiments, the immobilized anion exchange resin is contacted and/or incubated with the mixture and then the mixture is removed.

In some embodiments, at least one anion exchange resin conjugated to a support substrate, e.g., a bead or a particle (e.g., a microparticle), is contacted and/or incubated with the mixture. In some embodiments, after contacting and/or incubation with the microbial lysis reaction, the anion exchange resin conjugated to a support substrate is removed from the microbial lysis reaction. In another embodiment, after contacting and/or incubation with the microbial lysis reaction, the anion exchange resin conjugated to a support substrate is immobilized and the microbial lysis reaction is removed. By way of example, but not by way of limitation, in some embodiments, the anion exchange resin conjugated to a support substrate is selectively immobilized when the support substrate is a magnetized or metal bead and the magnetized or metal bead is exposed to a magnet or magnetic field.

In some embodiments, the beads or particle are packed into a column. In some embodiments, the beads or particle are free floating form.

In some embodiments, the anion-exchange-microparticles is a weak anion exchange material bound to magnetizable microspheres. In some embodiments, the anion-exchange-microparticles is a strong anion exchange material bound to magnetizable microspheres.

In some embodiments, the anion-exchange-microparticles is a weak anion exchange material bound to porous agarose based-microspheres. In some embodiments, the anion-exchange-microparticles is a strong anion exchange material bound to porous agarose based-microspheres.

In some embodiments, after binding the microbial genetic material to the anion-exchange-microparticles, the anion-exchange-microparticles are washed using a wash buffer or wash solution.

In some embodiments, a salt concentration of the wash solution is elevated as compared to the salt concentration during binding of the microbial genetic material. In some embodiments, the pH of the wash conditions is altered to achieve more stringent wash conditions. In some embodiment, the pH of the wash solution is between about 3.0 to 7.5, about 3.5 to 7.0, about 4.0 to 6.5, about 4.5 to 6.0, or about 5.0 to 5.5.

In some embodiments, the wash solution has a salt concentration between about 0.5 M to 3.0 M, about 0.75 M to 2.75 M, about 1.0 M to 2.5 M, about 1.25 M to 2.25 M, or about 1.5 M to 2.0 M.

In some emodiments, a more alkaline wash solution is preferred. In some emodiments, the pH of the wash solution is between about 9.5 to 10.5, about 10.0 to 11.0, about 10.5 to 11.5, about 11.0 to 12.0, or about 11.5 to 12.5. In some emodiments, the more alkaline solution has a salt concentration of less than about 0.5M, between about 0 mM to 100 mM, 50 mM-200 mM, 100 mM-300 mM, or about 200 mM-500 mM.

In some embodiments, the wash solution includes one or more surfactants. By way of example, but not by way of limitation, in some embodiments, surfactants include, but are not limited to, Tween and Triton-X. In some embodiments, the Tween and/or Triton-X concentration is between about 0.01% to 1.0% (v/v), about 0.1% to 0.9% (v/v), about 0.2% to 0.8% (v/v), about 0.3% to 0.7% (v/v), or about 0.4% to 0.6% (v/v). In some embodiments, the wash solution includes one or more detergents. By way of example, but not by way of limitation, in some embodiments, detergents include, but are not limited to, zwitterionic detergents. In some embodiments, the zwitterionic detergent concentration is between about $0.1\times$ to $350\times$CMC, about $1.0\times$ to $300\times$ CMC, about $10\times$ to $250\times$CMC, about $50\times$ to $200\times$CMC, or about $100\times$ to $150\times$CMC.

In some embodiments, the methods for isolating the microbial DNA includes an elution step. In some embodiments, competition of the isolation process is facilitated by eluting or removing the DNA off of the anion-exchange-microparticles.

In some embodiments, the pH of the elution buffer is between about 12 to 13.5. The use of an elution buffer with a pH greater than about 12 is not commonly used in the art.

In some embodiments, the elution buffer comprises of a buffering agent such as sodium phosphate or potassium phosphate. In some embodiments, the concentration of sodium phosphate or potassium phosphate is between about 0.01 M to 1 M, about 0.1 M to 1.8 M, about 0.4 M to 1.6 M, about 0.8 M to 1.4 M, or about 1.0 M to 1.2 M. In some embodiments, no buffering agent is required.

Additionally, or alternatively, in some embodiments, the elution buffer comprises sodium hydroxide or potassium hydroxide. In some embodiments, the concentration sodium hydroxide or potassium hydroxide is between about 10 to 500 mM, about 30 to 450 mM, about 50 to 400 mM, about 70 to 350 mM, about 90 to 300 mM, about 1 10 to 250 mM, or about 130 to 200 mM.

In some embodiments, the elution buffer also includes one or more monovalent salts. By way of example, but not by way for limitation, in some embodiments, monovalent salts include, but are not limited to, NaCl, KCl and LiCl.

In some embodiments, the concentration of the one or more monovalent salts in the elution buffer is between about 0 mM to 200 mM, about 25 mM to 175 mM, about 50 mM, to 150 mM, about 75 mM to 125 mM, or about 90 mM to 110 mM. The use of an elution buffer with monovalent salt concentrations less than about 200 mM is not commonly used in the art. In some embodiments, the elution buffer does not contain any monovalent salts.

In some embodiments, the isolation of microbial genetic material also includes a nucleic acid (e.g., DNA or RNA) purification step. In some embodiments, the purification step includes using chaotropic salts.

In some embodiments, the nucleic acid purification step includes the addition of about 6 M to 9 M of guanidinium chloride or guanidinium thiocyanate. Without wishing to be bound by theory, in some embodiments, the purification allows for efficient binding of a nucleic acid to a silica based solid-phase material such as a filter/membrane, a filter/membrane embedded in a gravity or spin column, or a bead/microsphere/magnetic particle. In some embodiments, subsequent washing of the solid-phase material further removes most of the remaining salts and other hold-over components. In some embodiments, washing is completed using a salt rich, alcohol based buffer. In some embodiments, less than 2 M of guanidinium chloride or guanidinium thiocyanate is added.

In some embodiments, the above isolated microbial genetic material is eluted through the addition of a water-based solution with a pH that is greater than about 5.0. In some embodiments, the isolated microbial genetic material is eluted through the addition of a water-based solution with a pH between about 6 to 9. In some embodiments, the isolated microbial genetic material is eluted through the addition of a water-based solution with a pH that is greater than about 10.

In some embodiments, no additional purification or desalting is required after eluting the genomic material from the anion-exchange resin.

In some embodiments, the gDNA is concentrated and/or purified using a size exclusion membrane following elution from the anion exchange resin. In some embodiments, the gDNA is concentrated and/or purified by applying one or more binding, wash, and/or elution steps to the anion exchange resin. In some embodiments, the concentration and/or purification comprises one or more of the following: (i) one or more binding steps; one or more washing steps; and one or more elution steps. Those skilled in the art will be to modify the process to meet purity and volume restrictions as required for optimal operation. Notwithstanding the above, this process, as well as the process for preparing the reagents, is illustrated in detail in WO2016044621A1.

Enzymatic Amplification of the Microbial Genomic Material

In some embodiments, it is preferred to enzymatically amplify the microbial genetic material (microbial gDNA). In some embodiments, the isolated microbial genetic material is subject to amplification. In some embodiments, the genetic material amplified is RNA or DNA. In some embodiments, the DNA is single stranded DNA (ssDNA) or double stranded DNA (dDNA). In some embodiments, the DNA is ribosomal DNA (rDNA). In some embodiments, microbial genetic material specific to a species or genus of microorganisms is amplified.

In some embodiments, enzymatic amplification can be achieved either through isothermal amplification or thermal-cycling amplification processes. In some embodiments, polymerase chain reaction, or PCR, is the preferred method of enzymatic amplification which is a well-known method of thermal-cycling based enzymatic amplification.

In some embodiments, a single amplification reaction is performed, e.g., the gDNA is not split into more than one reaction. Without wishing to be bound by theory, this can increase sensitivity.

In some embodiments, it is preferred to utilize a minimal set of primer pairs, for example rDNA primers, for the entire range of pathogens to be assayed. Without wishing to be bound by theory, this has been shown to increase sensitivity, and decrease amplification bias of specific genomic regions. By way of example but without limitation, should the user choose to assay the entire panel identified in Tables 1-3 & 5 utilizing rDNA, a suitable primer mixture may include a single primer pair for amplifying bacterial gDNA, and a single primer pair for amplifying fungal gDNA. In some embodiments, the addition of one or more targets from Table 4 would require one or more primer pairs. In some embodiments, the primer binding sites are highly conserved among all target microorganism. Primer pairs for amplifying conserved regions of interest are well known to those skilled in the art. Designing primer pairs for specific genomic regions are also well known to those skilled in the art.

In some embodiments, some or all of the following primers can be used:

```
                                       (SEQ ID NO: 572)
CCC CCC CCT CAG TTA TCG TTT ATT TGA TAG TAC C;

(SEQ ID NO: 573)
CCC CCC CCT CAG TTA TCG TTT ATT TGA TAG TTC C;

(SEQ ID NO: 574)
CCC TTC CCA GAG TTT GAT CAT GGC TCA G;

(SEQ ID NO: 575)
CCC TTC CAG AGT TTG ATC CTG GCT CAG;

(SEQ ID NO: 576)
CCC CCC GGT TAC CTT GTT ACG ACT T;

(SEQ ID NO: 577)
CCC CCGG CTA CCT TGT TAC GACT T;

(SEQ ID NO: 578)
CCC TTC CCT GAT GAC TCG TGC CTA CTA;

(SEQ ID NO: 579)
CCC TCT CCC TGA TGA CTT GCG CTT ACT A;

(SEQ ID NO: 580)
TGT TGC AAG AAT ACG GAC TCA;

(SEQ ID NO: 581)
CTT CAC AGA GCC ACC GTA.
```

In some embodiments, the amplicon is greater than about 400 bp. In some embodiments, the amplicon is between about 400 to 4000 bp, about 700 to 3700 bp, about 1000 to 3400 bp, about 1300 to 3100 bp, about 1600 to 2700 bp, about 1900 to 2400 bp, or about 2100 to 2200 bp. In some embodiments, use of amplicons of the lengths disclosed above are advantageous for downstream processing (e.g., detection and identification of microbial genetic materials) in the methods disclosed herein.

In some embodiments, the amplification product is purified. By way of example, but not by way of limitation, in some embodiments, a method for purifying the amplification product includes the reversible binding or absorption of the amplicon onto glass or silica fibers or particles in combination with chaotropic salts followed by their washing and elution. In some embodiments, purification methods include, but is not limited to, precipitation in an alcohol based solutions (e.g., such as ethanol or isopropanol), contacting with anion exchange resins, or size exclusion filters. In some embodiments, the cleaning-up of the amplification product removes excess primers, dNTPs, salts and other components that may interfere with downstream processes.

In some embodiments, no purification process is required, and the amplification product/solution can be used as is in downstream processes.

In some embodiments, the microbial genetic material is amplified by PCR and the number of PCR cycles are modified to adjust for sample input volume, sample type, and/or microbial load assessments. In some embodiments, the microbial genetic material is amplified by isothermal amplification and the amplification times are modified to adjust for sample input volume, sample type, and/or microbial load assessments.

Notwithstanding the above, this process, as well as the process for preparing the reagents, is illustrated in detail in WO 2016/044621A1.

DIANA-Based Capture and/or Immobilization of Amplified Genomic Material

In some embodiments, the amplified microbial genetic materials are contacted or incubated with a plurality of DIANAs and the amplified microbial genetic materials are detected. In some embodiments, the incubation of DIANAs and the microbial genetic material (e.g., amplified microbial DNA) is at a temperature between about 20° C. to 65° C. In some embodiments, the incubation of DIANAs and the microbial genetic material is at a temperature between about 25° C. to 65° C. In some embodiments, the incubation of DIANAs and the microbial genetic material is at a temperature between about 30° C. to 65° C. In some embodiments, the incubation of DIANAs and the microbial genetic material is at a temperature between about 37° C. to 65° C. In some embodiments, the incubation of DIANAs and the microbial genetic material is at a temperature between about 45° C. to 65° C. In some embodiments, the incubation of DIANAs and the microbial genetic material is at a temperature between about 55° C. to 65° C. In some embodiments, the the incubation of DIANAs and the microbial genetic material is at a temperature of about 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., or 65° C. In some embodiments, the incubation of DIANAs and the microbial genetic material (e.g., amplified microbial DNA) is at a temperature between about 65° C. to 99° C.

Provided herein are methods that provide for the invasion of DIANAs at the reduced temperatures of above 25° C. DIANAs in 10 minutes or less. As is described in more detail below, the use of invasion temperatures below 65° C. for invasion reactions lasting 10 minutes or less is new and advantageous.

In some embodiments, the invasion reaction last between about 0.1 to 5 minutes, about 1 to 10 minutes, about 5 to 30 minutes, or about 10 to 60 minutes. In some embodiments, the invasion reaction lasts less than 10 minutes, less than 9 minutes, less than 8 minutes, less than 7 minutes, less than 6 minutes, less than 5 minutes, less than 4 minutes, less than 3 minutes, less than 2 minutes, or less than 1 minute, for example, 1 minute, 2 minutes, 3 minutes, 4 minutes, 5 minutes, 6 minutes, 7 minutes, 8 minutes, 9 minutes, or 10 minutes.

In some embodiments, the composition of the DIANA invasion solution is depicted in WO 2016/044621A1.

In some embodiments, the invasion solution includes a buffering agent. By way of example, but not by way of limitation, in some embodiments, the buffering agent includes, but is not limited to, tris, sodium-phosphate, and potassium phosphate.

In some embodiments, the concentration of the buffering agent is between about 1 mM to 500 mM, about 50 mM to 450 mM, about 100 mM to 400 mM, about 150 mM to 350 mM, or about 200 mM to 300 mM. In some embodiments, no buffering agent is required. In some embodiements, the pH of the invasion solution is between about pH 6 and about pH 9.

In some embodiments, the invasion solution includes one or more monovalent salts. In some embodiments, the monovalent salt is NaCl or KCl. In some embodiments, the concentration of monovalent salt is between about 1 mM to 150 mM, about 5 mM to 145 mM, about 15 mM to 130 mM, about 25 mM to 1 15 mM, about 35 mM to 100 mM, about 45 mM to 85 mM, or about 55 mM to 70 mM. In some embodiments, the invasion solution contains no monovalent salts. The disclosed salt concentrations of the invasion assay are below the salt concentration used in standard hybridization assays.

In some embodiments, the invasion solution include one or more surfactants. In some embodiments, the surfactant reduces non-specific binding. By way of example, but not by way of limitation, surfactants include, but are not limited to, Tween-20, or TritonX-100. In some embodiments, the concentration of the surfactant in the invasion solution is between about 0.01% to 1.0% (v/v), about 0.1% to 0.9% (v/v), about 0.2% to 0.8% (v/v), about 0.3% to 0.7% (v/v), or about 0.4% to 0.6% (v/v).

In some embodiments, the invasion solution includes components to vary the excluded volume (e.g., crowding agents). By way of example, but not by way of limitation, crowding agents include, but are not limited to, polyethylene glycol (PEG), PEG-200, PEG-250, PEG-300, PEG-400, PEG-500, PEG-750, PEG-1,000, PEG-9,500, PEG-2,000, PEG-4,000, PEG-5,000, PEG-6,000, PEG-8,000, PEG-10,000, PEG-12,000, PEG-13,000, PEG-20,000, dextrans (DX), polyvinyl-alcohols (PVA), Ficolls (FC), DX-1,000, DX-5,000, DX-12,000, DX-50,000, DX-80,000, PVA 89k-98k, PVA 85k-124k, PVA 130k, PVA 31k-50k, PVA 50k-80k, PVA 70k-100k, PVA 90k-120k, PVA 170k-250k, PVA 61k, PVA 31k, PVA 130k, PVA 67k, PVA 27k, PVA 25k, FC-400, FC-70, FC-40, glycerol, glucose, and sucrose. In some embodiments, the concentration range of the crowding agent in the invasion solution is between about 1% to 20% (v/v), about 3% to 17% (v/v), about 6% to 14% (v/v), or about 9% to 11% (v/v) of the total volume of invasion solution. In some embodiments, the invasion solution included one or more DNA denaturants. By way of example, but not by way of limitation, DNA denaturants include, but are not limited to, DMSO, formamide, and betaines.

In some embodiments, the invasion solution also includes DMSO, formamide, betaines, or a combination thereof. In some embodiments, the DMSO and/or formamide are between about 1% to 30% (v/v), about 5% to 25% (v/v), about 10% to 20% (v/v), or about 14% to 16% (v/v) of the total volume of invasion solution. In some embodiments, the concentration of the betaines in the invasion buffer is between about 0.1 M and 2.5 M, about 0.5 M and 2.0 M, or about 1.0 M and 1.5 M.

In some embodiments, the invasion solution has a pH of about 10 or more. In some embodiments, an invasion solution with a pH greater than about 10 is conducive to DNA denaturing or destabilization.

Washing

In some embodiments, a washing step is performed after DIANA invasion. In some embodiments, the wash step reduces non-specific binding. In some embodiments, the wash uses high temperature wash solutions. In some embodiments, the temperature of the wash solution is between about 60° C. and 99° C., or between 20° C. to 65° C. The composition of the preferred DIANA wash buffer is depicted in WO 2016/044621A1.

In some embodiments, the wash buffer comprises one or more of the following: 1) monovalent salt, e.g., as NaCl or KCl, at between about 50 to 650 mM, about 100 to 600 mM, about 150 to 550 mM, about 200 to 500 mM, about 250 to 450 mM, or about 300 to 400 mM; 2) buffered to a near neutral pH, for example between about 6-9; and 3) surfactants, e.g., Tween-20 or Triton X-100 at between about 0.1% to 1.0% (v/v), about 0.2% to 0.9% (v/v), about 0.3% to 0.8% (v/v), about 0.4% to 0.7% (v/v), or about 0.5% to 0.6% (v/v). In some embodiments, the wash buffer is heated.

In some embodiments, the wash buffer includes one or more DNA destabilizing or denaturing agents, e.g., DMSO, betaines, and formamide. In some embodiments, the DMSO and/or formamide are between about 10% to 30% (v/v), about 15% to 25% (v/v), about 10% to 20% (v/v), or about 14% to 16% (v/v) of the total volume of invasion solution. In some embodiments, the concentration of the betaines in the invasion buffer is between about 0.1 M and 2.5 M, about 0.5 M and 2.0 M, or about 1.0 M and 1.5 M.

In some embodiments, the pH of the wash buffer is above 9.0 and includes between about 0 mM to 300 mM, about 50 mM to 250 mM, about 100 mM to 200 mM, or about 125 mM to 175 mM of monovalent salts and/or surfactants. In some embodiments, the pH of the wash buffer is below 9.0 and includes between about 0 mM to 800 mM, about 50 mM to 750 mM, about 100 mM to 700 mM, about 150 mM to 650 mM, or about 200 mM to 600 mM, about 250 mM to 550 mM, about 300 mM to 500 mM, or about 350 mM to 450 mM of monovalent salts and/or surfactants.

By way of example, but not by way of limitation, in some embodiments, the washing step comprises washing DIANA oligomers that are sized between about 14 to 18 bases, wherein the lower wash temperature is defined as about: $T_M(DNA)+20°$ C. and the upper wash temperature is 99° C.

In some embodiments, the preferred temperature for invasion and washing is dictated by the length of the DIANA probe, its base composition (i.e. GC content), and the conditions at which the reactions take place. Without wishing to be bound by theory, in some embodiments, the DIANA invasion reaction is rate limited by that which the duplex DNA region of interest can be effectively 'opened', thus exposing the nucleobases. As such, an increase in temperature is but one parameter which plays a role, which additive reagents also play a role. Further, with regards to washing conditions, and without wishing to be bound by theory, in some embodiments, the DIANA wash conditions are dependent on, as a minimum, the binding strength of the DIANA probe to the target DNA. As such, parameters such as temperature, electrolytes, pH, other additives, play a significant role in establishing the optimal condition.

By way of example, but not by way of limitation, in some embodiments, the DIANA invasion process includes using DIANA oligomers that are larger than 18 bases, wherein the lower invasion temperature is defined as about: $T_M(DNA)+0.7°$ C.×(number of bases) and the upper invasion temperature is 99° C.

By way of example, but not by way of limitation, in some embodiments, the DIANA invasion process includes using DIANA oligomers that are smaller/shorter than 14 bases, wherein the lower invasion temperature is defined as about: $T_M(DNA)+1.1°$ C.×(number of bases) and the upper invasion temperature is 99° C.

By way of example, but not by way of limitation, in some embodiments, the washing step comprises washing DIANA oligomers that are larger than 18 bases, wherein the lower wash temperature is defined as about: $T_M(DNA)+0.9°$ C.×(number of bases) and the upper wash temperature is 99° C.

By way of example, but not by way of limitation, in some embodiments, the washing step comprises washing DIANA oligomers that are smaller/shorter than 14 bases, wherein the lower wash temperature is defined as about: $T_M(DNA)+1.25°$ C.×(number of bases) and the upper wash temperature is 99° C.

Low Temperature DIANA Invasion and Wash

Without wishing to be bound by theory, the process of invasion is similar to that of hybridization wherein binding is chiefly due to, but not limited to, Watson-Crick base-pairing rules. By indicating this, the intent is to highlight that a pre-requisite for invasion is 'access' to the nucleobases, which in the case of duplex DNA (either locally or universally, and discussed below) is 'hidden' in most cases.

Without wishing to be bound by theory, the rate limiting step for DIANA invasion is the ability to open the duplex DNA thus making available the nucleobases for invasion. 'Open' does not necessarily mean that the DNA is denatured, but rather that what is known as DNA breathing is increased, where local, transient, bubbles are formed within the duplex DNA. As breathing increases these bubbles become (1) more frequent, (2) more common, (3) longer lived i.e. stable, and (4) larger. DNA breathing is a natural, physical, process depicting the competeting energetics of the negative sugar-phosphate backbone and the hydrogen bonds between the nucleobases and base-pair stacking intereactions. DNA breathing may be unrelated to the presence or absence of DIANAs in the system.

Art known methods for DIANA invasion commonly described the use of temperatures at or below 37° C. At such temperatures, invasion was extremely slow—on the scale of hours. At even lower temperatures, moving towards ambient temperatures, DNA invasion becomes even slower. Cleary, a need exists for more rapid invasion in the field of rapid diagnostic technology.

Reaction conditions which enable rapid and highly efficient DNA invasion, in the 1-10-minute timeframe have recently been described. These methods are disclosed in WO 2016/044621A1. The methods disclosed in WO 2016/044621A1 can be useful at temperatures above about 65° C. (see section starting at para. [0248]).

Disclosed herein are methods for further reducing the invasion temperature to 65° C., in certain conditions, while still meeting the sub-10 min (indeed the sub 5 min) timeframe. These methods employ the use of DIANA technology with predominantly single stranded DNA or RNA. This has not been previously described.

In some embodiments, a target DNA or RNA that is predominantly single-stranded. In some embodiments, a double-stranded structure is induced locally to create the preferred conditions. While RNA is naturally single-stranded, DNA is naturally double-stranded. In some embodiments, double stranded DNA is processed to generate single stranded DNA. Processing steps include, but are not limited to enzymatic, chemical, or mechanical processing. Other processing methods are well known within the art.

Upon having in place single stranded DNA or RNA target molecules, local duplex, or hairpin, structures can be stabilized. This can be accomplished by increasing the electrolyte concentrations in the reaction mixture. In some embodiments, electrolytes are added to the invasion solution.

In some embodiments, monovalent salts are added to the invasion solution. In some embodiments, the monovalent salt is added at a concentration of above 50 mM. In some embodiments, the monovalent salt is added at a concentration of 100 mM or above. In some embodiments, the monovalent salt is added at a concentration of 200 mM or above. In some embodiments, the monovalent salt is added at a concentration of about 50 mM, 51 mM, 55 mM, 60 mM, 70 mM, 80 mM, 90 mM, 100 mM, 110 mM, 120 mM 125 mM, 130 mM, 140 mM, 150 mM, 160 mM, 170 mM, 175 mM, 180 mM, 190 mM, 200 mM, 225 mM, 250 mM, 275 mM, 300 mM, 325 mM, 350 mM, 375 mM, 400 mM, 450 mM, or 500 mM. In some embodiments, the monovalent salt is added at a concentration of from 51 mM-500 mM, from 51 mM-250 mM, from 51 mM-100 mM, or from 100 mM-200 mM.

In some embodiments, divalent salts are added to the invasion solution. In some embodiments, the monovalent salt is added at a concentration of above 5 mM. In some embodiments, the monovalent salt is added at a concentration of 7 mM or above. In some embodiments, the monovalent salt is added at a concentration of 10 mM or above. In some embodiments, the monovalent salt is added at a concentration of about 5 mM, 6 mM, 7 mM, 8 mM, 9 mM, 10 mM, 11 mM, 12 mM, 13 mM, 14 mM, 15 mM, 16 mM, 17 mM, 18 mM, 19 mM, 20 mM, or 25 mM. In some embodiments, the monovalent salt is added at a concentration of from 6 mM-50 mM, from 6 mM-25 mM, from 6 mM-10 mM, or from 10 mM-20 mM.

In some embodiments, trivalent salts are added to the invasion solution. In some embodiments, the monovalent salt is added at a concentration of above 0.1 mM. In some embodiments, the monovalent salt is added at a concentration of 0.3 mM or above. In some embodiments, the monovalent salt is added at a concentration of 0.5 mM or above. In some embodiments, the monovalent salt is added at a concentration of about 0.1 mM, 0.2 mM, 0.3 mM, 0.4 mM, 0.5 mM, 0.6 mM, 0.7 mM, 0.8 mM, 0.9 mM, 1.0 mM, 1.1 mM, 1.2 mM, 1.3 mM, 1.4 mM, 1.5 mM, 2.0 mM, or 2.5 mM. In some embodiments, the monovalent salt is added at a concentration of from 0.2 mM-1.0 mM, from 0.2 mM-0.7 mM, from 0.2 mM-0.5 mM, or from 0.5 mM-1.0 mM.

In other embodiments, the invasion can be accomplished at high speed at a reduced temperature in inherently duplex nucleic acid molecules in destabilizing conditions. Without wishing to be bound by theory, the conditions described herein are not meant to enable complete denaturization of the DNA template, but rather sufficient destabilization to enable a reduce temperature for invasion. The exact nature of these conditions are dependent on the reaction solution used with regards to denaturants and electrolyte concentrations as identified in WO 2016/044621A1 and described herein, in addition to the length of the duplex target.

In some embodiments, the invasion solution has a pH (either buffered or unbuffered) of about 10.2-12.2. In some embodiments, the pH is about 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, or 12.2. In some embodiments, the pH is between 10.2 and 11.0. In some embodiments, the pH is between 10.5 and 11.5. In some embodiments, the pH is between 11.0 and 12.0. In some embodiments, the pH is 10.2 or above. In some embodiments, the pH is 10.5 or above. In some embodiments, the pH is 11.0 or above. In some embodiments, the pH is 11.5 or above. In some embodiments, the preferred pH is optimized for the specific data target, reaction additives, target length and GC composition, and preferred temperature range.

In some embodiments, a wash solution, used to remove non-specific binding of DIANAs to DNA, may likewise be used at temperatures between 25° C.-65° C. In some embodiments, the aforementioned wash solution has a pH (either buffered or unbuffered) of about 10.7-12.7. In some embodiments, the pH is about 10.7, 10.8, 10.9, 11.0, 11.1, 11.2, 11.3, 11.4, 11.5, 11.6, 11.7, 11.8, 11.9, 12.0, 12.1, 12.2, 12.4, 12.4, 12.5, 12.6, or 12.7. In some embodiments, the pH is between 10.7 and 11.5. In some embodiments, the pH is between 11.0 and 11.8. In some embodiments, the pH is between 11.3 and 12.0. In some embodiments, the pH is between 11.7 and 12.7. In some embodiments, the pH is 10.7 or above. In some embodiments, the pH is 11.0 or above. In some embodiments, the pH is 11.5 or above. In some embodiments, the pH is 12.0 or above. In some embodiments, the preferred pH is optimized for the specific data target, reaction additives, target length and GC composition, DIANA length and preferred temperature range.

Detection

In some embodiments, detection of the binding of DIANAs to their respective target is through optical, chemical, electrical, or mechanical detection methods in a detection region. Method utilized for detection of the DIANAs to their respective target is depicted in WO 2016/044621A1.

In some embodiments, optical detection is through the use of fluorescence or luminescence.

In some embodiments, one or more detectable markers are positioned on the invading DIANAs. In some embodiments, the one or more detectable markers are positioned on the DNA amplicon captured via the immobilized oligomer. In some embodiments, one or more detectable markers are positioned on a second oligomer, which is universal to some or all potential targets.

By way of example, but not by way of limitation, in some embodiments, the detectable markers include, but are not limited to fluorescent dyes, horseradish peroxidase (HRP), luciferase, methoxycoumarin, dansyl, pyrene, Alexa Fluor 350, AMCA, Marina Blue dye, dapoxyl dye, dialkylaminocoumarin, bimane, hydroxycoumarin, cascade blue dye, Pacific Orange dye, Alexa Fluor 405, Cascade Yellow dye, Pacific Blue dye, PyMPO, Alexa Fluor 430, Fluorescein, Alexa Fluor 488, Oregon Green 488, BODIPY 493/503, Oregon Green 514, Alexa Fluor 514, Alexa Fluor 532, BODIPY TMR, Alexa Fluor 555, Alexa Fluor 546, BODIPY 558/568, Rhodamine Red dye, Alexa Fluor 568, BODIPY 581/591, Alexa Fluor 594, Texas Red dye, Alexa Fluor 610, Alexa Fluor 633, Alexa Fluor 635, Alexa Fluor 647, Alexa Fluor 660, Alexa Fluor 680, Alexa Fluor 700, Alexa Fluor 750, and Alexa Fluor 790.

By way of example, but not by way of limitation, detectable markers enabling indirect detection include, but are not limited to, digoxigenin (DIG), biotin, or dinitrophenyl.

In some embodiments, identification of the microbial species is through DNA amplicon labeling.

In some embodiments, the primers used in the amplification are labeled during with a detectable marker prior to beginning the amplification process.

In some embodiments, modified nucleotides that either contain a tag or are modified to enable the downstream conjugation of tags are used in the amplification process. By way of example, but not by way of limitation, tag-modified nucleotides include, but are not limited to, a nucleotide modified with a diethylaminocoumarin (DEAC), Cyanine 3 (Cy3), Cyanine 5 (Cy5), Fluorescein (FITC), Lissamine, R1 10, R6G, Tetramethylrhodamine (TAMRA), or Texas Red dye. Examples of a modified nucleotides enabling subsequent tagging would be, but are not limited to, a nucleotide modified with an Amino-digoxigenin (DIG), Biotin, or Dinitrophenyl (DNP).

In some embodiments, the labeling of the DNA amplicon is achieved through subsequent incubation with an intercalating dye. By way of example, but not by way of limitation, intercalating dyes include, but are not limited to, PicoGreen, OliGreen, RiboGreen, SYBR Gold, SYBR Green I, SYBR Green II, SYBR Safe, TOTO-1, YOYO-1, YOYO-3, POPO-1, BOBO-1, JOJO-1, POPO-3, LOLO-1, BOBO-3, YOYO-3, TOTO-3, SYTOX-Blue, SYTOX-Green, SYTOX-Orange, SYTOX—Red, and EtBr.

In some embodiments, the DNA amplicon is first tagged with one or more DIANAs and then the hybrid complex is captured onto the solid-phase surface.

In some embodiments, the DIANA is incubated with a solid surface prior to capturing the amplicon.

In some embodiments, the solid-phase surface is a bead, nanoparticle, microparticle or flat substrate. In some embodiments, the solid-phase surface is further chemically modified to facilitate binding of the DIANA to it.

In some embodiments, the detection region is the same region, e.g., in the same well, tube, or chamber, or in the same region on a fluidic cassette, where DIANA invasion/washing processes were conducted. In other embodiments, the detection region is a different same region from where DIANA invasion/washing processes were conducted.

In some embodiments, the methods described herein have a limit of detection (LOD) of between 1-100 CFU/ml. In some embodiments, the methods described herein have a LOD of between 1-50 CFU/ml. In some embodiments, the methods described herein have a LOD of between 1-10 CFU/ml. In some embodiments, the LOD is less than 1 CFU/ml.

In some embodiments, the volume of the sample affects the LOD of the method. By way of example, but not by way of limitation, an increase in the inputted sample-volume will allow for the detection of rarer microorganisms, increasing the sensitivity of the LOD measurement.

In some embodiments, all types of microorganisms have a similar LOD, whereas in other embodiments, individual LODs may vary.

In some embodiments, the limit of detection of microorganisms may not be measurable using the standard of CFU or Colony Forming Units per unit volume, as the microorganism may (1) not form colonies, or (2) may be unculture-able.

Bloodstream Infections

In some embodiments, the methods disclosed herein allowing for identification and evaluation microbial species using DIANAs are optimized for detection of bloodstream infections (BSIs). As is discussed herein, detecting microorganisms in the context of BSIs faces unique challenges because of the blood components which may hinder downstream processing, e.g., PCR, which is magnified by the large volume of blood often necessary to detect BSIs because of the low frequency of microorganisms in the blood.

The methods described herein include several innovative steps in blood processing to allow for the efficient isolation and amplification of microbial DNA, allowing for optimal detection using DIANAs. These include (i) increasing the length of extracted microbial DNA; (ii) use of ion-exchange technology; and (iii) efficient separation of human DNA from whole-blood samples. In some embodiments, the length of the extracted microbial DNA is increased relative to art known methods. Without wishing to be bound by theory, this is because high molecular weight microbial DNA (gDNA) boosts PCR sensitivity. In some embodiments, ion exchange technology is used. In some embodiments, high molecular weight gDNA is separated from low molecular weight gDNA by ion exchange. By utilizing the inherently highly-charged backbone of DNA as the exclusion criterion, ion-exchangers not only enable the separation of gDNA from non-DNA components, but likewise enable the discrimination of high molecular weight gDNA from shorter DNA fragments. In some embodiments, greater than 95%, greater than 96%, greater than 97%, greater than 98%, greater than 99%, greater than 99.5% or greater than 99.9% of human DNA is removed from whole blood. A simple, yet efficient process for removing hDNA from a whole-blood sample, without the need for centrifugation, has been developed. In combination, these processes are effective in overcoming issues of PCR inhibition when using undiluted extracts, while simultaneously reducing background amplification from low molecular weight, contaminating DNA. The entire process is effective, robust and reproducible in yielding pure, PCR-ready, gDNA directly from whole blood yet can be simple enough to be easily transitioned to automation.

Quantification of Microbial Load

In some embodiments, the methods described herein comprise monitoring microbial, e.g., pathogen, load. This is useful, for example, in the context of measuring the load of a microbe or microbes in a subject over time, to monitor the course of infection, or to observe the response of the microbe to therapeutic intervention, e.g., antibiotics or antifungals. In some embodiments, the methods described herein provide is the ability to measure microbial load quantitatively, i.e., the methods provide a direct correlation between inputted pathogen load and signal output. In some embodiments, the methods described herein provide the ability to measure microbial load semi-quantitatively.

In some embodiments, the ability to measure microbial load is useful clinically, medically, or scientifically.

In some embodiments, the microbial load is measured over time, e.g., at multiple time points, e.g., at a first and second time point. In some embodiments, measuring microbial load at a first and second time point can allow the course of infection or response to treatment to be monitored in a subject. In some embodiments, an increase in microbial, e.g., pathogen, load indicates that the subject has an infection that is worsening. In some embodiments, an increase in microbial, e.g., pathogen, load indicates that the subject has an infection that is not improving. In some embodiments, no change in microbial, e.g., pathogen, load indicates that the subject has an infection that is not resolving. In some embodiments, if the subject is receiving treatment, e.g., with an antimicrobial, an increase in the microbial, e.g., pathogen, load indicates that the microbial species is not susceptible to the antimicrobial. In some embodiments, if the subject is receiving treatment, e.g., with an antimicrobial, a decrease in the microbial, e.g., pathogen, load indicates that the microbial species is susceptible to the antimicrobial. The specific response with regards to microbial load is dependant on the compound-host-microbe relationship. In some embodiments, the second time point is at least about 1, 2, 3, 4, 5, 6, 7, 8, 9, 10, 11, or 12 hours after the first time point.

In some embodiments, measuring microbial load can be used to measure the susceptibility of microbial species to therapeutic agents, e.g., antimicrobials, ex-vivo. In some embodiments, a sample is acquired, e.g., obtained, from a subject as described herein. In some embodiments, the microbial load is measured in a sample, and the microbial load is then measured at a second time point in the same sample, after exposure to an antimicrobial.

In some embodiments, the sample can be divided into multiple samples, e.g., aliquots. In some embodiments, the sample is divided into 1, 2, 3, 4, 5, 6, or more aliquots. In some embodiments, the sample is divided into multiple aliquots and the microbial load is measured in an untreated sample. In some embodiments, the sample is divided into multiple aliquots and one or more aliquots are treated with antimicrobials, after which the microbial load is measured.

In some embodiments, the microbial load in a sample treated with an antimicrobial is measured 10 minutes, 20 minutes, 30 minutes, 40 minutes, 50 minutes, 1 hour, 1 hour 10 minutes, 1 hour 20 minutes, 1 hour 30 minutes, 2 hours, 2 hours 30 minutes, 3 hours, 4 hours, 5 hours, 6 hours, or 7 hours, after treatment with the antimicrobial.

The microbial load of a sample treated with an antimicrobial can be compared with the microbial load of the same sample pre-treatment or with a different sample from the same source pre-treatment or untreated to assess the effect of the antimicrobial on the microbial species. In some embodiments, a decrease in microbial load after exposure to the antimicrobial load indicates that the microbial species is susceptible to the antimicrobial. In some embodiments, an increase in the microbial load, or no change in the microbial load, after exposure to the antimicrobial indicates that the microbial species is not susceptible, or is resistant, to the antimicrobial.

Antimicrobials include, for example, ampicillin, amoxycillin, aureomicin, bacitracin, ceftazidime, ceftriaxone, cefotaxime, cephachlor, cephalexin, cephradine, ciprofloxacin, clavulanic acid, cloxacillin, dicloxacillan, erythromycin, flucloxacillan, gentamicin, gramicidin, methicillan, neomycin, oxacillan, penicillin, vancomycin, capsofungin, flucytosine, fluconazole, itraconazole, ketoconazole, and miconazole.

In some embodiments, the antimicrobial is an antibiotic. In some embodiments, the antibiotic may be a compound relating to the following antibiotic classes: penicillins, tetracyclines, cephalosporins, quinolones, lincomycins, macroslides, sulfomides, glycopeptides, aminoglycosides, and/or carapenems. In some embodiements, the antibiotic may be from an alternative class of antibitioics.

In some embodiments, the antimicrobial is an antifungal. In some embodiments, the antifungal may be a compound relating to the following antifungal classes from azoles, allylamines, echinocandins, nucleoside analogs, and/or polyenes. In some embodiements, the antifungal selected may be slected from an alternative class of antifungals.

In some embodiments, the amount, concentration, or number of microorganisms present in the initial sample is determined through a calibration process. This is in contrast to methods which require culturing, and other molecular methods with a non-integrated approach.

In some embodiments, the calibration process comprises one or more calibration steps. In some embodiments, calibration for quantitative or semi-quantitative load assessment for a given load input range (i.e. 1-100 CFU/ml) comprises comparing the results of a DIANA invasion assay using the methods described herein to the results of colony counts using the same input, e.g., the same input amount or a known relative input amount. In some embodiments, calibration for the quantitative or semi-quantitative load assessment for a given load input range comprises inputting predetermined quantities of cells. In some embodiments, calibration for the quantitative or semi-quantitative load assessment may be accomplished for a given load input range comprises inputting predetermined quantities of gDNA.

In some embodiments, quantitation or semi-quantitative is accurate within a particular input load dynamic range, e.g., between 1 and 100 to 3,000, between 2 and 100 to 3,000, between 3 and 100 to 3,000, between 4 and 100 to 3,000, between 5 and 100 to 3,000, between 6 and 100 to 3,000, between 7 and 100 to 3,000, between 8 and 100 to 3,000, between 9 and 100 to 3,000, between 10 and 100 to 3,000, between 11 and 100 to 3,000, between 12 and 100 to 3,000, between 13 and 100 to 3,000, between 14 and 100 to 3,000, between 15 and 100 to 3,000, between 16 and 100 to 3,000, between 17 and 100 to 3,000, between 18 and 100 to 3,000, between 19 and 100 to 3,000, between 20 and 100 to 3,000, between 21 and 100 to 3,000, between 22 and 100 to 3,000, between 23 and 100 to 3,000, between 24 and 100 to 3,000, between 25 and 100 to 3,000, between 26 and 100 to 3,000, between 27 and 100 to 3,000, between 28 and 100 to 3,000, between 29 and 100 to 3,000, or between 30 and 100 to 3,000 CFU input. In some embodiments, the output or signal dynamic range is between about 10× and 50×, between about 20× and 100×, between about 30× and 300×, between about 40× and 400×, between about 50× and 500×, between about 60× and 600×, between about 70× and 700×, between about 80× and 800×, between about 90× and 900×, between about 100× and 1000×, between about 100× and 1250×, between about 100 and 1500×, between about 100 and 1750×, or between about 100× and 2000×.

In some embodiments, the input load dynamic range is adjusted by varying the input volume and/or increasing or decreasing the output or yield of the enzymatic amplification step. By way of example, but not by way of limitation, should an input of 1-100 CFU, with a recalibrated optimal number of PCR cycles under the current conditions be 30, assuming a PCR cycle efficiency of 85%, a similar dynamic range of 100× could be achieved for an input of 250-2,500 CFU by using roughly 20-22 PCR cycles.

In some embodiments, the output or yield of the enzymatic amplification step is increased or decreased to accommodate fewer or more DIANA probes in the detection step.

In some embodiments, 1, 2, 3, 4, 5, 6, 7, 8, 9, 10, 11, 12, 13, 14, 15, 16, 17, 18, 19, or 20 DIANA probes are used in the detection step. In some embodiments, more than 20 DIANA probes are used in the detection step. In some embodiments, more than 40 DIANA probes are used in the detection step. In some embodiments, more than 80 DIANA probes are used in the detection step. In some embodiments, more than 150 DIANA probes are used in the detection step. In some embodiments, more than 500 DIANA probes are used in the detection step. In some embodiments, the processes defined here facilitate the ability to utilize 15-25 DIANA probes, as a system, while achieving a dynamic range detection of 500-1,000×.

In some embodiments, one calibration for load assessment is performed for all organisms to be tested. In some embodiments, one calibration for load assessment is performed for all Gram positive microorganisms to be tested. In some embodiments, one calibration for load assessment is performed for all Gram negative microorganisms to be tested. In some embodiments, one calibration for load assessment is performed for all fungi to be tested. In some embodiments, one calibration for load assessment is performed for each genus to be tested. In some embodiments, a calibration for quantitative load assessment is performed for each organism to be quantified.

In some embodiments, separate calibrations for quantitative or semi-quantitative load assessment are not done for different sample types. In some embodiments, separate calibrations for quantitative load assessment are done for different sample types, e.g., blood, urine, ect. In some embodiments, separate calibrations for quantitative load assessment are done for samples having compounds that may affect the readout of the assay, e.g., antibiotics, anticoagulants, drug compounds, etc.

In some embodiments, calibration for quantitative or semi-quantitative load assessment may yield a results range. By way of example, without limitation, a given input load may yield a signal of 100±9.

In some embodiments, there may be one or more mathematical relationships between load input and signal output, for example linear, polynomial, exponential, etc.

In some embodiments, more than one microbial species will be measured and calibration for load assessment will take into account one or more of the following factors: relative lysis yields, relative amplification yields, genomic copies of the target region for amplification, DIANA capture/detection efficiency. In some embodiments, none of these factors are taken into account. In some embodiments, a subset of these factors are taken into account. In some embodiments, all of these factors are taken into account. A non-limiting example would be a case where two pathogens are present in a sample, for example two Gram-negative bacterial species. Given the ease with which these bacteria are lysed, and the single primer pair used to amplify both species, it is likely that only target genomic copies and DIANA capture/detection efficiency need to be accounted for.

In some embodiments, the ability to determine change in pathogen load, may be of use in multiple applications, by way of example but not by way of limitation, during drug/compound development processes, enrichment of clinical trials, monitoring performance of a treatment in-vitro, monitoring performance of a treatment in-vivo, determining if to alter treatment or care, establishing compound-pathogen-host relationships.

Microbial Spectra

In some embodiments, the growth-bias free detection of polymicrobial infected/inoculated samples, in combination with load assessment, is defined herein as "microbial spectrum." In some embodiments, a microbial spectrum includes a semi-quantitative or quantitative assay comprising two or more DIANA probes which can differentiate among two or more microorganisms.

In some embodiments, the assay can differentiate among 2 or more, 5 or more, 10 or more, 20 or more, 50 or more, or 100 or more microorganisms, e.g., about 2, about 3, about 4, about 5, about 6, about 7, about 8, about 9, about 10, about 15, about 20, about 25, about 50, about 75, about 100, about 150, about 225, about 250, about 350, about 500, about 750, about 1,000, about 1,500, about 2,000, or about 2,500 microorganisms. In some embodiments, the assay can differentiate among 2-2,250, about 5-250, about 10-225, or about 10-750 microorganisms.

In some embodiments, the ability to assess a microbial spectrum includes the ability to assess the relative microbial load of one or more of the microorganisms in the specimen (load of microorganism 1 vs load of microorganism 2, etc).

In some embodiments, the ability to assess a microbial spectrum includes the ability to assess the absolute microbial load of one or more of the microorganisms in the specimen (load of microorganism 1 vs load of microorganism 2, etc).

In some embodiments, the ability to assess a microbial spectrum includes the ability to assess the both the relative and the absolute microbial load of one or more of the microorganisms in the specimen (load of microorganism 1 vs load of microorganism 2, etc).

In some embodiments, the ability to assess the microbial spectrum, may be of utility clinically, medically, or scientifically.

In some embodiments, the ability to determine changes or lack thereof in the microbial spectrum, as a result of treatment, non-treatment, time, drug compounds, etc. may be of utility clinically, medically, or scientifically.

In some embodiments, the ability to determine changes in microbial spectrum, may be of use in multiple applications, by way of example but not by way of limitation, during drug/compound development processes, enrichment of clinical trials, monitoring performance of a treatment in-vitro, monitoring performance of a treatment in-vivo, determining if to alter treatment or care, establishing compound-pathogen-host relationships.

Fluidic Device

In certain embodiments, the fluidic device described herein involve a unique approach to interfacing relatively large volumes (e.g., milliliters) of fluid with micro- or millimeter-scale fluidic channels. For instance, in some embodiments, a device described herein includes a series of fluidic reservoirs, which may be adapted and arranged to contain relatively large amounts (e.g., milliliters) of fluid such as reagents. Each fluidic reservoir may be connected to one or more fluidic channels. The device may also include one or more gas chambers in fluidic communication with a fluidic reservoir. The gas chambers may be used, for example, to pressurize the fluid in the reservoirs to promote fluid flow into and/or out of the fluidic channels. The fluidic channels may be connected to a fluidic hub, which may facilitate the flow of one or more fluids between two or more fluidic reservoirs. For instance, the fluidic hub may include a series of valves and/or channels that direct fluid flow to a particular reservoir for a particular operation (e.g., lysing, reaction, isolation, amplification, detection) to take place. A subsequent operation can then be performed by transporting the fluid back to the fluidic hub, via the fluidic channels, and into a different reservoir. In some cases, the fluidic hub may facilitate the transport of a gas to one or more reservoirs and, subsequently, to one or more gas chambers.

The use of a fluidic device as described herein may facilitate the transport of a fluid between two or more reservoirs, without the use of multiple pumps and/or pressure sources. For example, in some cases, a constant pressure may be applied to the fluidic device and the plurality of valves may be opened in sequence such that the fluid is transported between two or more fluidic reservoirs (e.g., without the need to adjust, change, or redirect the pressure).

Advantageously, the devices described herein may be useful for conducting particular combinations of reactions and/or steps without the need for user intervention (e.g., automatically or semi-automatically), pipetting of individual reagents, or large-scale laboratory processes (e.g., centrifugation). As compared to fluidic devices for sample detection and analysis, the devices described herein may be, in some cases, stand-alone (e.g., do not require dedicated instrumentation).

In some embodiments, the fluidic device comprises a fluidic hub and a plurality of fluidic reservoirs. In some embodiments, the fluidic device comprises a plurality of fluidic hubs and a plurality of fluidic reservoirs. In certain embodiments, each fluidic reservoir is connected to a branching channel branching from the fluidic hub. For example, as illustrated in FIG. 1, fluidic device 100 comprises a fluidic hub 110 and a fluidic reservoir 120 connected to a branching channel 125 branching from, and in fluidic communication with, fluidic hub 110. In certain embodiments, a valve 122 may be positioned between branching channel 125 and fluidic hub 110. In alternative embodiments, however, no valve may be present between a branching channel and the fluidic hub.

In some cases, fluidic device 100 comprises fluidic reservoir 115 (e.g., a sample inlet reservoir) in fluidic communication with fluidic hub 110 via branching channel 105. In some such embodiments, a fluid may be introduced into the sample inlet reservoir and transported, via the fluidic hub, to a fluidic reservoir. For example, the fluid may be introduced to fluidic reservoir 115 and transported to the fluidic hub and subsequently, via opening of valve 122, to branching channel 125 and to fluidic reservoir 120. In some embodiments, a particular operation (e.g., lysing, reaction, isolation, amplification, detection) may be conducted in fluidic reservoir 120.

Figure 2:
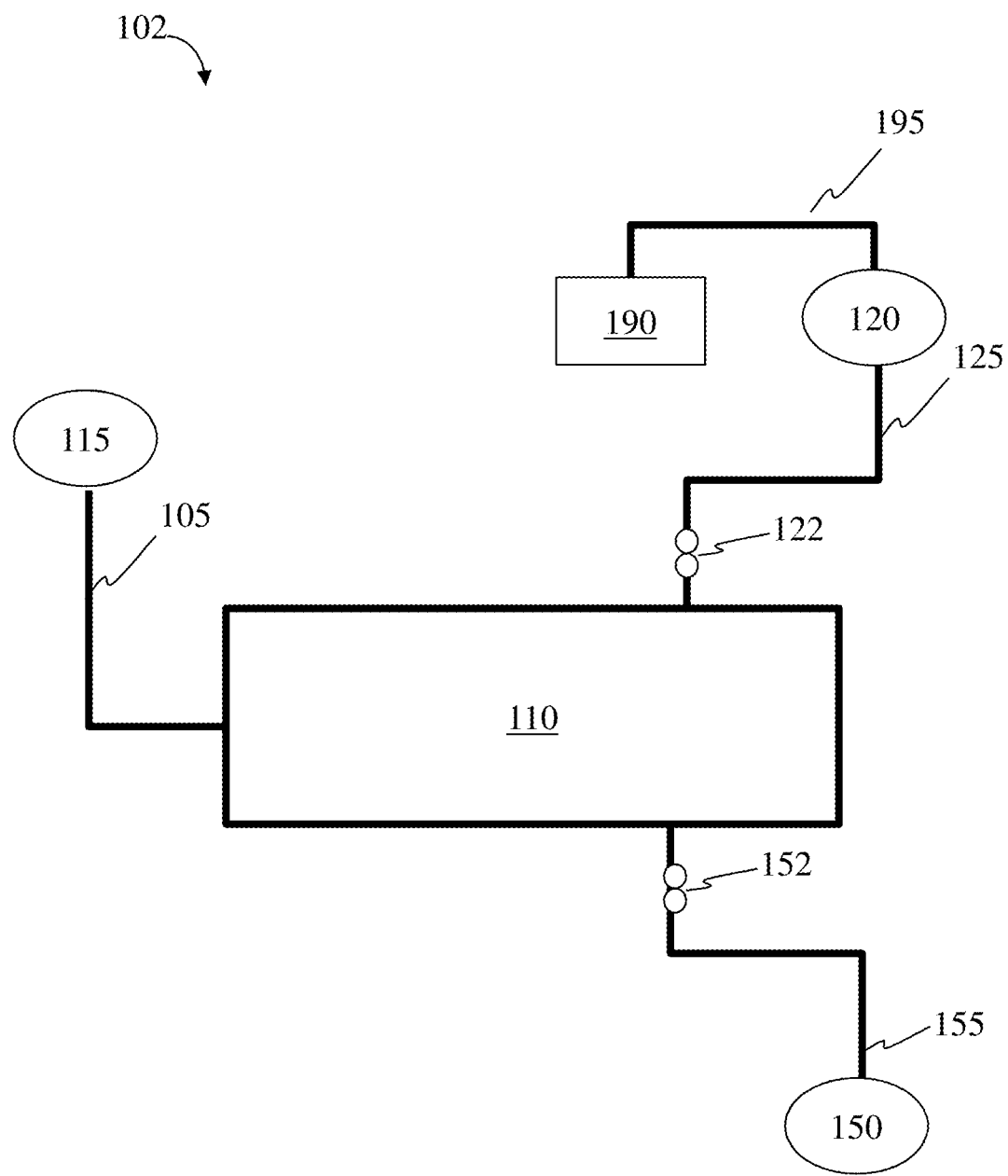
FIG. 2 is a schematic illustration of a fluidic device, according to one set of embodiments.

In some embodiments, a gas chamber may be in fluidic communication with the fluidic reservoir. For example, as illustrated in FIG. 2, fluidic device 102 comprises fluidic reservoir 120 in fluidic communication with a gas chamber 190. In some embodiments, a fluidic conduit (e.g., a fluidic channel) 195 facilitates the fluidic communication between gas chamber 190 and fluidic reservoir 120. In some embodiments, a gas may be flowed from gas chamber 190 to fluidic reservoir 120. In other embodiments, the gas may be flowed from fluidic reservoir 120 to gas chamber 190. In an exemplary embodiment, a gas may be introduced into fluidic hub 110 and transported to branching channel 125 via opening of valve 122, and subsequently transported to fluidic reservoir 120. In some such embodiments, the gas may then be transported from fluidic reservoir 120 to gas chamber 190. As described in more detail below, introducing a gas into the fluidic reservoir may aid in mixing of reagents in the fluidic reservoir.

Figure 3:
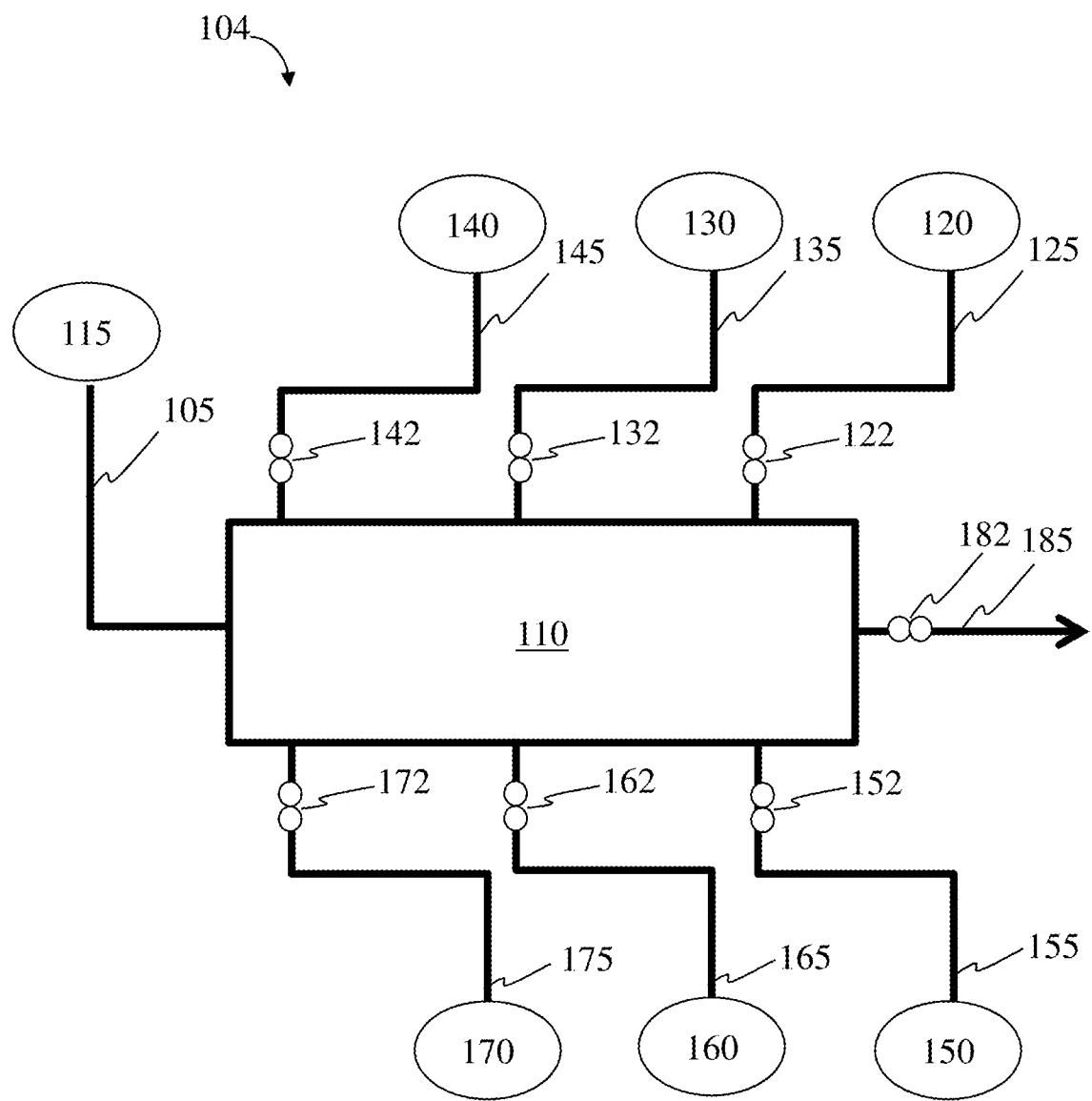
FIG. 3 is a schematic illustration of a fluidic device, according to one set of embodiments.

In certain embodiments, the fluidic device comprises a plurality of fluidic reservoirs and a plurality of branching channels branching from the fluidic hub. In some such embodiments, each fluidic reservoir may be in fluidic communication with the fluidic hub. In some embodiments, a branching channel may be in direct fluidic communication with the fluidic hub. In certain embodiments, one or more valves may be positioned between each branching channel and the fluidic hub. In an exemplary embodiment, as illustrated in FIG. 3, fluidic device 104 comprises a plurality of fluidic reservoirs including fluidic reservoir 115 (e.g., a sample inlet reservoir), fluidic reservoir 120, fluidic reservoir 130, fluidic reservoir 140, fluidic reservoir 150, fluidic reservoir 160, and fluidic reservoir 170. Each fluidic reservoir may be connected to fluidic hub 110 via branching channels 105, 125, 135, 145, 155, 165, and 175, respectively. In some cases, one or more fluidic reservoirs may contain a fluid (e.g., a reactant, a buffer). In certain embodiments, one or more fluidic reservoirs may be utilized for conducting a particular operation (e.g., lysing, isolation, amplification, and/or reacting). In some cases, a valve (e.g., valve 122, valve 132, valve 142, valve 152, valve 162, valve 172) may be positioned between a branching channel and the fluidic hub. In an exemplary embodiment, a fluid may be introduced into fluidic reservoir 115 and transported to fluidic hub 110 (via branching channel 105). In such embodiments, valve 122 may be opened (and several or all other valves closed) such that the fluid is transported from fluidic hub 110 to fluidic reservoir 120 (via branching channel 125). In certain embodiments, valve 132 may then be opened such that the fluid is transported from fluidic reservoir 120 (via branching channel 125) to fluidic hub 110 and into fluidic reservoir 130 (via branching channel 135).

The fluidic device may comprise any suitable number of branching channels. For example, in certain embodiments, the fluidic device comprises at least 2, at least 4, at least 5, at least 10, at least 20, at least 30, or at least 40 branching channels, each channel branching (e.g., extending) from the fluidic hub. In some embodiments, the fluidic device comprises less than or equal to 50, less than or equal to 40, less than or equal to 30, less than or equal to 20, less than or equal to 10, less than or equal to 5, or less than or equal to 4 branching channels, each channel branching from the fluidic hub. Combinations of the above-referenced ranges are also possible (e.g., at least 2 and less than or equal to 50). Other ranges are also possible.

In certain embodiments, the fluidic device comprises a plurality of fluidic reservoirs, each reservoir connected to a branching channel in fluidic communication with the fluidic hub. For example, in certain embodiments, the fluidic device comprises at least 2, at least 4, at least 5, at least 10, at least 20, at least 30, or at least 40 fluidic reservoirs, each reservoir in fluidic communication (e.g., connected to) a branching channel. In some embodiments, the fluidic device comprises less than or equal to 50, less than or equal to 40, less than or equal to 30, less than or equal to 20, less than or equal to 10, less than or equal to 5, or less than or equal to 4 fluidic reservoirs, each reservoir in fluidic communication (e.g., connected to) a branching channel. Combinations of the above-referenced ranges are also possible (e.g., at least 2 and less than or equal to 50). Other ranges are also possible.

In some cases, the fluidic device may comprise one or more additional chambers and/or regions in fluidic communication with the fluidic hub. For example, referring again to FIG. 3, in some embodiments (e.g., after conducting a series of operations in the plurality of fluidic reservoirs), a fluid may be transported from fluidic hub 110 to fluidic channel 185 (e.g., via opening of valve 182). Fluidic channel 185 may be in fluidic communication with, for example, one or more processing chambers and/or one or more detection regions, as described in more detail below.

In some cases, the gas chamber may be open to atmosphere (e.g., for venting of a gas). In certain embodiments, the gas chamber may be in fluidic communication with a pressure source, such that a pressure can be applied to a second fluid (e.g., a gas) within the gas chamber such that the second fluid pushes a first fluid contained within a fluidic reservoir in fluidic communication with the gas chamber.

As described above, in some embodiments, the fluidic device comprises a gas chamber in fluidic communication with a fluidic reservoir. In some embodiments, the gas chamber may have a particular volume. In certain embodiments, the gas chamber has a volume of at least 0.1 mL, at least 0.2 mL, at least 0.5 mL, at least 1 mL, at least 2 mL, or at least 5 mL. In certain embodiments, the gas chamber have a volume of less than or equal to 10 mL, less than or equal to 5 mL, less than or equal to 2 mL, less than or equal to 1 mL, less than or equal to 0.5 mL, or less than or equal to 0.2 mL. Combinations of the above referenced ranges are also possible (e.g., at least 0.1 mL and less than or equal to 10 mL). Other ranges are also possible.

As described above, in some embodiments, a fluid may be transported between the fluidic hub and one or more fluidic reservoirs. In some embodiments, the fluid may be reacted with a reagent present in the fluidic reservoir to form a reacted fluid in the fluidic reservoir. In some such embodiments, a pressure may be applied to the reacted fluid such that the reacted fluid flows into the fluidic hub. For example, in some embodiments, a pressure may be applied to a gas chamber in fluidic communication with the fluidic reservoirs such that the reacted fluid flows into the fluidic hub. In certain embodiments, the fluid may then be transported (e.g., by continuing to apply pressure) to one or more additional branching channels. For example, as illustrated in FIG. 2, a fluid may be flowed from fluidic hub 110 into fluidic reservoir 120 (via branching channel 125 upon opening of valve 122) and reacted with a reagent to form a reacted fluid. In some embodiments, a pressure may be applied to the reacted fluid via gas chamber 190 such that the reacted fluid flows from fluidic reservoir 120 and into fluidic hub 110. Upon opening of valve 152, the reacted fluid may flow from fluidic hub 110 and into branching channel 155. In some embodiments, the fluid may undergo a series of additional reactions and/or operations by flowing between one or more additional fluidic reservoirs. In an exemplary embodiment, the reacted fluid may be flowed from the second fluidic reservoir into the fluidic hub and subsequently flowed into a third fluidic reservoir (e.g., for reacting with one or more additional reagents).

In some embodiments, a constant differential pressure is applied to the various components (e.g., gas chambers, fluidic reservoirs, fluidic hub, and/or fluids contained therein) of the fluidic device. In certain embodiments, the opening and/or closing of one or more valves facilitates the flow of a fluid between one or more fluidic reservoirs and the fluidic hub. In some cases, the different pressure prohibits flow between one or more fluidic reservoirs. In some embodiments, the constant differential pressure is a positive pressure. In certain embodiments, the constant differential pressure is a negative pressure. In some cases, the constant differential pressure may be at least 0.1 psig, at least 0.2 psig, at least 0.3 psig, at least 0.5 psig, at least 0.8 psig, at least 1 psig, at least 2 psig, at least 5 psig, at least 10 psig, or at least 15 psig. In certain embodiments, the constant different pressure is less than or equal to 20 psig, less than or equal to 15 psig, less than or equal to 10 psig, less than or equal to 5 psig, 2 psig, less than or equal to 1 psig, less than or equal to 0.8 psig, less than or equal to 0.5 psig, less than or equal to 0.3 psig, or less than or equal to 0.2 psig. Combinations of the above-referenced ranges are also possible (e.g., at least 0.1 psig and less than or equal to 20 psig). Other ranges are also possible.

In some embodiments, a first fluid (e.g., a liquid) may be transported by pushing (i.e., displacing) the first fluid with a second fluid, immiscible with the first fluid. In certain embodiments, the second fluid is a gas. For example, in some embodiments, a fluidic reservoir may comprise the first fluid (e.g., a stored reagent) and a second fluid may be introduced into the fluidic reservoir, displacing the first fluid from the fluidic reservoir (e.g, into the fluidic hub via a branching channel). In certain embodiments, a fluidic channel (e.g., a branching channel) may comprise the first fluid and the second fluid may be introduced into the fluidic channel, displacing the first fluid from the branching channel (e.g., into a fluidic reservoir, into the fluidic hub). In some embodiments, a constant differential pressure may be applied to the second fluid such that the second fluid contacts and pushes the first fluid.

In an exemplary embodiment, a first fluid may be introduced into a first branching channel, and a second fluid in the first branching channel, while the first branching channel is in in fluidic communication with the fluidic hub. Referring again to FIG. 2, in some embodiments, branching channel 125 may be in fluidic communication with fluidic hub 110 (e.g., via opening of valve 122) and branching channel 155 may not be in fluidic communication with the fluidic hub (e.g., via closing of valve 152). In some such embodiments, a fluid present in branching channel 125 may be pushed by a second fluid introduced into branching channel 125 (e.g., from gas chamber 190 via fluidic conduit 195), and the fluid is pushed into fluidic hub 110. In some embodiments, the second fluid enters the fluidic hub.

In some embodiments, the first fluid (e.g. the first fluid pushed by the second fluid) may have a particular volume. For example, in some embodiments, the first fluid has a volume of at least 0.1 mL, at least 0.2 mL, at least 0.5 mL, at least 1 mL, at least 2 mL, or at least 5 mL. In certain embodiments, the first fluid may have a volume of less than or equal to 10 mL, less than or equal to 5 mL, less than or equal to 2 mL, less than or equal to 1 mL, less than or equal to 0.5 mL, or less than or equal to 0.2 mL. Combinations of the above referenced ranges are also possible (e.g., at least 0.1 mL and less than or equal to 10 mL). Other ranges are also possible.

In some embodiments, the second fluid is immiscible with the first fluid. In certain embodiments, the second fluid comprises a gas (e.g., a sterilized gas). In certain traditional fluidic (e.g., microfluidic) devices it is generally undesirable to flow gases in the system since they can introduce air bubbles that can inhibit flow of liquids. Advantageously, the use of gases in the fluidic devices described herein may be useful for facilitating the flow of one or more fluids within the system and/or to promote mixing of fluids as described in more detail herein.

As described above, in some embodiments, the fluidic device comprises at least one fluidic channel in fluidic communication with a fluidic reservoir. A fluidic channel described herein (e.g., a branching channel, a hub channel) can have a particular average cross-sectional dimension. The "cross-sectional dimension" (e.g., a diameter, a width) of the channel is measured perpendicular to the direction of fluid flow. In some embodiments, the average cross-sectional dimension of the at least one channel is less than or equal to about 3 mm, less than or equal to about 2 mm, less than or equal to about 1 mm, less than or equal to about 800 microns, less than or equal to about 600 microns, less than or equal to about 500 microns, less than or equal to about 400 microns, less than or equal to about 300 microns, less than or equal to about 200 microns, less than or equal to about 175 microns, less than or equal to about 150 microns, or less than or equal to about 125 microns. In certain embodiments, the average cross-sectional dimension of the at least one channel is greater than or equal to about 100 microns, greater than or equal to about 125 microns, greater than or equal to about 150 microns, greater than or equal to about 175 microns, greater than or equal to about 200 microns, greater than or equal to about 250 microns, greater than or equal to about 300 microns, greater than or equal to about 400 microns, greater than or equal to about 500 microns, greater than or equal to about 600 microns, greater than or equal to about 800 microns, greater than or equal to about 1 mm, or greater than or equal to about 2 mm.

Combinations of the above-referenced ranges are also possible (e.g., between about 250 microns and about 2 mm, between about 400 microns and about 1 mm, between about 300 microns and about 600 microns). Other ranges are also possible. The dimensions of the channel may also be chosen, for example, to allow a certain volumetric or linear flowrate of fluid in the channel and/or to hold a certain volume of fluid in the channel. Of course, the number of channels and the shape of the channels can be varied by any method known to those of ordinary skill in the art. The fluidic channel can have any cross-sectional shape (circular, oval, triangular, irregular, trapezoidal, square or rectangular, or the like).

One or more fluidic channels may also have a channel length-to-width ratio (length to average cross sectional dimension) of at least 5:1, at least 6:1, at least 8:1, at least 10:1, at least 20:1, at least 50:1, or at least 100:1.

A fluidic channel can have any suitable volume. In some embodiments, the volume of a fluidic channel (e.g., a branching channel, a hub channel) may be at least 0.1 microliters, at least 0.5 microliters, at least 1 microliter, at least 2 microliters, at least 5 microliters, at least 10 microliters, at least 25 microliters, at least 50 microliters, at least 100 microliters, at least 200 microliters, at least 500 microliters, or at least 1000 microliters. In certain embodiments, the volume of one or more fluidic channels may be less than or equal to 2000 microliters, less than or equal to 1000 microliters, less than or equal to 500 microliters, less than or equal to 200 microliters, less than or equal to 100 microliters, less than or equal to 50 microliters, less than or equal to 25 microliters, less than or equal to 10 microliters, less than or equal to 5 microliters, less than or equal to 2 microliters, less than or equal to 1 microliter, or less than or equal to 0.5 microliters. Combinations of the above referenced ranges are also possible (e.g., at least 0.1 microliters and less than or equal to 2000 microliters, at least 0.1 microliters and less than or equal to 1000 microliters). Other ranges are also possible.

A fluidic channel (e.g., a branching channel, a hub channel) may also have any suitable length. In some embodiments, one or more fluidic channels have a length of at least 1 cm, at least 2 cm, at least 5 cm, at least 10 cm, or at least 20 cm. In certain embodiments, one or more fluidic channels may have a length of less than or equal to 30 cm, less than or equal to 10 cm, less than or equal to 5 cm, or less than or equal to 2 cm. Combinations of the above-referenced ranges are possible (e.g., at least 1 cm and less than or equal to 30 cm). Other ranges are also possible.

Figure 4:
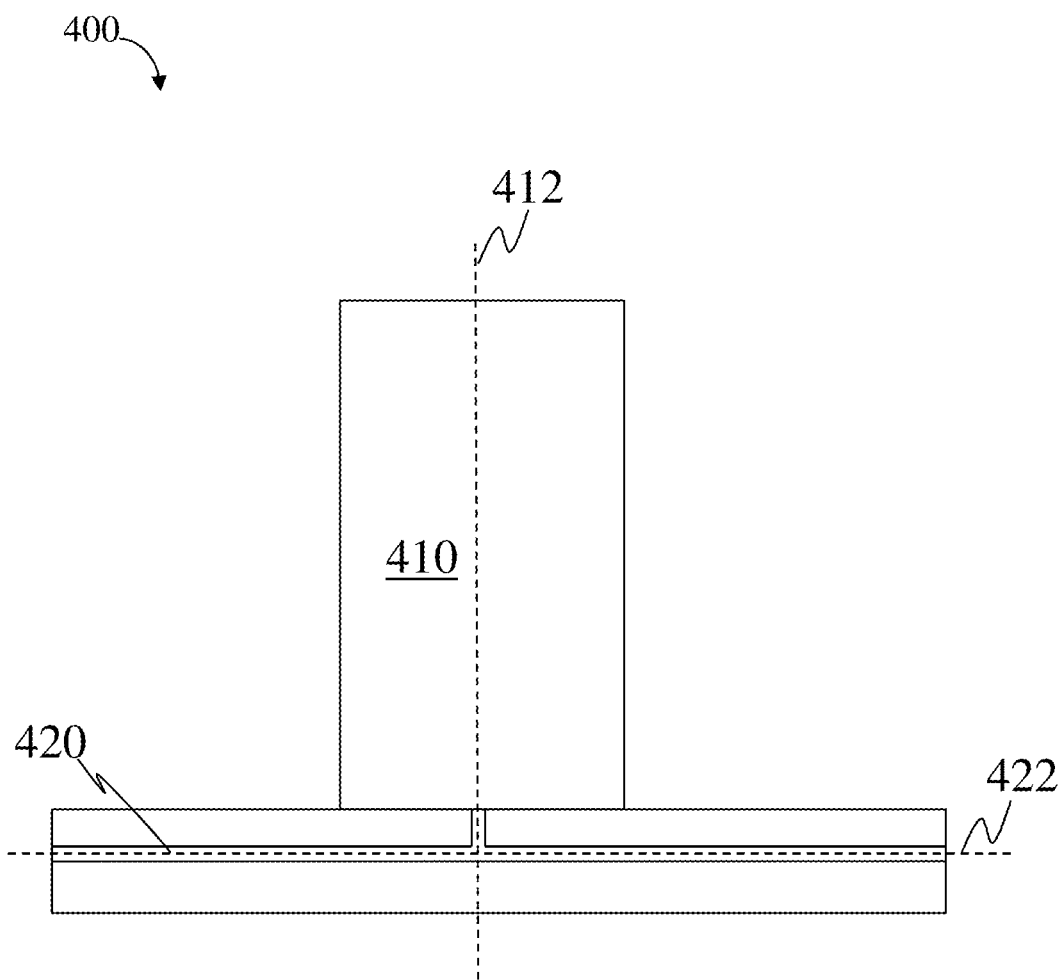
FIG. 4 is a schematic illustration of a fluidic device, according to one set of embodiments.

In some embodiments, a longitudinal axis of at least one fluidic channel is substantially perpendicular to a longitudinal axis (e.g., height) of at least one fluidic reservoir. For example, as illustrated in FIG. 4, fluidic device 400 comprises fluidic reservoir 410 and fluidic channel 420.

In some embodiments, longitudinal axis 412 of fluidic reservoir 412 is substantially perpendicular to longitudinal axis 422 of fluidic channel 420. As shown illustratively in this figure, the longitudinal axis 412 of fluidic reservoir 412 lies on a different plane than longitudinal axis 422 of fluidic channel 420. By extending the longitudinal axis (e.g., height) of the reservoir, this configuration may allow the fluidic reservoir to hold a greater amount of volume compared to a configuration in which the longitudinal axes of the fluidic reservoir and the fluidic channel (connected to the fluidic reservoir) are on the same plane or are parallel to one another.

In some embodiments, at least one fluidic channel described above is a branching channel. In certain embodiments, the fluidic hub is a fluidic channel, as described herein (e.g., having a length of at least 1 cm).

In some embodiments, each fluidic reservoir may have a particular volume. For example, in some embodiments, each fluidic reservoir may have a volume of at least 0.1 mL, at least 0.2 mL, at least 0.5 mL, at least 1 mL, at least 2 mL, at least 5 mL, at least 10 mL, at least 25 mL, or at least 50 mL. In certain embodiments, each fluidic reservoir may have a volume of less than or equal to 100 mL, less than or equal to 50 mL, less than or equal to 25 mL, less than or equal to 10 mL, less than or equal to 5 mL, less than or equal to 2 mL, less than or equal to 1 mL, less than or equal to 0.5 mL, or less than or equal to 0.2 mL. Combinations of the above referenced ranges are also possible (e.g., at least 0.1 mL and less than or equal to 100 mL). Other ranges are also possible.

In some embodiments, a fluidic reservoir may be a storage reservoir (e.g., for storing one or more reagents for conducting a particular operation). The reagent may be stored and sealed in the fluidic reservoir, e.g., prior to use of the fluidic device by the user and/or prior to insertion of a sample into the device. In some embodiments, one or more reagents contained within a fluidic reservoir may be a liquid reagent (e.g., a wash buffer, a lysis reagent, an isolation reagent). In certain embodiments, one or more reagents contained within a fluidic reservoir may be a dry, lyophilized, and/or pelleted reagent. In some such embodiments, the stored reagent may be suspended (e.g., upon introduction of a fluid into the fluidic reservoir containing the stored reagent).

In some cases, a fluidic reservoir may define a region for conducting a particular operation. In some embodiments, a fluidic reservoir may be reused and define a region for conducting more than one operation. In some cases, one or more operations may be conducted in parallel (e.g., in one or more fluidic reservoirs).

In some cases, a fluidic reservoir may be reused for two or more operations. In certain embodiments, a first fluidic reservoir may be used for a first reaction and, after the fluid has been flowed to one or more additional fluidic reservoirs, the fluid may be flowed again to the first fluidic reservoir for conducting a second reaction, the same or different than the first reaction. In an exemplary embodiment, a first operation such as lysing may be conducted in the first fluidic reservoir, and after the fluid has been flowed to one or more additional fluidic reservoirs (e.g., for conducting one or more particular operations), the fluid may be flowed to the first fluidic reservoir for a second operation such as mixing. Those skilled in the art would understand that using the fluidic reservoir for lysing and mixing operations are by way of example only, and that one or more operations described herein may be conducted in the same or different reservoirs. In some cases, the fluidic reservoir may be reused as a waste reservoir (e.g., for storing waste fluids remaining after a particular operation conducted in a different reservoir). Advantageously, the ability to reuse one or more fluidic reservoirs as a waste reservoir may, for example, reduce the size and cost of the fluidic device as compared to other fluidic devices for sample detection and analysis, and/or may remove the need to removal of waste products and/or fluids during operation of the fluidic device.

It should be appreciated although detection is primarily described herein, in some embodiments, the fluidic devices and methods described herein may be used for monitoring various processes, events or conditions such as microbial load. For example, a device or method may be used for monitoring changes in microbial loads from samples originating from multiple sources (e.g., bodily locations) and/or for monitoring changes in microbial load over time and/or in response to an applied treatment. The fluidic devices and methods described herein may be used for determining quantitative effects of microbial load (e.g., as well as qualitative ones) in some embodiments. Monitoring may occur in a single detection event, periodically or continuously.

In certain embodiments, one or more fluidic reservoirs and/or one or more fluidic channels may be heated. In some embodiments, the fluidic reservoirs and/or one or more fluidic channels may be heated by one or more heating elements proximate the fluidic reservoir including, for example, resistance heaters, thermo-electric heaters, optical heaters, or the like. In some embodiments, one or more fluidic reservoirs (or one or more fluids contained and/or stored therein) may be heated to a particular temperature (e.g., for a given operation such as lysing, isolation, amplification, detection). For example, in certain embodiments, one or more fluidic reservoirs and/or one or more fluidic channels may be heated to at least 5° C., at least 10° C., at least 15° C., at least 20° C., at least 25° C., at least 30° C., at least 35° C., at least 37° C., at least 40° C., at least 50° C., at least 60° C., at least 70° C., at least 75° C., at least 80° C., at least 85° C., at least 90° C., at least 95° C., at least 100° C., or at least 110° C. In certain embodiments, one or more fluidic reservoirs and/or one or more fluidic channels may be heated to a temperature of less than or equal to 120° C., less than or equal to 110° C., less than or equal to 100° C., less than or equal to 95° C., less than or equal to 90° C., less than or equal to 85° C., less than or equal to 80° C., less than or equal to 75° C., less than or equal to 70° C., less than or equal to 60° C., less than or equal to 50° C., less than or equal to 40° C., less than or equal to 37° C., less than or equal to 35° C., less than or equal to 30° C., less than or equal to 25° C., less than or equal to 20° C., less than or equal to 15° C., or less than or equal to 10° C. Combinations of the above-referenced ranges are possible (e.g., at least 5° C. and less than or equal to 100° C.). Other ranges are also possible. In some cases, the temperature may be cycled (e.g., during an amplification operation). For example, in some embodiments, the temperature may be cycled between 50° C. and 120° C., or between 70° C. and 120° C. or between about 25° C. and 75° C.

In some embodiments, a valve may be positioned between a branching channel and the fluidic hub. For example, referring again to FIG. 1, in certain embodiments, a valve 122 may be positioned between branching channel 125 and fluidic hub 110. In some embodiments, the valve is a flow-gate. In certain embodiments, the valve may be a membrane-based valve. For example, a piston may be disposed on the membrane-based valve such that the valve is closed. In certain embodiments, the piston may be raised such that the valve is opened. Other flow-restricting valves are also possible including, but not limited to, miniature solenoids, manifolds, deformable gels, and/or membranes to control the passage or flow of fluid from the fluidic hub to one or more branching channels. In some embodiments, the fluidic devices and/or methods described herein may comprise one or more valves (e.g., flow-gates) described in U.S. Pat. No. 9,132,426, issued Sep. 15, 2015, and entitled "Simplified gating method for sealing and flow control in micro and nano devices", which is incorporated herein by reference in its entirety for all purposes. Other valves are also possible.

In some cases, the fluidic conduit positioned between a gas chamber and a fluidic reservoir comprises a valve (e.g., a flow-gate).

In some embodiments, the fluidic device comprises one or more lysis regions. In some embodiments, one or more lysis regions are in fluidic communication with a fluidic channel (e.g., a fluidic hub). In certain embodiments, one or more lysis regions are in fluidic communication with an isolation region, as described herein. In some cases, one or more lysis regions may be in fluidic communication with one or more additional regions comprising one or more fluidic reservoirs described herein. In some embodiments, one or more lysis regions may be in fluidic communication with the fluidic hub. In certain embodiments, the lysing operation comprises chemical lysing, including, for example, exposing a patient's sample to a chemical lysing reagent that results in the opening or rupturing of a cell membrane of the select eukaryotic cell. In certain embodiments, the fluidic reservoir contains one or more lysing reagents (e.g., stored lysing reagents) prior to the flow of the sample to the fluidic reservoir. In other embodiments, one or more lysing reagents may be added to the fluidic reservoir after the flow of the sample to the fluidic reservoir. Referring again to FIG. 3, in an exemplary embodiment, fluidic device 104 comprises a first lysis region comprising fluidic reservoir 120 for conducting a first lysing operation and a second lysis region comprising fluidic reservoir 130 for conducting a second lysing operation. In some embodiments, the first lysis region comprises one or more stored lysing reagents. In certain embodiments, the second lysis region comprises one or more stored lysing reagents, which may be the same or different from the lysing reagents in the first lysis region. In some cases, the fluid (e.g., the sample) may be flowed to the first lysis region and one or more lysing reagents may be added to the first lysis region (e.g., a lysing reagent(s) flowed from one or more additional fluidic reservoirs including the lysing reagent(s)). In some cases, the fluid (e.g., the sample) may be flowed to the second lysis region and one or more lysing reagents may be added to the second lysis region (e.g., lysing reagent(s) flowed from one or more additional fluidic reservoirs including the lysing reagent(s)).

In some embodiments, one or more lysing operations comprises the lysing of select eukaryote cells (e.g., select eukaryote cells present in a patient's sample). In some embodiments, the lysing operation releases mammalian DNA from the sample (e.g., such that it may be isolated and/or removed from the sample). In certain embodiments released select eukaryote DNA may be isolated and/or removed from the sample after lysing thus depleting the select eukaryote genomic material from the sample.

In some embodiments, the lysing operation comprises the lysing of one or more microbial cells. In some embodiments, the lysing operation releases microbial genomic material from the microbial cells into the fluid (e.g., such that it may be isolated, amplified, and/or detected). In some cases, lysing of one or more microbial cells occurs after the lysing of select eukaryote cells. In some such embodiments, prior to lysing of one or more microbial cells, the sample has been substantially depleted of select eukaryote DNA. In alternative embodiments, lysing of one or more microbial cells is conducted without the lysing of select eukaryote cells. In certain embodiments, after lysing of select eukaryote cells, but prior to lysing of the microbial cells, at least a portion of the microbial cells may be intact (e.g., unlysed).

Lysing solutions, lysing reagents and lysing conditions are as described herein.

In some embodiments, the fluidic device comprises one or more isolation regions. In certain embodiments, one or more isolation regions are in fluidic communication with one or more lysis regions. In some embodiments, one or more isolation regions may be in fluidic communication with the fluidic hub. In some cases, one or more isolation regions may be in fluidic communication with one or more additional regions comprising one or more fluidic reservoirs described herein. In certain embodiments, after one or more lysing operations, lysed genomic material (e.g., select eukaryotic genomic material, microbial genomic material) may be isolated and/or separated from the fluid. In some cases, the genomic material is isolated by binding with a support substrate and separating the support substrate and genomic material from the fluid. Referring again to FIG. 3, in an exemplary embodiment, after the first lysing operation is performed, the fluid (e.g., containing the lysed material) is flowed to a first isolation region comprising fluidic reservoir 140 for conducting a first isolation operation (e.g., to remove/deplete select eukaryote genomic material from the fluid). In some such embodiments, the fluid (e.g., substantially depleted of select eukaryote genomic material) may then be transported to fluidic reservoir 130 for a second lysis operation. After the second lysing operation is performed, the fluid may be flowed to a second isolation region comprising fluidic reservoir 150 for conducting a second isolation operation (e.g., to remove/deplete select eukaryote genomic material from the fluid, to isolate microbial genomic material from the fluid). Those skilled in the art would understand, based upon the teachings of this specification, that two or more, three or more, four or more, or five or more lysing operations may be performed (e.g., in two or more fluidic reservoirs) prior to an isolation operation.

The microbial genetic material may be isolated via anion exchange within the fluidic device using the methods described herein. A support substrate may be added to, or contained within, one or more fluidic reservoirs (e.g., within one or more isolation regions) for performing an isolation operation. In certain embodiments, the genomic material (e.g., lysed genomic material) binds to at least a portion of a support substrate. The genomic material may attach or bind to a support substrate in any suitable manner.

In some embodiments, at least one anion exchanger bound to the support substrate, is contacted and/or incubated with the fluid (e.g., the lysed fluid). In some embodiments, after contacting and/or incubation with the fluid, the anion exchanger is removed from the fluid. In another embodiment, after contacting and/or incubation with the fluid, the anion exchanger is immobilized and the fluid is removed.

Genomic material may be isolated from a fluid by, for example, applying a magnetic field to a fluidic reservoir containing the genomic material bound to the support substrate, such that the support substrate is attracted to the magnetic field source, and the fluid can be removed (e.g., flowed) out of the fluidic reservoir. The removed fluid can be flowed to, for example, a waste fluidic reservoir.

In certain embodiments, during and/or after the isolation operation, the isolated genomic material may be eluted. For example, in some embodiments, competition of the isolation process is facilitated by eluting or removing the genomic material off of the anion-exchanger and/or support substrates. In some embodiments, the elution of the genomic material comprises adding an elution buffer (e.g., stored within a fluidic reservoir in fluidic communication with the fluidic hub, and transported to the isolation region). In certain embodiments, during and/or after the isolation operation, the isolated genomic material bound to the anion exchanger may be washed prior to elution.

In some embodiments, the fluidic device comprises an amplification region. In certain embodiments, the amplification region is in fluidic communication with at least one reaction region. In some cases, the amplification region may be in fluidic communication with one or more additional regions comprising one or more fluidic reservoirs described herein. In some embodiments, the amplification region is in fluidic communication with the fluidic hub. In certain embodiments, after one or more lysing and/or isolation operations, microbial genomic material may be amplified. Referring again to FIG. 3, in an exemplary embodiment, fluidic device 104 may comprise an amplification region comprising fluidic reservoir 170. In some such embodiments, fluidic reservoir 170 may comprise one or more reagents for amplification of genomic material. In certain embodiments, one or more reagents (e.g., stored in one or more additional fluidic reservoirs) may be flowed to fluidic reservoir 170 to perform the amplification operation. In some embodiments, the genomic material amplified is RNA or DNA. In some embodiments, the DNA is single stranded DNA (ssDNA) and/or double stranded DNA (dDNA). In some embodiments, the DNA is ribosomal DNA (rDNA).

In some embodiments, the amplicon generated during the amplification operation may be diluted. In certain embodiments, an invasion buffer may be added to the fluid comprising the amplicon generated during the amplification operation. For example, in certain embodiments, referring again to FIG. 3, fluidic reservoir 170 may comprise the product of an amplification operation and an invasion buffer (e.g., an invasion buffer stored in one or more additional fluidic reservoirs) may be flowed into fluidic reservoir 170. Invasion buffers are described in more detail, below.

In some embodiments, the fluidic device comprises one or more reaction regions (e.g., comprising one or more fluidic reservoirs). In certain embodiments, one or more reaction regions are in fluidic communication with one or more isolation regions. In some cases, one or more lysis regions may be in fluidic communication with one or more additional regions comprising one or more fluidic reservoirs described herein. In some embodiments, one or more reaction regions may be in fluidic communication with the fluidic hub. In some embodiments, the reaction region comprises a washing operation. Referring again to FIG. 3, in an exemplary embodiment, fluidic reservoir 160 may comprise a washing region for conducting a washing operation. In some embodiments, the washing region comprises one or more wash buffers. The wash buffers may be stored and sealed in the fluidic reservoir, e.g., prior to use of the fluidic device by the user and/or prior to insertion of a sample into the device. In some cases, the fluid (e.g., the sample) may be flowed to the washing region and one or more wash buffers may be added to the washing region (e.g., a wash buffer(s) flowed from one or more additional fluidic reservoirs storing the wash buffer(s)). In certain embodiments, a fluidic reservoir comprises of an isolation region and a washing region. That is to say, in some embodiments, a fluid (e.g., a sample) may be present in a fluidic reservoir in which a particular operation has been performed (e.g., lysing, isolation) and a wash buffer may be added to the fluidic reservoir (e.g., a wash buffer(s) flowed from one or more additional fluidic reservoirs) to wash any unbound components and/or waste reagents.

In some embodiments, after binding the microbial genomic material to the anion-exchanger bound to the support substrate, the support substrates are washed using a wash buffer. In some such embodiments, and prior to the washing operation, the anion exchanger bound to microbial genomic material is immobilized such that and unbound material can be removed without the substantial loss of microbial genomic material.

In some embodiments, one or more reaction regions comprises neutralization (e.g., with a base or an acid) of the fluid. For example, in some embodiments, an acid may be added to the fluid in one or more fluidic reservoirs to alter the pH of the fluid. Acids and bases may be stored in one or more reservoirs as described herein.

In certain embodiments, one or more reaction regions comprises or contains stored duplex DNA Invading Artificial Nucleic Acids (DIANAs) (e.g., for detection of one or more microbial pathogens.)

In some embodiments, one or more fluids contained within a fluidic reservoir may be mixed. In certain embodiments, mixing comprises agitation such as mechanical agitation (e.g., ultrasonic agitation).

In some embodiments, the devices and methods described herein may facilitate the mixing of two or more fluids (e.g., a sample and a reagent) without the use of a mixing component (e.g., propeller, etc.). In some cases, mixing may be performed by flowing a stream of gas (e.g., a sterilized gas) into a fluidic reservoir before, during, and/or after a particular operation. The stream of gas may be flowed for any suitable time (e.g., at least 1 s, 3 s, 5 s, 7 s, 10 s, 15 s, 20 s, 30 s, 45 s, 60 s; and/or less than 120 s, 60 s). In some such embodiments, the stream of gas need not be continuous, but can be pulsed. In some such embodiments, the stream of gas may cause mixing and/or homogenization of the one or more fluids and/or reagents within a fluidic reservoir. The gas may be flowed from, for example, the fluidic hub into the fluidic reservoir and, from the fluidic reservoir, to the gas chamber in fluidic communication with the fluidic reservoir. The flow of gas through the fluidic reservoir containing one or more fluids (and one or more reagents) and into the gas chamber may cause the one or more fluids and the one or more reagents to mix. In some embodiments, the flow of gas through the fluid contained within the fluidic reservoir results in turbulent flow within the fluid. Without wishing to be bound by theory, turbulent flow may result in mixing of the fluid(s) and/or reagent(s) within the fluidic reservoir.

For example, referring again to FIG. 2, a fluid may be introduced into fluidic reservoir 120. In some embodiments, a gas may be flowed from fluidic hub 110 into fluidic reservoir 120 (via valve 122 and branching channel 125) such that the gas flows into the fluidic reservoir through the fluid. In some such embodiments, the gas (but not the fluid) may flow into fluidic conduit 195 in fluidic communication gas chamber 190. In some embodiments, the gas chamber may be open to atmosphere and the gas vents to atmosphere.

In certain embodiments, the first fluid and/or reagents are substantially inhibited from flowing into the gas chamber. For example, in some embodiments, a valve (or flow-gate) positioned between the fluidic reservoir and the gas chamber may inhibit one or more fluids and/or reagents from flowing into the gas chamber, while selectively permitting the gas to flow into the gas chamber.

In certain embodiments, the fluidic reservoirs are constructed, arranged, and operated in order to perform a set of particular operations. In an exemplary embodiment, the set of operations includes selective depletion of select eukaryote DNA from a sample (e.g., via lysing of select eukaryote cells and/or isolating extracting their genomic material), lysing of one or more microbial cells in the same, isolation of microbial genomic material (e.g, DNA and/or RNA), amplification of the microbial genomic material, reaction with duplex DNA Invading Artificial Nucleic Acids (DIANAs), and detection of one or more microbial pathogen. In some such embodiments, one or more additional washing, isolation, reaction, mixing, or other operations may also be conducted.

Figure 5:
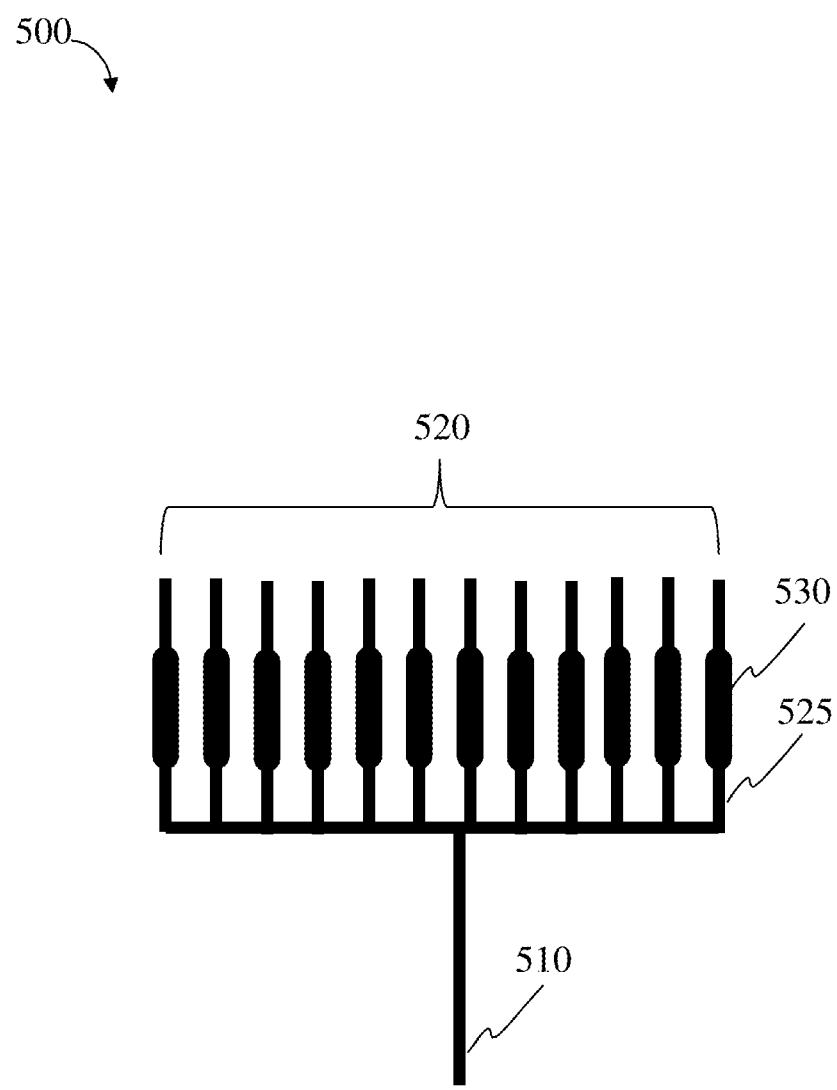
FIG. 5 is a schematic illustration of a fluidic device, according to one set of embodiments.

In some embodiments, after one or more operations described above, the fluid (e.g., the fluid including the amplicon(s) and/or an invasion buffer) may be divided into one or more processing chambers for metering, (e.g., in metering channels) DIANA binding/invasion, and/or detection (e.g., a detection region). In some embodiments, one or more processing chambers are each in fluidic communication with at least one reaction region and/or the amplification region. In some cases, one or more processing chambers may be in fluidic communication with one or more additional regions comprising one or more fluidic reservoirs described herein. In some embodiments, one or more processing chambers may be in fluidic communication with the fluidic hub. In some embodiments, the fluidic device comprises two or more, three or more, four or more, six or more, eight or more, ten or more, twelve or more, fourteen or more, or sixteen or more processing chambers. For example, as illustrated in FIG. 5, fluidic device 500 comprises fluidic channel 510 in fluidic communication with plurality of processing chambers 520 each comprising a metering channel 525. In certain embodiments, each metering channel has the same length, volume, length-to-width ratio, and or cross-sectional dimension as one another. In some cases, the use of metering channels divides a fluid flowing into each metering channel substantially equally. Advantageously, the use of metering channels may produce two or more volumes of fluid that are substantially equal (e.g., such that detection of one or more pathogens contained within the fluid are conducted at equal volumes and substantially simultaneously).

In certain embodiments, the processing chamber comprises a detection region. For example, referring again to FIG. 5, each processing chamber comprises detection region 530 in fluidic communication with metering channel 525. In some embodiments, each detection region may be in fluidic communication with one or more additional regions comprising one or more fluidic reservoirs described herein. In certain embodiments, each detection region is in fluidic communication with each processing chamber. In some cases, one or more detection regions may be in fluidic communication with the fluidic hub. In some embodiments, one or more probes targeting desired pathogens are contained within each detection region. In some such embodiments, the presence of one or more microbial pathogens may be detected by the binding of one or more probes with the pathogen and generating a signal. In some embodiments, the signal is detectable through optical, chemical, electrical, or mechanical detection methods.

In some embodiments, after an amplification operation, the amplicon which were developed/created during enzymatic amplification may be detected and/or identified (e.g., within a metering channel).

In some embodiments, DNA Invading Artificial Nucleic Acids (DIANAs) may be used detect and identify microbial genomic materials. For example, in some embodiments, DIANAs may be added to a fluidic reservoir containing the amplicons produced during the amplification operation. In certain embodiments, one or more DIANAs may be present in the detection region of one or more metering channels.

Figure 6A:
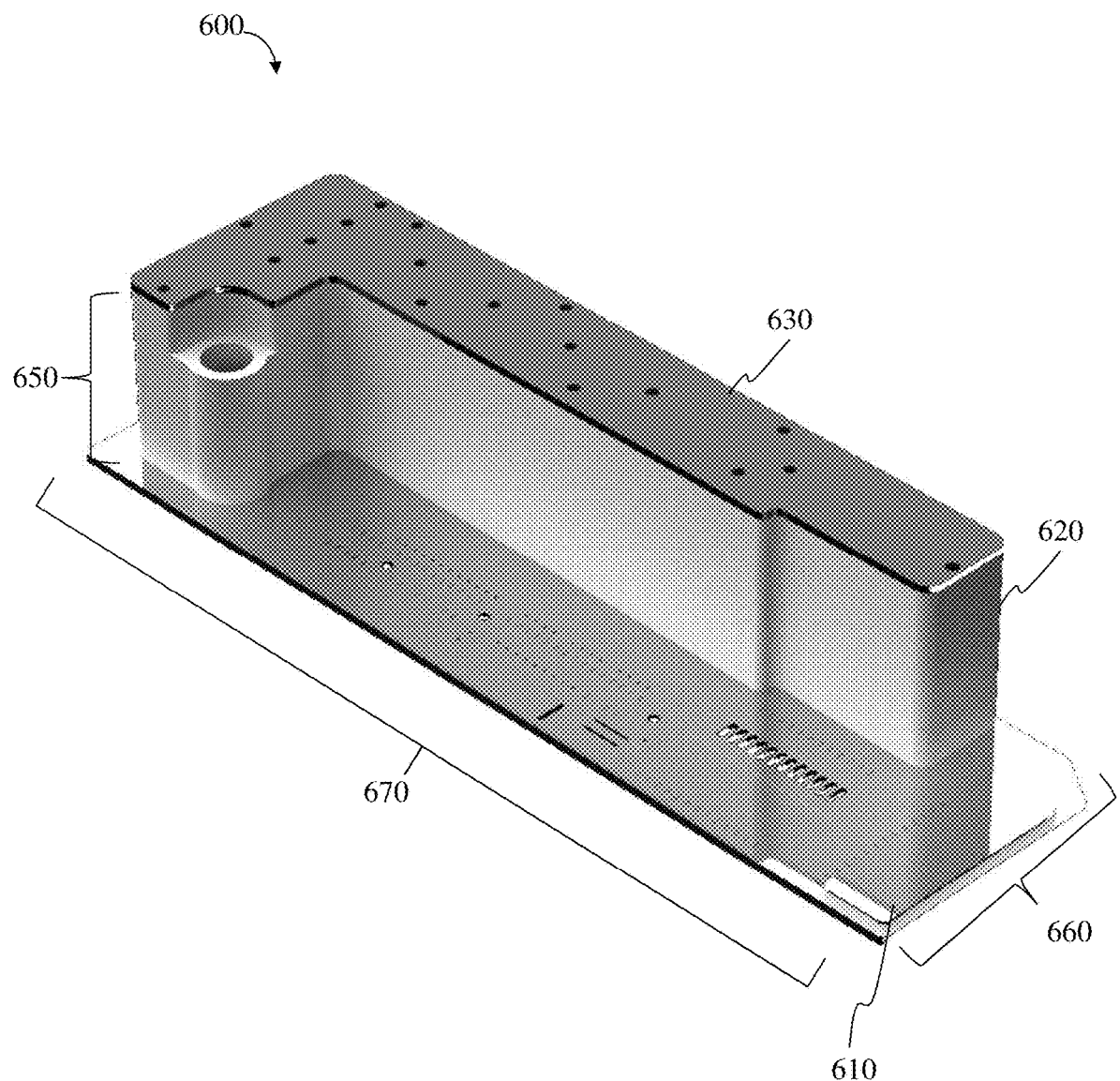
FIG. 6A is a schematic illustration of an exemplary fluidic device, according to one set of embodiments.

An exemplary perspective view of a fluidic device is shown in FIG. 6A. In some embodiments, fluidic device 600 comprises a first region 610 comprising a plurality of fluidic channels and a second region 620 comprising a plurality of fluidic reservoirs. In some cases, the fluidic device comprises cover 630 comprising a plurality of fluidic conduits (e.g., fluidic conduits positioned between one or more gas chambers and one or more fluidic reservoirs).

Figure 6B:
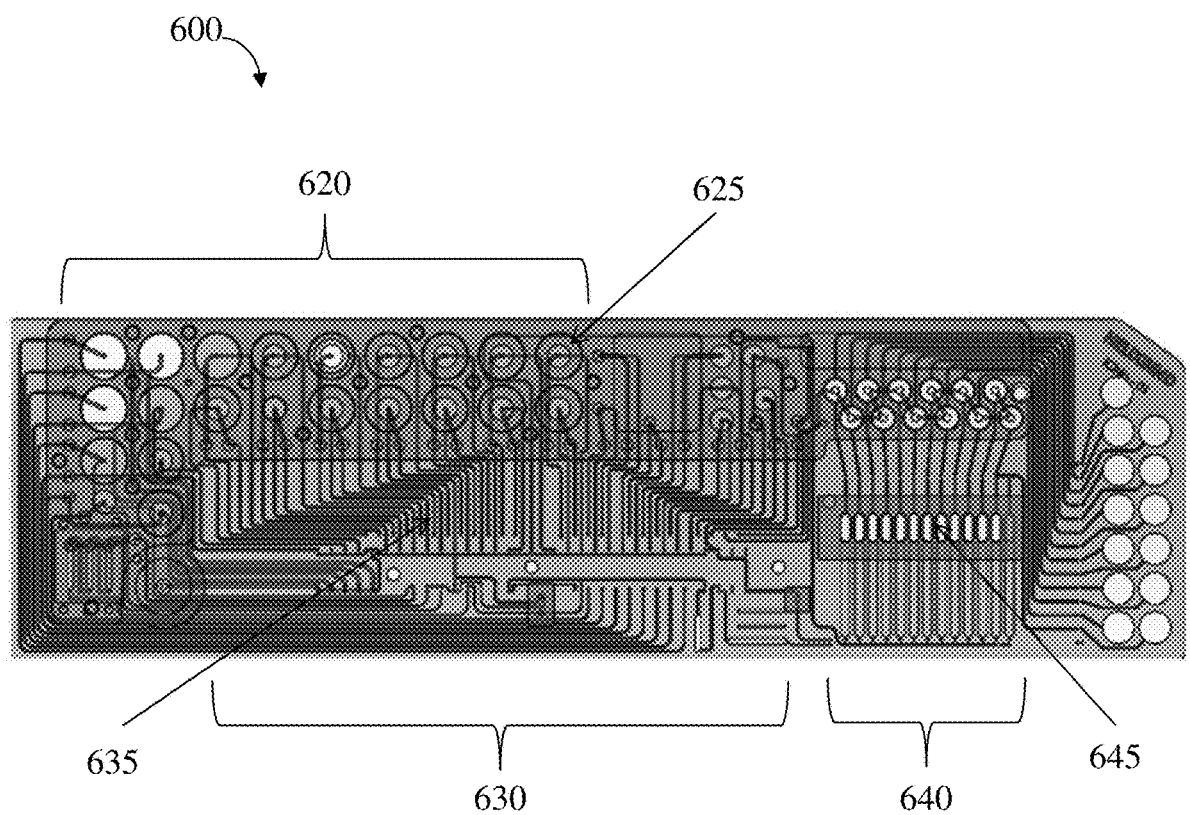
FIG. 6B is a schematic illustration of an exemplary fluidic device, according to one set of embodiments.

FIG. 6B is a top-down view of fluidic device 600. In some embodiments, second region 620 comprises one or more fluidic reservoirs including, for example, exemplary fluidic reservoir 625. In certain embodiments, first region 610 comprises a plurality of fluidic channels including, for example, exemplary fluidic channels 635. As illustrated in FIG. 6B, the fluidic device further comprises a plurality of metering channels 640 (each metering channel comprising detection region 645).

In some embodiments, first region 610 comprising the plurality of fluidic channels further comprises a thin-film (e.g., a thin film polymer) attached to the bottom of the fluidic device (e.g., to enclose the fluidic channels). In some cases, the thin-film attached to the bottom of the device has relatively high optical transparency (e.g., to facilitate efficient detection of any optical signal emitted from one or more detection regions).

In some embodiments, the fluidic device has an overall width, an overall height, and an overall length. For example, referring again to FIG. 6B, fluidic device 600 has an overall height 650, and overall width 660, and an overall length 670.

In certain embodiments, the fluidic device has a ratio of overall height to overall width of at least 1:1, at least 2:1, at least 3:1, at least 5:1, or at least 10:1. In some embodiments, the fluidic device has a ratio of overall height to overall length of at least 1:1, at least 2:1, at least 3:1, at least 5:1, or at least 10:1.

In certain embodiments, the fluidic device has a particular overall width. In some embodiments, the fluidic device has a width of about 2-5 inches, about 2.5-5 inches, 3-6 inches.

In certain embodiments, the fluidic device has a particular overall length. In some embodiments, the fluidic device has a length of about 5-12 inches, about 6-16 inches, or 8-20 inches.

In some embodiments, the fluidic device occupies a particular surface area. In some embodiments, the fluidic device occupies a surface area of about 10-63 inches squared, about 17-85 inches squared, about 23-115 inches squares, or about 28-120 inches squared. The surface area as described herein is measured on the largest cross-section of the fluidic device parallel to the plurality of fluidic channels (and perpendicular to at least one fluidic reservoir).

In some embodiments, the fluidic device includes an opening for adding the sample, e.g., injecting the sample into the sample inlet reservoir. In some embodiments, the opening has a re-sealable cover. In some embodiments, opening the cover requires mechanical force, wherein without mechanical force the cover remains closed. In some embodiments, the opening is covered with a membrane through which the sample is inserted.

In some embodiments, the fluid sample or specimen is flowed to the fluidic device via a receptacle in the fluidic device constructed and arranged to receive and extract a fluid samples from a vacuette or similar specimen tube or vial.

In some embodiments, the fluidic device comprises a receptacle constructed and arranged to receive a Monovette. By applying force/pressure on the plunger of the Monovette, the fluid specimen from the Monovette is flowed to the fluidic device via the receptacle. In some embodiments, the fluidic device comprises a receptacle constructed and arranged to receive a Vacuette. In some embodiments, the fluidic device comprises a receptacle constructed and arranged to receive any container capable and/or storing and/or transporting a fluid.

In some embodiments, the fluidic device is constructed and arranged to incorporate one or more tubes designed to flow the sample from a specimen vial or receptacle. In some embodiments, such tubes, each and individually, may provide positive pressure, negative pressure, and/or ambient pressure to facilitate the flow of the sample into the device. In some embodiments one or more tubes are designed to work in tandem, and/or in parallel, and or serially, to enable efficient flow of the sample into the device. In some embodiments, only a single tube is required.

In some embodiments, and in cases where more than a single tube may be used to flow the sample from the vial to the fluidic device may be placed in in close proximity, a non-limiting example would be 'side-by-side'. In another non-limiting example, one tube may be placed inside another tube.

In some embodiments, these tubes may serve to puncture the seal of the vial prior to enabling flow of the sample to the fluidic device.

In some embodiments, the sample is flowed from the vial to the fluidic device through pneumatic force, whereas in other cases it might be mechanical or electrical.

In some embodiments, the methods and/or devices described herein may be utilized for the analysis (e.g., identification, and/or detection, and/or screening, and/or qualification) of more than 10 individual microbial pathogens from a single whole-blood sample. In some embodiments, the whole-blood sample introduced into the fluidic device has a volume of at least 1 mL. In some cases, the methods and/or fluidic devices described herein may be utilized for the analysis (e.g., identification, and/or detection, and/or screening, and/or quantification, and/or monitoring) of bacteria and/or fungi. In some embodiments, the analysis comprises high sensitivity chemiluminescent detection.

In some embodiments, the methods and/or devices lyse both bacteria and fungi in a single reaction, in parallel, though chemical reactions (e.g., without the use of mechanical or electrical forces). In certain embodiments, the methods and/or devices described herein comprise depletion of select eukaryote DNA from a whole-blood sample without the use of a centrifuge. In certain embodiments, the methods and/or devices described herein does not shear genomic material during the lysis process (e.g., thereby enabling the extraction and/or isolation of high molecular weight genomic material of which is typically over 5 kbp in length). In certain embodiments, the methods and/or devices described herein comprise enzymatically producing amplicons greater than 1000 bp in length. In some cases, the method and/or devices described herein comprise immobilizing DNA to a solid substrate in under 30 minutes wherein the DNA length is greater than 1 kbp.

In some embodiments, the methods and/or devices described herein do not require the use of any chaotropic salt for any of its processes.

In some embodiments, one or more operations, or set of operations, described herein may be conducted semiautomatically or automatically.

In certain embodiments, one or more fluidic reservoirs may store one or more reagents and/or may be configured to receive a waste fluid.

In some embodiments, the methods and/or devices comprise the transfer (e.g., flow) of one or more fluids along three planes (X, Y, and Z) in both positive and negative directionality (e.g., through the use of flow restriction structures). In certain embodiments, the plurality of fluidic channels used for transferring fluids from a first fluidic reservoir to a second fluidic reservoir are located within a single plane. In certain embodiments, one or more fluids flowed in the fluidic device may have a relatively large volume (e.g., 0.5-10 ml) or a relatively reduced volume (e.g., 0.01 μl-500 μl).

In some cases, the methods and/or devices comprises mixing, agitation, and/or homogenization of a fluid (e.g., and one or more reagents) via the addition, either as a stream or as a pulsation, of a sterile gas to a chamber.

Combinatorics Microbial Detection

In certain embodiments, the methods and/or devices described herein comprise DIANA probes to capture and immobilize DNA to a solid surface or substrate with sequence high sequence specificity. In some cases, the methods and/or devices described herein comprise combining a plurality of DIANA probes within one or more processing chambers such that a combination of one or more signals elucidates the identification of the pathogen (e.g., thereby reducing the number of processing chambers needed to elucidate the identification of the pathogen).

In some embodiments, the location of the detection region will yield the information as to which target was captured (e.g., due to the presence of a DIANA probe). In some embodiments, a combination of detected color (e.g., when fluorescence is used as the optical detection modality) and location can be used to decipher which target was captured.

In some embodiments, the presence of a signal (e.g., an optical signal) in one or more of the detection regions indicates the presence of the genomic material of a particular microbial pathogen. In some embodiments, the detection of a particular analyte (e.g., microorganism or pathogen) is provided through a combinatorics (e.g., multiplexing) method. In such an approach, the number of analytes detected may be larger than the number of active detection regions used for detection. In some embodiments, the fluidic device comprises two or more detection regions. In some embodiments, the particular combination of detection regions that detect one or more amplicons (e.g., by producing a detectable signal such as an optical signal) may indicate the presence of one or more particular pathogen.

In one, non-limiting, example, a signal detected in a first detection region and a second detection region, but not a third detection region, indicates the presence of a first pathogen in the patient sample. A signal detected in the first detection region and the third detection region, but not the second detection region, indicates the presence of a second pathogen in the patient sample, different than the first pathogen.

The use of a combinatorics approach to detection may provide several advantages over traditional 1-to-1 detection methods (e.g., detection of a pathogen in a single well, and/or single pathogen detection across multiple wells) including, for example, simplified fluidic channel design, reduced footprint, reduced processing times, increased accuracy, and/or simplified detection.

In some embodiments, a single type of optical signal (e.g., an optical signal at a particular wavelength) may be used for the detection of a plurality of pathogens. For example, a single fluorescent tag may be used in the fluidic device and, in the presence of a pathogen, one or more detection regions produce a detectable optical signal from the fluorescent tag indicating the presence of the genomic material of a particular microbial pathogen.

In the case of pathogen-specific genomic material, one could identify the different pathogenic genomic material (PGM) associated with a particular pathogen as $PGM_n$, wherein n=1, 2, 3, . . . , n. For example, in some embodiments, in a fluidic device design to identify one of fifteen potential pathogens, the fluidic device could identify $PGM_n$ wherein n=1, 2, 3, . . . , 15, where the fifteen potential pathogens could be detected using 8 detection regions. In an exemplary embodiment, shown in Table 6, the presence of particular capture oligomers in one or more detection regions would indicate the presence of a particular pathogen in the patient sample.

TABLE 6

| Detection Region | DIANA Capture Oligomers |
| --- | --- |
| 1 | $PGM_1 + PGM_2 + PGM_3 + PGM_4 + PGM_5$ |
| 2 | $PGM_6 + PGM_7 + PGM_8 + PGM_9 + PGM_{10}$ |
| 3 | $PGM_{11} + PGM_{12} + PGM_{13} + PGM_{14} + PGM_{15}$ |
| 4 | $PGM_1 + PGM_6 + PGM_{11}$ |
| 5 | $PGM_2 + PGM_7 + PGM_{12}$ |
| 6 | $PGM_3 + PGM_8 + PGM_{13}$ |
| 7 | $PGM_4 + PGM_9 + PGM_{14}$ |
| 8 | $PGM_5 + PGM_{10} + PGM_{15}$ |

For example, in a particular embodiment, if a detectable signal is generated in detection regions 1 and 4, the only common PGM is $PGM_1$, indicating the particular pathogen present in the patient sample corresponding to $PGM_1$. As another example, in another embodiment, if a detectable signal is generated in detection regions 1 and 7, the only common PGM is $PGM_4$, indicating the particular pathogen present in the patient sample corresponding to $PGM_4$.

The terms "panel" or "menu", as are used herein, refer to the microorganisms that any given assay is designed to detect. For example, if an assay is designed to detect $PGM_n$ microorganisms, then there will be n distinct microorganisms in the panel.

Those skilled in the art would understand, based upon the teachings of this specification, that such a combinatorics approach is not limited to 15 potential pathogens and/or 8 detection regions, but that the combinatorial method could be used to detect two or more, four or more, six or more, eight or more, ten or more, twelve or more, fifteen or more, or twenty or more, fifty or more, one-hundred or more, two hundred or more, five-hundred or more pathogens using two or more (e.g., four or more, six or more, eight or more, ten or more, twelve or more, fifteen or more, twenty-five or more, fifty or more) detection regions.

In some embodiments, the detection of one or more pathogens does not use a combinatorics approach. For example, each detection region, in certain embodiments, corresponds to a single pathogen.

Culture-Free Microbial Diagnosis of Infective Endocarditis

Infective Endocarditis (IE) affects >45,000 patients in the US annually, predominantly those with preexisting conditions such as heart valve damage or invasive procedures, and is characterized by high morbidity and mortality (20-40%). IE is now considered one of the most life-threatening infections in the US. IE can occur when bacteria or fungi adhere to the endocardial surface and form small lesions or 'vegetations'. These vegetations contain high pathogen concentrations, and are not only difficult to eradicate, but induce 'persistent septicemia' as the microorganisms are continuously released into the bloodstream.

The inconsistent and non-specific clinical presentation of IE presents a significant challenge to accurate and timely diagnosis. Currently, IE is diagnosed through a diverse set of criteria (Duke criteria) which include patient medical history, febrile response, echocardiograms and, crucially, microbiological evidence based on positive blood cultures.

Poor outcomes, in turn, have been directly linked to the inability to correctly diagnose IE early enough in the disease's time course. As prognosis deteriorates rapidly in the absence of proper antimicrobial intervention, it is well accepted that time to confirmation of the bloodstream infection (BSI) with the corresponding ID of the microorganism is one of the key determinants of outcome. However, current diagnostic standards to detect microorganisms rely on blood cultures, which are not only time-consuming, but also ineffective in detecting fastidious pathogens or an infection from patients pre-treated with antibiotics, resulting in a significant numbers of culture-negative IE cases. Although current molecular methods have the potential to overcome some of these problems, they have significant shortcomings with respect to panel size, sensitivity, level of detail, and time requirements, and therefore, clinical acceptance is low. Given that timely BSI confirmation with the corresponding ID is a prerequisite to proper disease management, the current microbiological diagnostic protocol is clearly outdated.

Among diagnostic criteria to establish IE, culturing results are indispensable. The use of blood cultures to identify the etiologic agent of IE has, however, two major weaknesses which delay the administration of the proper antimicrobial therapy: (1) long turnaround time of days or even weeks and (2) high prevalence of false-negatives due to either pre-treatment with antibiotics or the presence of difficult to culture pathogens. As is described herein, the methods described herein excel at detecting a large panel of pathogens at very low loads.

Pathogens prevalent in cases of IE include, for example, *Staphylococcus aureus*, Coagulase Negative Staphylococci (CoNS), *Enterococcus faecalis*, *Streptococcus pneumoniae*, *Streptococcus agalactiae*, *Streptococcus pyogenes*, *Candida albicans*, *Candida parapsilosis*, viridans group streptococci (VGS; specifically, *Streptococcus mitis*, *Streptococcus oralis*, *Streptococcus mutans*, *Streptococcus sanguinis*, *Streptococcus anginosis*, and *Streptococcus salivarius*), *Streptococcus galloyticus*, and the HACEK group, comprising of *Haemophilus parainfluenzae*, *Aggregatibacter actinomycetemcomitans*, *Cardiobacterium hominis*, *Eikenella corrodens*, *Kingella* spp., *Coxiella burnetii*, and *Bartonella* spp. In some embodiments, a test panel or test menu comprises all of the preceding pathogens. In some embodiments, a test panel or test menu comprises a subset of the preceding pathogens. In some embodiments, a test panel or test menu comprises only one of the preceding pathogens. In some embodiments, a test panel or test menu comprises some or all of the preceding pathogens and additional microorganisms not listed.

DIANAs that bind to the single species or group of microbes associated with endocarditis and/or sepsis are listed in Table 7. In some embodiments, one of the DIANA probes listed in Table 7 is used in the methods, devices, and kits described herein, e.g., in a method of identifying a single species or group of microbes which is associated with endocarditis and/or sepsis. In some embodiments, some of the DIANA probes listed in Table 7 are used in the methods, devices, and kits described herein, e.g., in a method of identifying a single species or group of microbes which is associated with endocarditis and/or sepsis. In some embodiments, all of the DIANA probes listed in Table 7 are used in the methods, devices, and kits described herein, e.g., in a method of identifying a single species or group of microbes which is associated with endocarditis and/or sepsis. In some embodiments, some or all of the DIANA probes listed in Table 7 are used in combination with DIANA probes not listed in Table 7 in the methods, devices, and kits described herein, e.g., in a method of identifying a single species or group of microbes which is associated with endocarditis and/or sepsis.

TABLE 7

DIANAs and microorganisms commonly associated with infective endocarditis

| Microorganism | Seq ID |
| --- | --- |
| *Staphylococcus Aureus* | 001 |
| Coagulase Negative *Staphylococci* | 002, 003, and 020-031 |
| *Enterococcus Faecalis* | 004 |
| *Streptococcus pneumoniae* | 005 |
| *Streptococcus agalactiae* | 006 |
| *Streptococcus Pyogenes* | 007 |
| *Candida Albicans* | 015 |
| *Candida parapsilosis* | 016 |
| *Viridans streptococci* | 059-063 |
| *Eikenella corrodens* | 032-038 |
| *Kingella kingae* | 039-045 |
| *Aggregatibacter actinomycetemcomitans* | 046-050 |
| *Haemophilus parainfluenzae* | 051, and 052 |
| *Haemophilus influenzae* | 053-058 |
| *Cardiobacterium hominis* | 125-131 |
| *Coxiella burnetii* | 068-124 |
| *Bartonella* spp. | 064-067 |
| X | X |

In some embodiments, DIANAs that bind to the single species or group of microbes associated with endocarditis and/or sepsis comprise SEQ ID NOs: 1-7, 15, 16, and 20-131. In some embodiments, one of the DIANA probes having the sequence of SEQ ID NOs: 1-7, 15, 16, and 20-131 is used in the methods, devices, and kits described herein, e.g., in a method of identifying a single species or group of microbes which is associated with endocarditis and/or sepsis. In some embodiments, some of the DIANA probes having the sequence of SEQ ID NOs: 1-7, 15, 16, and 20-131 are used in the methods, devices, and kits described herein, e.g., in a method of identifying a single species or group of microbes which is associated with endocarditis and/or sepsis. In some embodiments, all of the DIANA probes having the sequence of SEQ ID NOs: 1-7, 15, 16, and 20-131 are used in the methods, devices, and kits described herein, e.g., in a method of identifying a single species or group of microbes which is associated with endocarditis and/or sepsis. In some embodiments, some or all of the DIANA probes having the sequence of SEQ ID NOs: 1-7, 15, 16, and 20-131 are used in combination with DIANA probes not having the sequence of SEQ ID NOs: 1-7, 15, 16, and 20-131 in the methods, devices, and kits described herein, e.g., in a method of identifying a single species or group of microbes which is associated with endocarditis and/or sepsis.

Exemplary DIANA probe sequences for *Staphylococcus aureus*, Coagulase Negative Staphylococci, *Enterococcus* faecalis, Streptococcus pneumoniae, Streptococcus agalactiae, Streptococcus pyogenes, Candida albicans, and Candida parapsilosis are shown in Table 1. Exemplary DIANA probe sequences for Coagulase Negative Staphylococci, Viridans streptococci, Eikenella corrodens, Kingella kingae, Aggregatibacter actinomycetemcomitans, Haemophilus parainfluenzae, Haemophilus influenza, Cardiobacterium hominis, Coxiella burnetii, and Bartonella spp. are shown in Table 2. Additional DIANA probe sequences for Staphylococcus aureus, Coagulase Negative Staphylococci (CoNS), Enterococcus faecalis, Streptococcus pneumoniae, Streptococcus agalactiae, Streptococcus pyogenes, Candida albicans, and Candida parapsilosis have been identified in WO2013176992A2.

A non-limiting example of 8-well detection system for the fluidic device described herein incorporating the microorganisms or pathogens listed in Table 7 is shown in Table 8. In the example illustrated in Table 8, pathogen ID can be determined based on an optical signature from two detection wells, rather than just one. For example, a S. aureus infection would be identified by signals from wells #2 and #5, and would be discriminated from an E. faecalis infection, which would be identified by wells #2 and #7.

use of blood culturing is the only method to detect the etiologic agent of a BSI and is a crucial impediment to improved patient care.

The use of cultures to identify the etiologic agent of neonatal BSIs has two major weaknesses which delay the administration of the proper antimicrobial: (1) Long turn-around time of days, and (2) high prevalence of false-negative results, often due to pre-treatment with antibiotics (often from the mother), combined with a reduced blood draw volume lowering sensitivity. While molecular methods, in principle, are capable of tackling these issues, they have been unable to consistently reach the required sensitivity, cover a sufficient number of pathogens simultaneously, or reach the level of detail required to provide actionable information. In contrast to blood culturing, the claimed methods, devices and kits allow the rapid and accurate identification of low levels of microorganisms in small volumes of blood.

Pathogens prevalent in cases of neonatal sepsis include, for example, Staphylococcus aureus, Coagulase Negative Staphylococci (CoNS), Enterococcus faecalis, Enterococcus faecium, Streptococcus pneumoniae, Streptococcus agalactiae, Streptococcus pyogenes, Candida albicans, Candida

TABLE 8

| | DIANA Probe 1 | | DIANA Probe 2 | | DIANA Probe 3 | | DIANA Probe 4 | | DIANA Probe 5 |
|---|---|---|---|---|---|---|---|---|---|
| Well 1 | H. parainfluenzae | + | A. actinomycetemcomitans | + | C. hominis | + | E. corrodens | + | Kingella spp. |
| Well 2 | S. aureus | + | CoNS | + | E. faecalis | + | Viridans group | + | |
| Well 3 | S. pneumoniae | + | S. agalactiae | + | S. pyogenes | + | S. gallolyticus | + | |
| Well 4 | C. albicans | + | C. parapsilosis | + | C. burnetii | + | Bartonella spp. | + | |
| Well 5 | H. parainfluenzae | + | S. aureus | + | S. pneumoniae | + | C. albicans | + | |
| Well 6 | A. actinomycetemcomitans | + | CoNS | + | S. agalactiae | + | C. parapsilosis | + | |
| Well 7 | C. hominis | + | E. faecalis | + | S. pyogenes | + | C. burnetii | + | |
| Well 8 | E. corrodens | + | Kingella spp. | + | Viridans group | + | S. gallolyticus | + | Bartonella spp. |

Culture-Free Microbial Identification of Pathogens Prevalent in Neonatal Septicemia Neonatal sepsis is a significant health risk for newborns. While advances in patient care have helped to reduce its incidence, an estimated 9,100 newborns are afflicted with this disease in the US annually, and over 3,000 will not survive. It is well documented that the prognosis for these vulnerable patients deteriorates every hour an infection is not appropriately counteracted. Early confirmation of a BSI with the corresponding ID of the microorganism can be the key determinant of outcome as this minimizes the time-lag for targeted antimicrobial intervention. Unfortunately, blood cultures, the current diagnostic standard for detection of BSIs, typically requires several days for results. Moreover, culturing is particularly problematic in newborns as reduced blood-draw volumes often lead to false-negative results, and the prevalence of maternal antibiotics can significantly reduce sensitivity. Faced with this reality, clinicians routinely initiate treatment on a purely empirical basis in the absence of diagnostic confirmation. Although a necessary risk, these approaches are inefficient, expensive, potentially miss the target, and increase the likelihood of complications including adverse responses and drug-drug interactions. For newborns with a BSI, appropriate antimicrobial intervention is critically delayed, while newborns without a BSI are exposed to unnecessary antimicrobials, potentially jeopardizing healthy microbiome development. Thus, the current parapsilosis, viridans group streptococci (VGS; specifically, Streptococcus mitis, Streptococcus oralis, Streptococcus mutans, Streptococcus sanguinis, Streptococcus anginosis, and Streptococcus salivarius), Listeria monocytogenes, Escherichia coli, Enterobacter spp., Klebsiella spp., Pseudomonas aeruginosa, Acinetobacter baumannii, Haemophilus influenza, Neisseria meningitides, Candida albicans, and Candida parapsilosis. In some embodiments, a test panel or test menu comprises all of the preceding pathogens. In some embodiments, a test panel or test menu comprises a subset of the preceding pathogens. In some embodiments, a test panel or test menu comprises only one of the preceding pathogens. In some embodiments, a test panel or test menu comprises some or all of the preceding pathogens and additional microorganisms not listed.

DIANAs that bind to the single species or group of microbes associated with neonatal sepsis are listed in Table 9. In some embodiments, one of the DIANA probes listed in Table 9 are used in the methods, devices, and kits described herein, e.g., in method of identifying a single species or group of microbes which is associated with neonatal sepsis. In some embodiments, some of the DIANA probes listed in Table 9 are used in the methods, devices, and kits described herein, e.g., in method of identifying a single species or group of microbes which is associated with neonatal sepsis. In some embodiments, all of the DIANA probes listed in Table 9 are used in the methods, devices, and kits described herein, e.g., in method of identifying a single species or group of microbes which is associated with neonatal sepsis. In some embodiments, some or all of the DIANA probes listed in Table 9 are used in combination with DIANA probes not listed in Table 9 in the methods, devices, and kits described herein, e.g., in method of identifying a single species or group of microbes which are commonly associated with neonatal sepsis.

TABLE 9

DIANAs and microorganisms commonly associated with neonatal sepsis

| Microorganism | Seq ID |
|---|---|
| Staphylococcus Aureus | 001 |
| Coagulase Negative Staphylococci | 002, 003, and 020-031 |
| Enterococcus Faecalis | 004 |
| Streptococcus Pneumoniae | 005 |
| Streptococcus Agalactiae | 006 |
| Streptococcus Pyogenes | 007 |
| Candida Albicans | 015 |
| Candida Parapsilosis | 016 |
| Viridans Streptococci | 059-063 |
| Enterococcus Faecium | 008 |
| Escherichia coli | 140 |
| Enterobacter spp./Klebsiella spp. | 009 |
| Pseudomonas Aeruginosa | 010, and 011 |
| Serratia Marcescens | 013, and 014 |
| Acinetobacter Baumannii | 012 |
| Listeria monocytogenes | 132-137 |
| Neisseria Meningitides | 138, and 139 |
| Haemophilus Influenza | 053-058 |

DIANAs that bind to the single species or group of microbes commonly associated with neonatal sepsis have the sequence of SEQ ID NOs: 1-16, 20-31, 53-63, and 132-140. In some embodiments, one of the DIANA probes having the sequence of SEQ ID NOs: 1-16, 20-31, 53-63, and 132-140 is used in the methods, devices, and kits described herein, e.g., in method of identifying a single species or group of microbes which are commonly associated with neonatal sepsis. In some embodiments, some of the DIANA probes having the sequence of SEQ ID NOs: 1-16, 20-31, 53-63, and 132-140 are used in the methods, devices, and kits described herein, e.g., in method of identifying a single species or group of microbes which are commonly associated with neonatal sepsis. In some embodiments, all of the DIANA probes having the sequence of SEQ ID NOs: 1-16, 20-31, 53-63, and 132-140 are used in the methods, devices, and kits described herein, e.g., in method of identifying a single species or group of microbes which are commonly associated with neonatal sepsis. In some embodiments, some or all of the DIANA probes having the sequence of SEQ ID NOs: 1-16, 20-31, 53-63, and 132-140 are used in combination with DIANA probes not having the sequence of SEQ ID NOs: 1-16, 20-31, 53-63, and 132-140 in the methods, devices, and kits described herein, e.g., in method of identifying a single species or group of microbes which are commonly associated with neonatal sepsis.

Exemplary DIANA probe sequences for *Staphylococcus aureus*, Coagulase Negative Staphylococci, *Enterococcus faecalis*, *Streptococcus pneumoniae*, *Streptococcus agalactiae*, *Streptococcus pyogenes*, *Candida albicans*, *Candida parapsilosis*, *Pseudomonas aeruginosa*, *Serratia marcescens*, and *Acinetobacter baumannii* are listed in Table 1. Exemplary DIANA probe sequences for Coagulase Negative Staphylococci, *Viridans streptococci*, and *Haemophilus influenzae* are listed in Table 2. Exemplary DIANA probe sequences for *Listeria monocytogenes* and *Neisseria meningitides* are listed in Table 3. Additional DIANA probe sequences for *Staphylococcus aureus*, Coagulase Negative Staphylococci (CoNS), *Enterococcus faecalis*, *Enterococcus faecium*, *Streptococcus pneumoniae*, *Streptococcus agalactiae*, *Streptococcus pyogenes*, *Escherichia coli*, *Enterobacter* spp./*Klebsiella* spp., *Pseudomonas aeruginosa*, *Acinetobacter baumannii*, *Candida albicans*, and *Candida parapsilosis* have been identified in WO2013176992A2.

A non-limiting example of 9-well detection system for the fluidic device described herein incorporating the microorganisms or pathogen listed in Table 9 is shown in Table 10. In the example illustrated in Table 10, pathogen ID will be determined based on an optical signature from two detection wells, rather than just one. For example, a *S. aureus* infection would be identified by signals from wells #2 and #6, and would be discriminated from an *E. faecalis* infection, which would be identified by wells #3 and #6.

TABLE 10

|  | DIANA Probe 1 |  | DIANA Probe 2 |  | DIANA Probe 3 |  | DIANA Probe 4 |
|---|---|---|---|---|---|---|---|
| Well 1 | S. aureus | + | S. agalactiae | + | Enterobacter spp./ Klebsiella spp. | + | C. albicans |
| Well 2 | CoNS | + | S. pyogenes | + | P. aeruginosa | + | C. parapsilosis |
| Well 3 | E. faecalis | + | Viridans group | + | A. baumannii | + | N. meningitides |
| Well 4 | E. faecium | + | L. monocytogenes | + | H. influenza | + | E. coli |
| Well 5 | S. pneumoniae | + | E. coli | + | N. meningitides | + |  |
| Well 6 | S. aureus | + | CoNS | + | E. faecalis | + | E. faecium |
| Well 7 | S. agalactiae | + | S. pyogenes | + | Viridans group | + | L. monocytogenes |
| Well 8 | Enterobacter spp./ Klebsiella spp. | + | P. aeruginosa | + | A. baumannii | + | H. influenza |
| Well 9 | C. albicans | + | C. parapsilosis | + | S. pneumoniae | + |  |

Culture-Free Microbial Detection of Gram-Positive Pathogens Prevalent in Bloodstream Infections and their Resistance Conferring Mechanisms Bacteremia, i.e., sepsis, continues to be a significant healthcare burden in the US. As prognosis deteriorates by the hour, early diagnosis has long been established as vital for providing the best patient care. Current diagnostic standards using blood culturing are ill-fitted for timely diagnosis as they take days to deliver results. Moreover, culturing tends to be inhibited by antimicrobials, adding uncertainty to negative results. Considering the rapid decline of survival rates if proper antibiotics are not administered within a few hours, clinicians routinely initiate treatment on a purely empirical basis in the absence of diagnostic confirmation. These empirical interventions rely on 'best-guess' approaches which are inefficient, expensive, potentially miss the target and increase the likelihood of complications including adverse responses and drug-drug interactions. However, this is a necessary risk given the lack of timely information. Thus, a key advance critical to reducing the mortality rate is the early identification of bacterial pathogens and their resistance traits directly from clinical specimens, without culturing, enabling a hypothesis driven first-line intervention.

The 'need-to-culture' has been repeatedly identified as the most significant barrier to a targeted therapeutic intervention. The methods, devices, and kits described herein provide a culture-free approach to rapidly and accurately identifying pathogens in the blood.

The methods, devices, and kits described herein are directed to detecting infection with a subset of pathogens prevalent in sepsis, specifically Gram-positive bacteria and to detecting their resistance mechanisms. Pathogens prevalent in cases of sepsis include, for example, *Staphylococcus aureus*, Coagulase Negative Staphylococci (CoNS), *Enterococcus faecalis*, *Enterococcus faecium*, *Streptococcus pneumoniae*, *Streptococcus agalactiae*, *Streptococcus pyogenes*, and *viridans* group streptococci (VGS; specifically, *Streptococcus mitis*, *Streptococcus oralis*, *Streptococcus mutans*, *Streptococcus sanguinis*, *Streptococcus anginosis*, and *Streptococcus salivarius*). In some embodiments, a test panel or test menu comprises all of the preceding pathogens. In some embodiments, a test panel or test menu comprises a subset of the preceding pathogens. In some embodiments, a test panel or test menu comprises only one of the preceding pathogens. In some embodiments, a test panel or test menu comprises some or all of the preceding pathogens and additional microorganisms not listed.

In some embodiments, a panel or menu comprises some or all of the preceding pathogens and marker for antimicrobial resistance conferring genetic material, or antimicrobial resistance conferring gene. In some embodiments, a panel or menu comprises some or all of the preceding pathogens and one or more markers for antimicrobial resistance conferring genetic material. In some embodiments, a panel or menu comprises one or more markers for antimicrobial resistance conferring genetic material. Antimicrobial resistance conferring genetic material include, for example, MecA, MecC and VanA and/or VanB.

DIANAs that bind to genetic material which may confer reduced susceptibility or resistance to antimicrobials are shown in Table 11, e.g., SEQ ID NOs: 141-372. In some embodiments, one of the DIANA probes listed in Table 11, e.g., SEQ ID NOs: 1-8, 20-31, 59-63, and 141-372, is used in the methods, devices, and kits described herein, e.g., methods for identifying genetic material which may confer reduced susceptibility or resistance to antimicrobials. In some embodiments, some of the DIANA probes listed in Table 11, e.g., SEQ ID NOs: 1-8, 20-31, 59-63, and 141-372, are used in the methods, devices, and kits described herein, e.g., methods for identifying genetic material which may confer reduced susceptibility or resistance to antimicrobials. In some embodiments, all of the DIANA probes listed in Table 11, e.g., SEQ ID NOs: 1-8, 20-31, 59-63, and 141-372, are used in the methods, devices, and kits described herein, e.g., methods for identifying genetic material which may confer reduced susceptibility or resistance to antimicrobials. In some embodiments, some or all of the DIANA probes listed in Table 11, e.g., SEQ ID NOs: 1-8, 20-31, 59-63, and 141-372, are used in combination with DIANA probes not listed in Table 11 in the methods, devices, and kits described herein, e.g., methods for identifying genetic material which may confer reduced susceptibility or resistance to antimicrobials.

TABLE 11

DIANAs and microorganisms associated with Gram positive bloodstream infections and antimicrobial resistance or reduced antimicrobial susceptibility.

| Target | Seq ID |
|---|---|
| *Staphylococcus aureus* | 1 |
| Coagulase Negative *Staphylococci* | 2, 3, and 20-31 |
| *Enterococcus faecalis* | 4 |
| *Enterococcus faecium* | 8 |
| *Streptococcus pneumoniae* | 5 |
| *Streptococcus agalactiae* | 6 |
| *Streptococcus pyogenes* | 7 |
| *Viridans streptococci* | 059-063 |
| Gene(s) conferring resistance to antistaphylococcal penicillins | 141-372 |
| Gene(s) conferring resistance to vancomycin | 373-493 |

Exemplary DIANA probe sequence for *Staphylococcus aureus*, Coagulase Negative Staphylococci, *Enterococcus faecalis*, *Enterococcus faecium*, *Streptococcus pneumoniae*, *Streptococcus agalactiae*, and *Streptococcus pyogenes* are shown in Table 1. Exemplary DIANA probe sequence for Coagulase Negative Staphylococci and *Viridans* streptococci are shown in Table 2. Exemplary DIANA probe sequence for antistaphylococcal penicillins and vancomycin antimicrobial resistance genes are shown in Table 4. Additional DIANA probe sequences for *Staphylococcus aureus*, Coagulase Negative Staphylococci (CoNS), *Enterococcus faecalis*, *Enterococcus faecium*, *Streptococcus pneumoniae*, *Streptococcus agalactiae*, and *Streptococcus pyogenes* have been identified in WO2013176992A2.

In some embodiments, the following primers are used in the amplification reaction of the methods described herein:

```
                                         (SEQ ID NO: 582)
         CGG CTA CCT TGT TAC GAC TT;

(SEQ ID NO: 583)
         GAG TTT GAT CCT GGC TCA G;

(SEQ ID NO: 584)
         GGC TGC GAT ATT CAA AGC TC;

(SEQ ID NO: 585)
         GGC TGT GAT ATT CAA AGC TC;

(SEQ ID NO: 586)
         GCC TTT TTC CGG CTC G;
```

-continued

ACT TGT TGA GCA GAG GTT CT; (SEQ ID NO: 587)

GTA ACA TTG ATC GCA ACG TTC. (SEQ ID NO: 588)

In some embodiments primers are used which preferentially amplify only Gram-positive bacteria.

Detection of Multiple Microorganisms and Deconvolving Complex Infections

In some embodiments, using the methods, devices, and kits for detecting microorganisms described herein, more than a single type of microorganism is detected. In a non-limiting example, should both *S. aureus, E. coli,* and *C. albicans* be detected in a single patient blood sample, in some embodiments it is of clinical utility to indicate that all three pathogens may be the source of the disease and all three pathogens need to be treated as such. By way of example but not by way of limitation, treatment might include administrering three antimicrobials each specific to the three different pathogens. In some embodiments, using the methods described herein, it might be of clinical utility to indicate the relative loads of each of the three pathogens. In some embodiments, this can be achieved by correlating the output signal to a calibration curve as described previously. In other embodiments, no calibration curve is required as the relationship might be internal to a given test while taking into account the copy-number of the targeted gene prior to enzymatic amplification.

Methods described herein are useful for associating a particular microorganism with an identified antimicrobial resistance or susceptibility gene. By way of example, but not by way of limitation, should be *S. aureus* and CoNS be identified combined with the mecA resistance conferring genetic material, in some embodiments it is of clinical utility to understand the source of the mecA gene given that, often, CoNS may be considered an artifact (i.e. a contaminant) of the blood-draw.

In some embodiments, none of the microorganisms detected have antimicrobial resistance or susceptibility conferring genetic material, e.g., antimicrobial resistance conferring genetic materiallisted in Table 11, which can be targeted by one or more DIANAs listed in Table 4, e.g., SEQ ID NOs: 141-493. In some embodiments, antimicrobial resistance or susceptibility conferring genetic material is detected, e.g., antimicrobial resistance conferring genetic material listed in Table 11, which can be targeted by one or more DIANAs listed in Table 4, e.g., SEQ ID NOs: 141-493. In some embodiments, one of the microorganisms detected have antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493. In some embodiments, some of the microorganisms detected have antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493. In some embodiments, all microorganisms detected have antimicrobial resistance or susceptibility conferring genetic material, e.g., antimicrobial resistance conferring gene listed in Table 11, which can be targeted by one or more DIANAs listed in Table 4, e.g., SEQ ID NOs: 141-493. In some embodiments, all of the microorganisms detected have antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493, and they all have the same antimicrobial resistance or susceptibility conferring genetic material. In some embodiments, all microorganisms detected have antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493, and they have different antimicrobial or susceptibility conferring genetic material In some embodiments, one or some of the microorganisms detected have an antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493, and the microorganisms are identified as having antimicrobial resistance or susceptibility conferring genetic material. In some embodiments, treatment with an antimicrobial is initiated. In some embodiments, treatment with an antimicrobial is altered, e.g., the antimicrobial is changed.

In some embodiments, one or more of the microorganisms detected are pathogenic microorganisms associated with infection, e.g., sepsis. In some embodiments, one or more of the microorganisms detected are contaminants, e.g., introduced into the sample during or after collection from the subject. In some embodiments, one or more of the microorganisms detected are commensal bacteria, i.e., non-pathogenic bacteria of the subject. In some embodiments, both pathogenic microorganisms associated with infection and contaminants are detected. In some embodiments, both pathogenic microorganisms associated with infection and commensal bacteria are detected.

In some embodiments, one, some, or all of the microorganisms detected have antimicrobial resistance or susceptibility conferring genetic material, e.g., antimicrobial resistance conferring genetic material listed in Table 11, which can be targeted by one or more DIANAs listed in Table 4, e.g., SEQ ID NOs: 141-493, and the antimicrobial resistance conferring genetic material is identified using the techniques described herein, e.g., by contacting the microbial genetic material with one or more DIANAs targeting the antimicrobial resistance or susceptibility conferring genetic material, e.g., a DIANA having a sequence shown in Table 4, e.g., SEQ ID NOs: 141-493.

In some embodiments, one DIANA targeting antimicrobial resistance or susceptibility conferring genetic material is used. In some embodiments, more than one DIANA targeting antimicrobial resistance or susceptibility conferring genetic material is used. In some embodiments, two or more DIANAs, both targeting the same antimicrobial resistance or susceptibility conferring genetic material, are used.

In some embodiments, the two or more DIANAs target the same amplicon. In some embodiments, the two or more DIANAs target different amplicons.

In some embodiments, the DIANA targeting antimicrobial resistance or susceptibility conferring genetic material is universal, e.g., to bacteria or fungi, to a genus, or to a species. In some embodiments, the DIANA targeting antimicrobial resistance or susceptibility conferring genetic material is pathogen specific.

A non-limiting example utilizing two DIANA probes for this purpose include, in some embodiments, one single DIANA probe may be utilized as a more general probe, targeting resistance conferring genetic material in a universal manner, whereas a second DIANA probe may be utilized as a more specific probe, targeting resistance conferring genetic material in a pathogen specific manner. In other embodiments, both DIANA probes target the resistance conferring genetic material in a pathogen specific manner.

In some embodiments, pathogen specific detection of resistance conferring genetic material is accomplished on the same amplicon, whereas in other embodiments, it is accomplished on differing amplicons.

Stoichiometrics, i.e., the relative signal between targets detected, can be used in a variety of ways, for example, to associate a detected genetic material, e.g., an antibiotic resistance gene, with a particular microorganism in a mixed population. These methods employ the procedures for absolute and/or semi-quantitation of microorganisms described herein.

In some embodiments, the methods described herein comprise:
 (i) contacting amplified microbial genetic materials with a plurality of DNA Invading Artificial Nucleic Acids (DIANAs) that bind to a single species or group of microbes;
 (ii) contacting amplified microbial genetic materials with a plurality of DNA Invading Artificial Nucleic Acids (DIANAs) that bind to microbial genetic material which confers resistance or reduced susceptibility to antimicrobials; and
 (iii) determining the stoichiometry between the signal obtained from the detected single species or group of microbes and the signal obtained from the detected genetic material which confers resistance or reduced susceptibility to antimicrobials;
 wherein stoichiometry is used to determine which microbial species contains the genetic material which confers resistance or reduced susceptibility to antimicrobials.

In some embodiments, the use of stoichiometrics is preferred when there are minimal biases in detection, or if biases do occur, they can be accounted for.

In some embodiments, the use of stoichiometrics is preferred when the genomic copy number relationship between the genomic sequence utilized for pathogen ID and resistance conferring marker ID is known. In some embodiments, the use of stoichiometrics is preferred when the genomic copy number relationship between the genomic sequence utilized for pathogen ID and resistance conferring marker ID is, while not know, can be measured, or if not measure, accounted for. In some embodiments, the use of stoichiometrics is preferred when the genomic copy number relationship between the genomic sequence utilized for pathogen ID and resistance conferring marker ID is constant. In some embodiments, the use of stoichiometrics is preferred when the genomic copy number relationship between the genomic sequence utilized for pathogen ID and resistance conferring marker ID is, while not constant, is constant within a given range, e.g., 5%, 10%, 15%, 20% or 25%.

In some embodiments, the use of stoichiometrics is preferred when it is feasible to attain either semi-quantitative or quantitative measurements from the assay.

In some embodiments, the use of stoichiometrics cannot deduce the required information with perfect confidence, but rather, only within a confidence level.

In some embodiments, the detection of the single species or group of microbes is semi-quantitative or quantitative. In some embodiments, the detection of the microbial genetic material which confers resistance or reduced susceptibility to antimicrobials is semi-quantitative or quantitative.

In some embodiments, the genomic copy number ratio between the target sequence used for detection of the single species or group of microbes and the microbial genetic material which confers resistance or reduced susceptibility to antimicrobials is known. In some embodiments, the genomic copy number ratio between the target sequence used for detection of the single species or group of microbes and the microbial genetic material which confers resistance or reduced susceptibility to antimicrobials is capable of being determined. In some embodiments, the genomic copy number ratio between the target sequence used for detection of the single species or group of microbes and the microbial genetic material which confers resistance or reduced susceptibility to antimicrobials is capable of being determined. In some embodiments, the genomic copy number ratio between the target sequence used for detection of the single species or group of microbes and the microbial genetic material which confers resistance or reduced susceptibility to antimicrobials is constant. In some embodiments, the genomic copy number ratio between the target sequence used for detection of the single species or group of microbes and the microbial genetic material which confers resistance or reduced susceptibility to antimicrobials does not vary by more than 5%, 10%, 15%, 20%, or 25%.

In some embodiments, determining the stoichiometry between the signal obtained from the detected single species or group of microbes and the signal obtained from the detected genetic material which confers resistance or reduced susceptibility to antimicrobials comprises determining the ratio between the signal obtained from the detected single species or group of microbes and the signal obtained from the detected genetic material which confers resistance or reduced susceptibility to antimicrobials.

In some embodiments, more than one species of microbe is detected and a stoichiometry is determined for each species of microbe. In some embodiments, a microbial species contains the genetic material which confers resistance or reduced susceptibility to antimicrobials if the stoichiometry, e.g., the ratio between the signal obtained for the microbial species and the signal obtained for the detected genetic material which confers resistance or reduced susceptibility to antimicrobials, is the same as the copy number ratio between the target sequence for identifying the microbial species and the genetic material which confers resistance or reduced susceptibility to antimicrobials, or does not vary by more than 5%, 10%, 15%, 20%, or 25%

For the case of illustration only, without limitation, consider two pathogens detected simultaneously, P-1 and P-2 combined with a single resistance conferring gene (for the purposes of illustration, termed R-1), one might attempt to deduce if R-1 originated from P-1 or P-2, or potentially, both.

For illustration purposes, assume that the detection signal attained in the test equated to 1,000 units and 50 units, for P-1 and P-2, respectively, and that the detection signal attained in the test equated to 100 units for R-1. Assuming no biases or noise in the system, and knowing that the genomic copy ratio for both P-1 and R-1, and P-2 and R-1 of 10:1 (10 copies of the sequence utilized for pathogen ID in relation to a single copy of the sequence utilized for pathogen resistance conferring gene detection), we can deduce that R-1 originated from P-1 and not P-2 due to stoichiometrics. Similarly, had the signal attained for R-1 been 5, one would deduce that R-1 originated from P-2 and not P-1. Similarly, had the signal attained for R-1 been 105, one would deduce that R-1 originated from both P-1 and P-2.

In some embodiments, determining the stoichiometry between the signal obtained from the detected single species or group of microbes and the signal obtained from the detected genetic material which confers resistance or reduced susceptibility to antimicrobials comprises accounting, e.g., mathematically and/or statistically, for assay-related biases. Assay-related biases include, but are not limited to, differing efficiencies in microbial lysis, differing likelihood of maintaining high molecular weight DNA, differing DNA isolation efficiencies, differing enzymatic amplification efficiencies, and differing DIANA detection efficiencies.

In some embodiments, calibration procedures are performed. In some embodiments, calibration procedures are performed during development of an assay, e.g., to account for assay-related biases. In other embodiments, calibration procedures are performed in a manner which closely approximates the expected conditions at the time of the assay.

In some embodiments, a step-wise manner of calibration is performed, wherein multiple calibrations are done at different levels. In some embodiments, a single calibration is performed, e.g., taking into account the entire sample-in/results-out process.

In some embodiments, calibration comprises calibration of DIANA probe capture/detection biases. In some embodiments, calibration comprises calibration of amplification biases. In some embodiments, calibration comprises calibration of lysis yield is required. In some embodiments, calibration comprises only one of the aforesaid calibrations. In some embodiments, calibration comprises more than one or all of the aforesaid calibrations. In other embodiments, calibration comprises a single calibration encompassing multiple parameters.

In some embodiments, a mixed assay result containing *S. aureus*, CoNS, and mecA is deconvolved. In some embodiments, the calibrations comprise one or more of: (1) DIANA signal output for each of the targets at various load input (amplicon copy number) and their mathematical relationships, (2) Enzymatic amplification output vs input to develop a mathematical relationship of *S. aureus* and mecA, as well as CoNS and, mecA, (3) Lysis yield vs load for *S. aureus* and CoNS. In some embodiments, by conducting some or all of the above calibrations, it is possible to develop a mathematical number, with confidence intervals, to deconvolve the origin of the mecA gene in cases where both *S. aureus* and CoNS were detected.

In some embodiments, stoichiometrics is used as a confirmatory step. By way of example, without limitation, should P-1 be identified as *S. aureus*, P-2 identified as *E. faecium*, and R-1 as the mecA gene; stoichiometrics may not be required to deconvolve the origin of R-1 as in the majority of cases (as defined by the user) mecA will have originated in *S. aureus*. However, in some embodiments, confirming this assumption is of utility.

In some embodiments, stoichiometrics can be used to indicate the potential for resistance conferring genetic material. By way of example, but not by way of limitation, stoichiometric might dictate that if a pathogen is detected at a load close to the limit of detection, the absence of a detected signal for R-1 implies that it is below its limit of detection and that no assumption may be made with regards to the resistance conferring genetic material.

In some embodiments, stoichiometrics can be used to rule-in an infection. By way of example, but not by way of limitation, if R-1 is detected and through calibration it was deduced that the detection of R-1 is more sensitive than the detection of P-1, the presence of a signal for R-1 indicates that an infection, with its corresponding resistance conferring gene is present, but the ID of the pathogen, in some embodiments, might remain unknown.

Culture-Free Identification of Fungal Pathogens

Fungal infections can be localized, as in the case of oral thrush, or systemic. Patients at significant risk for systemic fungal infection include immunocompromised patients, neutropaenic patients, and hospitalized patients with long-term intravascular lines. Systemic fungal infections cause ~25% of infection-related deaths in leukaemics. Infections due to *Candida* species are the fourth most important cause of nosocomial bloodstream infection. In certain other circumstances, fungal infections are also a major problem. Serious fungal infections may cause 5-10% of deaths in those undergoing lung, pancreas or liver transplantation. Acquired fungal sepsis occurs in up to 13% of very low birthweight infants. Fungi, for example, *Candida* yeast, can enter the bloodstream though a blood catheter.

Conventional diagnosis of systemic fungal infections is via blood culture. As with bacteria, blood culture diagnosis has the weakness that it delays administration of the proper antimicrobial. This is even more pronounced in the case of fungi, which often have a longer doubling time than bacteria. In contrast to blood culturing, the claimed methods, devices and kits allow the rapid and accurate identification of low levels of microorganisms in small volumes of blood.

Pathogens prevalent in fungal infections include, for example, *Candida parapsilosis, Candida tropicalis, Candida auris, Candida lusitaniae, Candida kefyr, Candida guilliermondii, Candida rugose, Candida famata, Candida norvegensis, Candida inconspicua, Candida albicans, Candida glabrata, Candida krusei, Cryptococcus neoformans, Aspergillus fumigatus, Aspergillus flavus*, and *Aspergillus clavatus*. In some embodiments, a test panel or test menu comprises all of the preceding pathogens. In some embodiments, a test panel or test menu comprises a subset of the preceding pathogens. In some embodiments, a test panel or test menu comprises only one of the preceding pathogens. In some embodiments, a test panel or test menu comprises some or all of the preceding pathogens and additional microorganisms not listed.

DIANAs, e.g., DIANAs for identifying fungi, e.g., DIANAs useful for identifying pathogens common in systemic fungal infections are listed in Table 12 and comprise SEQ ID NOs: 15-19 and 494-571. In some embodiments, one of the DIANA probes listed in Table 12, e.g., SEQ ID NOs: 15-19 and 494-571, is used in the methods, devices, and kits described herein, e.g., in a method for identifying a fungal species or groups of fungi. In some embodiments, some of the DIANA probes listed in Table 12, e.g., SEQ ID NOs: 15-19 and 494-571, are used in the methods, devices, and kits described herein, e.g., in a method for identifying a fungal species or groups of fungi. In some embodiments, all of the DIANA probes listed in Table 12, e.g., SEQ ID NOs: 15-19 and 494-571, are used in the methods, devices, and kits described herein, e.g., in a method for identifying a fungal species or groups of fungi. In some embodiments, some or all of the DIANA probes listed in Table 12, e.g., SEQ ID NOs: 15-19 and 494-571, are used in combination with DIANA probes not listed in Table 12, e.g., SEQ ID NOs: 15-19 and 494-571, in the methods, devices, and kits described herein e.g., in a method for identifying a fungal species or groups of fungi.

TABLE 12

DIANAs and microorganisms commonly associated with fungal bloodstream infections.

| Target | Seq ID |
| --- | --- |
| Candida albicans | 15 |
| Candida parapsilosis | 16 and 494-500 |
| Candida krusei | 17 |
| Candida glabrata | 18 |
| Candida tropicalis | 19 and 501-510 |
| Candida auris | 511-520 |
| Candida lusitaniae | 521-527 |
| Candida kefyr | 528-539 |
| Candida guilliermondii | 540-544 |
| Candida rugosa | 545-551 |
| Candida famata | 552-561 |
| Candida norvegensis | 562-566 |
| Candida inconspicua | 567-571 |

Kits

The present disclosure also provides kits for use of the DIANAs as described herein in the methods described herein. In some embodiments, the kit comprises reagents and protocols for detecting and/or identifying and/or evaluating one or more microorganisms from a sample without prior enrichment. In some embodiments, this kit contains reagents and protocols for the following processes:
(i) depleting eukaryotic DNA from the sample;
(ii) lysing one or more microbial cells in the sample, wherein the lysing of one or more microbial cells releases a plurality of microbial genetic materials;
(iii) isolating the plurality of microbial genetic materials;
(iv) amplifying the plurality of microbial genetic materials; and
(v) contacting the amplified microbial genetic materials with a plurality of DNA Invading Artificial Nucleic Acids (DIANAs) that bind to the single species or group of microbes associated with neonatal sepsis, wherein the plurality of DIANAs comprise one or more sequences selected from the group consisting of SEQ ID NOs: 20-571; and
(vi) detecting binding of the one or more of the plurality of DIANAs to the microbial genetic material of its respective single species or group of microbes, wherein the detection of binding indicates the presence of the one or more specific microbial species or groups of microbes associated with bloodstream infections in the sample.

In some embodiments, the comprises the fluidic device described herein. In some embodiments, the kit can additionally comprise instructions for use in any of the methods described herein. The included instructions may comprise a description of detecting microbial genetic material, e.g., by depleting eukaryotic DNA from a sample, lysing microbial cells, isolating genetic material, amplifying the genetic material, contacting the amplified genetic material with DIANAs, and detecting the binding. The kit may further comprise a description of obtaining a sample from a subject. In some embodiments, the instructions comprise selecting a subject for testing based on diagnostic criteria.

In some embodiments, the kit contains pre-calibrated reagents for load assessment, microbial spectrum analysis, and microbial detection.

In some embodiments, reagents are provided in suitable packaging. Suitable packaging includes, but is not limited to, vials, bottles, jars, flexible packaging, and the like.

In some embodiments, the kit may be utilized manually (human operation). In some embodiments, usage of the kit may be automated. Non-limiting examples for automating include robotic pipetting stations, and the fluidic devices described herein.

EXAMPLES

Example 1: Detection of Polymicrobial Infections

This example shows the detection of E. coli at 5 CFU/ml, S. epidermidis at 6 CFU/ml, S. agalactiae at 11 CFU/ml, E. faecalis at 19 CFU/ml and C. parapsilosis at 6 CFU/ml directly from human whole blood using the methods disclosed herein at two clinically relevant load levels.

Methods

Fresh human whole-blood drawn into a EDTA vacuette was inoculated with E. coli (ATCC #BAA-2469), S. epidermidis (ATCC #51625), S. agalactiae (ATCC #13813), E. faecalis (ATCC #29212), and C. parapsilosis (ATCC #14243) at the above loads (depicted in CFU/ml), simulating a complex of polymicrobial infection 1.5 ml of the contrived human blood was extracted and placed into a fresh vial. To the 1.5 ml blood sample, 1.5 ml of a lysis solution comprising of Tween-20 at 2% (v/v) and Triton-X100 at 1.3% (v/v) was added. After about 2 minutes, NaCl was added to the combined mixture to a final concentration of 150-300 mM and WAX conjugated magnetic particles were added. After about 2 minutes, a rare-earth magnet was used to immobilize the magnetic particles to the surface of the vial and about 3 ml of solution was removed and placed into a fresh vial.

A microbial lysis solution was added to the fresh vial. The microbial lysis solution contained the following: cross-linked and affinity purified lysozyme (2-13 mg), mutanolysin (10-350 U), zymolyase (18-200 U), and lysostaphin (65-250 U) in addition to a detergent based reagent containing a glucopyranoside, a cationic detergent, and a sulfo-betaine (all of which were at concentrations above their individual CMCs (>10×)). The microbial lysis solution also included EDTA (at about 10 mM) and 2-Mercaptoethanol (~25 mM). The combined reaction mixture was incubated for about 10 to 15 minutes after which WAX conjugated magnetic particles were added to the solution. After about 2 minutes, a rare-earth magnet was used to immobilize the magnetic particles to the surface of the vial and the microbial lysis solution was removed and discarded.

The beads were washed repeatedly with a buffered wash solution containing 1 M NaCl. The microbial DNA was eluted off of the beads with an elution reagent at pH 12.5. Post-elution, the microbial DNA was subject to PCR of the 16S/18S rDNA with the following primer sequences (5'-3'):

Each primer contains a hapten moiety for subsequent labelling. Post-PCR, the sample was divided equally into 17 chambers, each loaded with biotinylated gamma-modified PNA probes with sequences identified in Table 1 and an invasion supporting reagent containing Tween-20, NaCl, and poly-EG-12,000. Each well was heated to 75-90° C. for 4 minutes with the addition of 5 ml of stock MyOne C1 Streptavidin coated beads. Post-immobilization of γPNA probes onto the beads, the beads were washed in a solution containing between 150-550 mM NaCl at a temperature at least 75-95° C. Post washing, to each chamber a solution containing a HRP-conjugate targeting the primer-hapten was added, which binds to the free hapten (if present) on the captured amplicon. After a number of wash steps with a neutral low salt wash, luminol was added to create a distinct optical signature only where the microbial DNA was captured. The optical signatures were read using a Promega GloMax plate reader with an integration time of 2.5 sec/well. Each reaction was completed in triplicate.

Results

Figure 7:
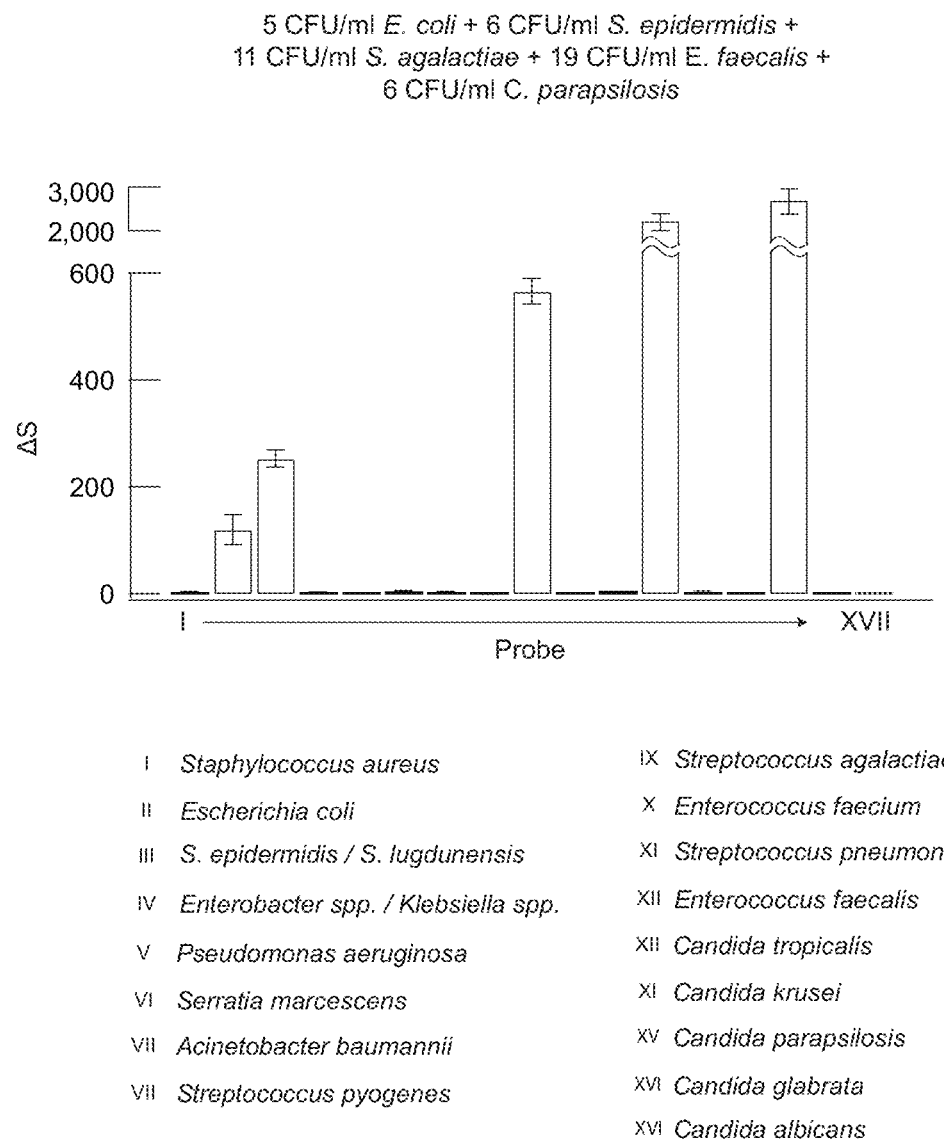
FIG. 7 is a graph showing signal as a function of pathogen load for deconvolving a complex polymicrobial infection.
Figure 8:
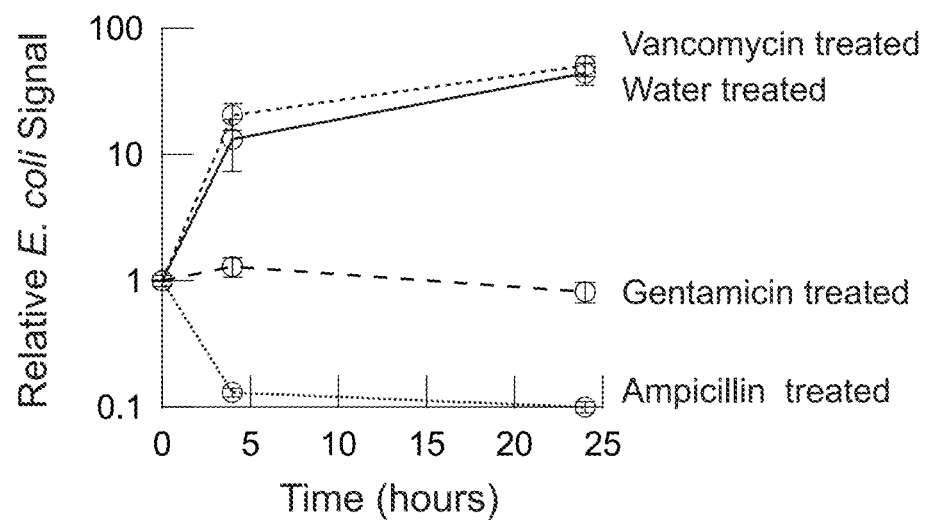
FIG. 8 is a graph showing signal over time for untreated E. coli (second from top) and E. coli treated with ampicillin (bottom), vancomycin (top), and gentamycin (second from bottom).
Figure 9:
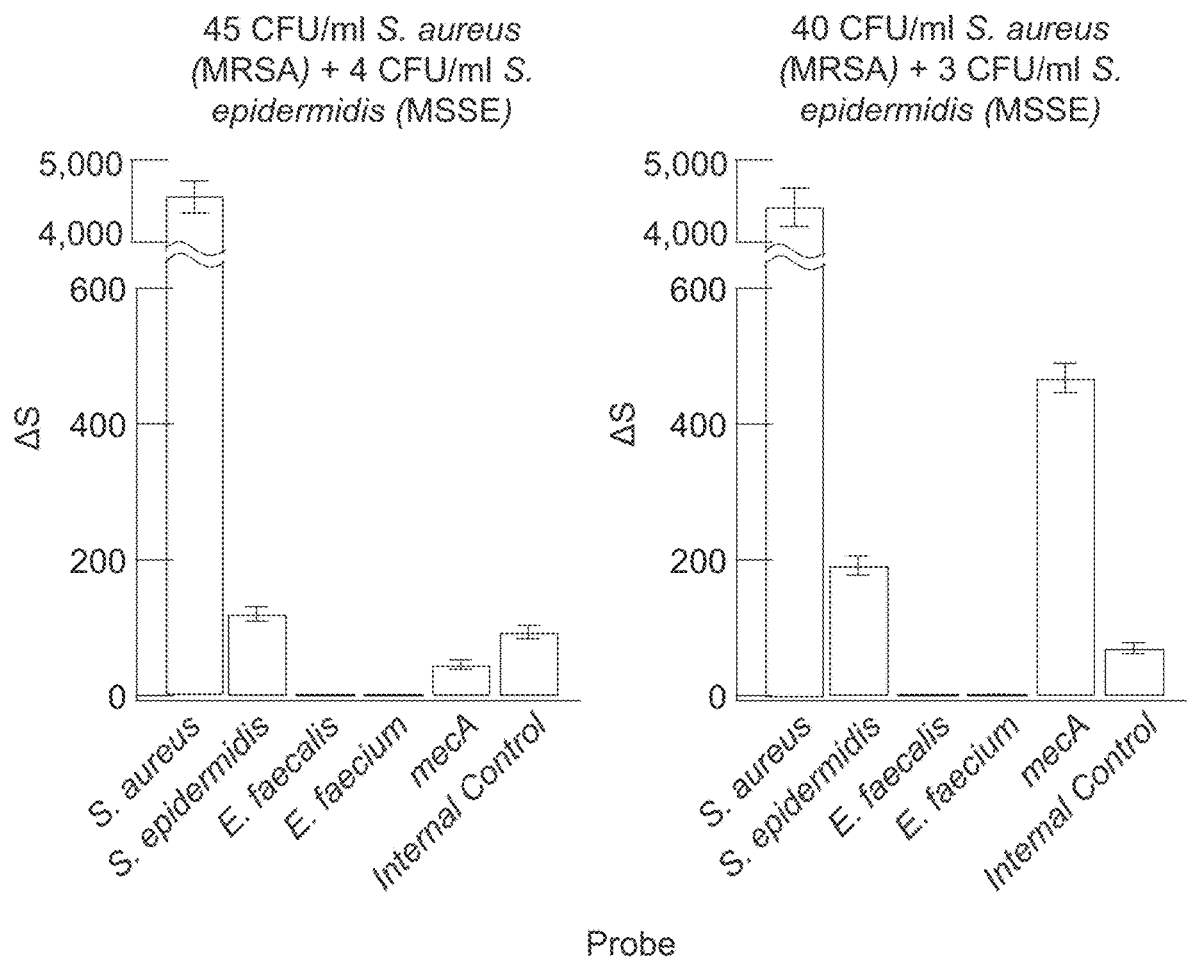
FIG. 9 are two graphs showing how a polymicrobial or mixed infection may be deconvolved to identify which of the two pathogens incorporated the genetic material that may confer resistance or reduced susceptibility to an antimicrobial. Deconvolving polymicrobial infections is further described in Example 1.

Clearly identifiable optical signatures were only seen in the E. coli, S. epidermidis, S. agalactiae, E. faecalis and C. parapsilosis channels (which came from the chambesr activated with a gamma-modified PNA probe specific to the above pathogens). See FIG. 7. Note also the ability to assess load based on a combination of microbial load input and rDNA copies.

These results show that the compositions and methods disclosed herein can de-convolve complex polymicrobial infections with at least two specific pathogen from a sample blood. Accordingly, the compositions and methods disclosed herein are useful for the detection and identification of microbes in a sample.

EQUIVALENTS

The foregoing written specification is considered to be sufficient to enable one ordinarily skilled in the art to practice the invention. The present invention is not to be limited in scope by examples provided, since the examples are intended as mere illustrations of one or more aspects of the invention. Other functionally equivalent embodiments are considered within the scope of the invention. Various modifications of the invention in addition to those shown and described herein will become apparent to those skilled in the art from the foregoing description. Each of the limitations of the invention can encompass various embodiments of the invention. It is, therefore, anticipated that each of the limitations of the invention involving any one element or combinations of elements can be included in each aspect of the invention. This invention is not limited in its application to the details of construction and the arrangement of components set forth or illustrated in the drawings. The invention is capable of other embodiments and of being practiced or of being carried out in various ways.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

All references, patents and patent applications that are recited in this application are incorporated by reference herein in their entirety.

The invention claimed is:

1. A method of identifying one or more specific microbial species in a sample from a subject, the method comprising:

amplifying a plurality of microbial genetic materials;

incubating the amplified microbial genetic materials with a plurality of DNA Invading Artificial Nucleic Acids (DIANAs); and detecting binding of one or more of the plurality of DIANAs to the amplified microbial genetic material of a single species or group of microbes, wherein the detection of binding indicates the presence of one or more specific microbial species or groups of microbes in the sample, wherein:

the amplified microbial genetic materials are invaded by at least one of the DIANAs in the plurality of DIANAs during the incubation, one or more of the plurality of the DIANAs is a peptide nucleic acid, a locked nucleic acid, and/or a bridged nucleic acid, and the peptide nucleic acid, locked nucleic acid, and/or bridged nucleic acid:

comprises a sequence that shares at least 60% identity with a sequence selected from the group consisting of SEQ ID NOS: 20-571,
comprises the complement, reverse, or reverse complement of a sequence that shares at least 60% identity with a sequence selected from the group consisting of SEQ ID NOS: 20-571,
comprises a sequence selected from the group consisting of SEQ ID NOS: 20-571 that lacks six or fewer bases at either or both ends, and/or
comprises the complement, reverse, or reverse complement of a sequence selected from the group consisting of SEQ ID NOS: 20-571 that lacks six or fewer bases at either or both ends.

2. A composition comprising one or more DNA Invading Artificial Nucleic Acids (DIANAs), wherein:
one or more of the one or more DIANAs is a peptide nucleic acid, a locked nucleic acid, and/or a bridged nucleic acid, and
the peptide nucleic acid, locked nucleic acid, and/or bridged nucleic acid:
comprises a sequence that shares at least 60% identity with a sequence selected from the group consisting of SEQ ID NOS: 20-571,
comprises the complement, reverse, or reverse complement of a sequence that shares at least 60% identity with a sequence selected from the group consisting of SEQ ID NOS: 20-571,
comprises a sequence selected from the group consisting of SEQ ID NOS: 20-571 that lacks six or fewer bases at either or both ends, and/or
comprises the complement, reverse, or reverse complement of a sequence selected from the group consisting of SEQ ID NOS: 20-571 that lacks six or fewer bases at either or both ends.

3. A kit comprising one or more DNA Invading Artificial Nucleic Acids (DIANAs), wherein:
one or more of the one or more DIANAs is a peptide nucleic acid, a locked nucleic acid, and/or a bridged nucleic acid, and
the peptide nucleic acid, locked nucleic acid, and/or bridged nucleic acid:
comprises a sequence that shares at least 60% identity with a sequence selected from the group consisting of SEQ ID NOS: 20-571,
comprises the complement, reverse, or reverse complement of a sequence that shares at least 60% identity with a sequence selected from the group consisting of SEQ ID NOS: 20-571,
comprises a sequence selected from the group consisting of SEQ ID NOS: 20-571 that lacks six or fewer bases at either or both ends, and/or
comprises the complement, reverse, or reverse complement of a sequence selected from the group consisting of SEQ ID NOS: 20-571 that lacks six or fewer bases at either or both ends.

4. The method of claim 1, wherein the amplified microbial genetic materials are incubated with the plurality of DIANAs in an incubation solution comprising a monovalent salt.

5. The method of claim 1, wherein one or more of the plurality of DIANAs comprises a non-covalent binding moiety.

6. The method of claim 1, wherein one or more of the plurality of DIANAs comprises a linker.

7. The method of claim 1, wherein one or more of the plurality of DIANAs comprises a spacer.

8. The method of claim 1, wherein the sample is a blood sample.

9. The method of claim 8, wherein the blood sample is a whole blood sample.

10. The method of claim 1, wherein the amplified microbial genetic materials are double stranded DNA.

11. The method of claim 10, wherein a localized bubble is formed within the double stranded DNA during the incubation, and wherein the localized bubble allows the DIANA or DIANAs invading the double stranded DNA to bind to the double stranded DNA.

12. The method of claim 1, wherein the incubation occurs in a solution comprising one or more crowding agents and one or more DNA denaturants.

13. The method of claim 12, wherein the one or more crowding agents comprise poly-ethylene glycol, and wherein the poly-ethylene glycol has a molecular weight of greater than or equal to 200 Da and less than or equal to 20,000 Da.

14. The method of claim 12, wherein the one or more DNA denaturants comprise DMSO, formamide, and/or a betaine.

15. The method of claim 1, wherein the incubation is performed in a fluidic reservoir.

16. The method of claim 15, wherein the fluidic reservoir is positioned in a fluidic device.

17. The method of claim 1, wherein the incubation is performed in a processing chamber.

18. The method of claim 1, wherein the peptide nucleic acid, locked nucleic acid, and/or bridged nucleic acid comprises a sequence selected from the group consisting of SEQ ID NOS: 20-571, a sequence selected from the group consisting of SEQ ID NOS: 20-571 that lacks six or fewer bases at either or both ends, and/or the complement, reverse, or reverse complement of any of the foregoing sequences.

19. The method of claim 1, wherein one or more of the plurality of DIANAs is a peptide nucleic acid, and wherein the peptide nucleic acid comprises a sequence that shares at least 60% identity with a sequence selected from the group consisting of SEQ ID NOS: 20-571 or the complement, reverse, or reverse complement of a sequence selected from the group consisting of SEQ ID NOS: 20-571.

20. The method of claim 19, wherein the peptide nucleic acid is a γPNA.

* * * * *

SEQUENCE LISTING

```
Sequence total quantity: 588
SEQ ID NO: 1            moltype = DNA  length = 15
FEATURE                 Location/Qualifiers
misc_feature            1..15
                        note = Synthetic Polynucleotide
source                  1..15
                        mol_type = other DNA
                        organism = synthetic construct
SEQUENCE: 1
aacggacgag aagct                                                            15

SEQ ID NO: 2            moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 2
gtaaccattt ggagct                                                           16

SEQ ID NO: 3            moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 3
gtaaccattt atggag                                                           16

SEQ ID NO: 4            moltype = DNA  length = 17
FEATURE                 Location/Qualifiers
misc_feature            1..17
                        note = Synthetic Polynucleotide
source                  1..17
                        mol_type = other DNA
                        organism = synthetic construct
SEQUENCE: 4
ggacgttagt aactgaa                                                          17

SEQ ID NO: 5            moltype = DNA  length = 16
FEATURE                 Location/Qualifiers
misc_feature            1..16
```

```
                        note = Synthetic Polynucleotide
source                  1..16
                        mol_type = other DNA
                        organism = synthetic construct
SEQUENCE: 5
ttaaccatag taggcc                                                          16

SEQ ID NO: 6            moltype = DNA  length = 17
FEATURE                 Location/Qualifiers
misc_feature            1..17
                        note = Synthetic Polynucleotide
source                  1..17
                        mol_type = other DNA
                        organism = synthetic construct
SEQUENCE: 6
aagagtaatt aacacat                                                         17

SEQ ID NO: 7            moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 7
ataagagaga ctaacg                                                          16

SEQ ID NO: 8            moltype = DNA  length = 17
FEATURE                 Location/Qualifiers
misc_feature            1..17
                        note = Synthetic Polynucleotide
source                  1..17
                        mol_type = other DNA
                        organism = synthetic construct
SEQUENCE: 8
ggatgagagt aactgtt                                                         17

SEQ ID NO: 9            moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 9
cacagagagc ttgctc                                                          16

SEQ ID NO: 10           moltype = DNA  length = 17
FEATURE                 Location/Qualifiers
misc_feature            1..17
                        note = Synthetic Polynucleotide
source                  1..17
                        mol_type = other DNA
                        organism = synthetic construct
SEQUENCE: 10
tgagatcata gtggcgc                                                         17

SEQ ID NO: 11           moltype = DNA  length = 17
FEATURE                 Location/Qualifiers
misc_feature            1..17
                        note = Synthetic Polynucleotide
source                  1..17
                        mol_type = other DNA
                        organism = synthetic construct
SEQUENCE: 11
tgagatctta gtggcgc                                                         17

SEQ ID NO: 12           moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 12
tacctagaga tagtgg                                                          16

SEQ ID NO: 13           moltype = DNA  length = 16
FEATURE                 Location/Qualifiers
```

```
                           -continued misc_feature               1..16
                           note = Synthetic Polynucleotide
source                     1..16
                           mol_type = other DNA
                           organism = synthetic construct
SEQUENCE: 13
aaggtggtga acttaa                                                       16

SEQ ID NO: 14              moltype = DNA  length = 16
FEATURE                    Location/Qualifiers
misc_feature               1..16
                           note = Synthetic Polynucleotide
source                     1..16
                           mol_type = other DNA
                           organism = synthetic construct
SEQUENCE: 14
aaggtggtga gcttaa                                                       16

SEQ ID NO: 15              moltype = DNA  length = 15
FEATURE                    Location/Qualifiers
misc_feature               1..15
                           note = Synthetic Polynucleotide
source                     1..15
                           mol_type = other DNA
                           organism = synthetic construct
SEQUENCE: 15
gggtagccat ttatg                                                        15

SEQ ID NO: 16              moltype = DNA  length = 16
FEATURE                    Location/Qualifiers
misc_feature               1..16
                           note = Synthetic Polynucleotide
source                     1..16
                           mol_type = other DNA
                           organism = synthetic construct
SEQUENCE: 16
acgcatcaaa aaagat                                                       16

SEQ ID NO: 17              moltype = DNA  length = 15
FEATURE                    Location/Qualifiers
misc_feature               1..15
                           note = Synthetic Polynucleotide
source                     1..15
                           mol_type = other DNA
                           organism = synthetic construct
SEQUENCE: 17
ccgtggaaaa tctag                                                        15

SEQ ID NO: 18              moltype = DNA  length = 16
FEATURE                    Location/Qualifiers
misc_feature               1..16
                           note = Synthetic Polynucleotide
source                     1..16
                           mol_type = other DNA
                           organism = synthetic construct
SEQUENCE: 18
cgtgtactgg aatgca                                                       16

SEQ ID NO: 19              moltype = DNA  length = 15
FEATURE                    Location/Qualifiers
misc_feature               1..15
                           note = Synthetic Polynucleotide
source                     1..15
                           mol_type = other DNA
                           organism = synthetic construct
SEQUENCE: 19
caatgtcttc ggact                                                        15

SEQ ID NO: 20              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 20
agcgaacaga cgaggagctt                                                   20

SEQ ID NO: 21              moltype = DNA  length = 20
```

```
FEATURE              Location/Qualifiers
misc_feature         1..20
                     note = Synthetic Polynucleotide
source               1..20
                     mol_type = other DNA
                     organism = synthetic construct
SEQUENCE: 21
cgaggagctt gctcctctga                                                  20

SEQ ID NO: 22        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 22
gctcctctga cgttagcggc                                                  20

SEQ ID NO: 23        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 23
agcgaacaga taaggagctt                                                  20

SEQ ID NO: 24        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 24
taaggagctt gctcctttga                                                  20

SEQ ID NO: 25        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 25
gctcctttga cgttagcggc                                                  20

SEQ ID NO: 26        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 26
aataccggat aatatattga                                                  20

SEQ ID NO: 27        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 27
ggataatata ttgaaccgca                                                  20

SEQ ID NO: 28        moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 28
tatattgaac cgcatggttc                                                  20
```

```
SEQ ID NO: 29              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 29
aataccggat aatatgttga                                                    20

SEQ ID NO: 30              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 30
ggataatatg ttgaaccgca                                                    20

SEQ ID NO: 31              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 31
tatgttgaac cgcatggttc                                                    20

SEQ ID NO: 32              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 32
ggtagtgctt gcactactgt                                                    20

SEQ ID NO: 33              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 33
gcttgcacta ctgtccggcg                                                    20

SEQ ID NO: 34              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 34
actactgtcc ggcgagtggc                                                    20

SEQ ID NO: 35              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 35
tgtaaagtac ttttgttagg                                                    20

SEQ ID NO: 36              moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 36
ggaagaaaag ggaagtgcta                                                    20
```

```
SEQ ID NO: 37            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 37
aaagggaagt gctaatacca                                                       20

SEQ ID NO: 38            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 38
aagtgctaat accactttt                                                        20

SEQ ID NO: 39            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 39
gttattcgag cggccaataa                                                       20

SEQ ID NO: 40            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 40
cgagcggcca ataactgatt                                                       20

SEQ ID NO: 41            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 41
gccaataact gattagctag                                                       20

SEQ ID NO: 42            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 42
tttgttaggg aagaaaaggt                                                       20

SEQ ID NO: 43            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 43
agggaagaaa aggttgatgc                                                       20

SEQ ID NO: 44            moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 44
```

```
gaaaaggttg atgctaatat                                                   20

SEQ ID NO: 45           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 45
cagacggtta gttaagcaag                                                   20

SEQ ID NO: 46           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 46
tagcaggtaa gtacttgtac                                                   20

SEQ ID NO: 47           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 47
ttcggtgatg aggaaggttg                                                   20

SEQ ID NO: 48           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 48
tttagccctg gtgcccgaag                                                   20

SEQ ID NO: 49           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 49
cttgacatcc gaagaagaac                                                   20

SEQ ID NO: 50           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 50
agagggtaac caaccagcga                                                   20

SEQ ID NO: 51           moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 51
aaggcattta gtttaataga                                                   20

SEQ ID NO: 52           moltype = DNA   length = 20
FEATURE                 Location/Qualifiers
misc_feature            1..20
                        note = Synthetic Polynucleotide
source                  1..20
                        mol_type = other DNA
                        organism = synthetic construct
```

```
SEQUENCE: 52
gttgagcttt aagtttggcg                                                    20

SEQ ID NO: 53           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 53
cggaagatga aagtgcggga                                                    20

SEQ ID NO: 54           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 54
atgaaagtgc gggactgaga                                                    20

SEQ ID NO: 55           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 55
gtgcgggact gagaggccgc                                                    20

SEQ ID NO: 56           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 56
atgtgttaat agcacatcaa                                                    20

SEQ ID NO: 57           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 57
taatagcaca tcaaattgac                                                    20

SEQ ID NO: 58           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 58
cacatcaaat tgacgttaaa                                                    20

SEQ ID NO: 59           moltype = DNA  length = 19
FEATURE                 Location/Qualifiers
misc_feature            1..19
                        note = Synthetic Polynucleotide
source                  1..19
                        mol_type = other DNA
                        organism = synthetic construct
SEQUENCE: 59
catgttagat gcttgaaag                                                     19

SEQ ID NO: 60           moltype = DNA  length = 20
FEATURE                 Location/Qualifiers
misc_feature            1..20
                        note = Synthetic Polynucleotide
source                  1..20
                        mol_type = other DNA
```

```
                              organism = synthetic construct
SEQUENCE: 60
ctctgttgta agagaagaac                                              20

SEQ ID NO: 61            moltype = DNA   length = 19
FEATURE                  Location/Qualifiers
misc_feature             1..19
                         note = Synthetic Polynucleotide
source                   1..19
                         mol_type = other DNA
                         organism = synthetic construct
SEQUENCE: 61
tgtgagagtg gaaagttca                                               19

SEQ ID NO: 62            moltype = DNA   length = 19
FEATURE                  Location/Qualifiers
misc_feature             1..19
                         note = Synthetic Polynucleotide
source                   1..19
                         mol_type = other DNA
                         organism = synthetic construct
SEQUENCE: 62
tgtgagaatg gaaagttca                                               19

SEQ ID NO: 63            moltype = DNA   length = 20
FEATURE                  Location/Qualifiers
misc_feature             1..20
                         note = Synthetic Polynucleotide
source                   1..20
                         mol_type = other DNA
                         organism = synthetic construct
SEQUENCE: 63
aggtgttagg tcctttccgg                                              20

SEQ ID NO: 64            moltype = DNA   length = 20
FEATURE                  Location/Qualifiers
misc_feature             1..20
                         note = Synthetic Polynucleotide
source                   1..20
                         mol_type = other DNA
                         organism = synthetic construct
SEQUENCE: 64
cactcttttta gagtgagcgg                                             20

SEQ ID NO: 65            moltype = DNA   length = 20
FEATURE                  Location/Qualifiers
misc_feature             1..20
                         note = Synthetic Polynucleotide
source                   1..20
                         mol_type = other DNA
                         organism = synthetic construct
SEQUENCE: 65
gatcgcggaa ggtggagaca                                              20

SEQ ID NO: 66            moltype = DNA   length = 20
FEATURE                  Location/Qualifiers
misc_feature             1..20
                         note = Synthetic Polynucleotide
source                   1..20
                         mol_type = other DNA
                         organism = synthetic construct
SEQUENCE: 66
ggaaggtgga gacaccctcc                                              20

SEQ ID NO: 67            moltype = DNA   length = 20
FEATURE                  Location/Qualifiers
misc_feature             1..20
                         note = Synthetic Polynucleotide
source                   1..20
                         mol_type = other DNA
                         organism = synthetic construct
SEQUENCE: 67
tggagacacc ctccttcagt                                              20

SEQ ID NO: 68            moltype = DNA   length = 20
FEATURE                  Location/Qualifiers
misc_feature             1..20
                         note = Synthetic Polynucleotide
source                   1..20
```

```
                          mol_type = other DNA
                          organism = synthetic construct
SEQUENCE: 68
aatgaaatgg acccacccct                                                         20

SEQ ID NO: 69             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 69
acggcgtcat aatgcgccaa                                                         20

SEQ ID NO: 70             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 70
aatttctatt ttcaaaaaaa                                                         20

SEQ ID NO: 71             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 71
aggtccatga aagatattaa                                                         20

SEQ ID NO: 72             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 72
tgggtgttga tattgcaaaa                                                         20

SEQ ID NO: 73             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 73
ttttcaactg tgtggaattg                                                         20

SEQ ID NO: 74             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 74
tggggtaaag tgatctacac                                                         20

SEQ ID NO: 75             moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 75
gggttaagcg tgctcagtat                                                         20

SEQ ID NO: 76             moltype = DNA   length = 20
FEATURE                   Location/Qualifiers
misc_feature              1..20
                          note = Synthetic Polynucleotide
```

```
source                          1..20
                                mol_type = other DNA
                                organism = synthetic construct
SEQUENCE: 76
caccgtagcc agtcttaagg                                                        20

SEQ ID NO: 77                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 77
tgcgtggtga tggaagcgtg                                                        20

SEQ ID NO: 78                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 78
gagcgaacca ttggtatcgg                                                        20

SEQ ID NO: 79                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 79
tatgggcatg ggtatcccaa                                                        20

SEQ ID NO: 80                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 80
ttgatcagtc cgcagcacgt                                                        20

SEQ ID NO: 81                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 81
cgtatgtcaa aagtaacaag                                                        20

SEQ ID NO: 82                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 82
tcgtaacgat gcgcaggcga                                                        20

SEQ ID NO: 83                   moltype = DNA   length = 20
FEATURE                         Location/Qualifiers
misc_feature                    1..20
                                note = Synthetic Polynucleotide
source                          1..20
                                mol_type = other DNA
                                organism = synthetic construct
SEQUENCE: 83
gaagcggctt cccgcgcctc                                                        20

SEQ ID NO: 84                   moltype = DNA   length = 20
FEATURE                         Location/Qualifiers
misc_feature                    1..20
```

```
                        note = Synthetic Polynucleotide
source                  1..20
                        mol_type = other DNA
                        organism = synthetic construct
SEQUENCE: 84
ggtttgtgcg gggtaaaacg                                                    20

SEQ ID NO: 85           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 85
acaacaagac gttcaagcgc                                                    20

SEQ ID NO: 86           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 86
aagatacgcg atcgtttagt                                                    20

SEQ ID NO: 87           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 87
gccgcacggc gctgatcaat                                                    20

SEQ ID NO: 88           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 88
tcggggttg ttgcaagaat                                                     20

SEQ ID NO: 89           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 89
ctcacgatgg cgcgtggtgc                                                    20

SEQ ID NO: 90           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 90
gattttatga agagctcccg                                                    20

SEQ ID NO: 91           moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 91
tttagcgagc gaagcggtgg                                                    20

SEQ ID NO: 92           moltype = DNA  length = 20
FEATURE                 Location/Qualifiers
```

```
misc_feature              1..20
                          note = Synthetic Polynucleotide
source                    1..20
                          mol_type = other DNA
                          organism = synthetic construct
SEQUENCE: 92
acaccgcgga tgaaacgggt                                                   20

SEQ ID NO: 93             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 93
attgtttgta taccgaattg                                                   20

SEQ ID NO: 94             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 94
ccgggacgaa gcgattggtg                                                   20

SEQ ID NO: 95             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 95
gaggaggaat taaaagcggt                                                   20

SEQ ID NO: 96             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 96
aagccaatga ggattgtcaa                                                   20

SEQ ID NO: 97             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 97
acagagcatc ccgggggtgg                                                   20

SEQ ID NO: 98             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 98
ttaacggcgc tctcggttta                                                   20

SEQ ID NO: 99             moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 99
gcgtgggtga cattcatcaa                                                   20

SEQ ID NO: 100            moltype = DNA  length = 20
```

```
FEATURE              Location/Qualifiers
misc_feature         1..20
                     note = Synthetic Polynucleotide
source               1..20
                     mol_type = other DNA
                     organism = synthetic construct
SEQUENCE: 100
tcgttcccgg cagttgtcgg                                                    20

SEQ ID NO: 101       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 101
attgggttgg tccctcgaca                                                    20

SEQ ID NO: 102       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 102
cgagtgggaa taaggaggtg                                                    20

SEQ ID NO: 103       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 103
ggggattagt aaacgcggca                                                    20

SEQ ID NO: 104       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 104
atgttaagga cgttattgat                                                    20

SEQ ID NO: 105       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 105
gcgcccgtgc gctattgcgt                                                    20

SEQ ID NO: 106       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 106
aaaaaataaa acggataaaa                                                    20

SEQ ID NO: 107       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 107
ctgtggttaa aagcactcat                                                    20
```

```
SEQ ID NO: 108            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 108
gccgcggaat gaatcgcgct                                                      20

SEQ ID NO: 109            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 109
ggcgttagcg aataaaaatg                                                      20

SEQ ID NO: 110            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 110
atcatttggg cgcttttaac                                                      20

SEQ ID NO: 111            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 111
aagaaacgta tcgctgtggc                                                      20

SEQ ID NO: 112            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 112
aacaccgccg tgggtaaaaa                                                      20

SEQ ID NO: 113            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 113
attaacaaaa ggagacacac                                                      20

SEQ ID NO: 114            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 114
gagttcgaaa caatgagggc                                                      20

SEQ ID NO: 115            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 115
aaagtaaggt aaaacctgag                                                      20
```

| | | |
|---|---|---|
| SEQ ID NO: 116<br>FEATURE<br>misc_feature<br>source<br><br>SEQUENCE: 116<br>ttaagctgat tcatacggtg | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 117<br>FEATURE<br>misc_feature<br>source<br><br>SEQUENCE: 117<br>gtgaagccga tagcccgata | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 118<br>FEATURE<br>misc_feature<br>source<br><br>SEQUENCE: 118<br>caaccttgca taattcatca | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 119<br>FEATURE<br>misc_feature<br>source<br><br>SEQUENCE: 119<br>ccaatggtgg ccaatttaaa | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 120<br>FEATURE<br>misc_feature<br>source<br><br>SEQUENCE: 120<br>atgccggata tacgaatgca | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 121<br>FEATURE<br>misc_feature<br>source<br><br>SEQUENCE: 121<br>tttcttttca tcaaaactga | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 122<br>FEATURE<br>misc_feature<br>source<br><br>SEQUENCE: 122<br>gacaacaagg gtgggtccat | moltype = DNA   length = 20<br>Location/Qualifiers<br>1..20<br>note = Synthetic Polynucleotide<br>1..20<br>mol_type = other DNA<br>organism = synthetic construct | 20 |
| SEQ ID NO: 123<br>FEATURE<br>misc_feature<br>source<br><br>SEQUENCE: 123 | moltype = DNA   length = 20<br>Location/Qualifiers<br>1..20<br>note = Synthetic Polynucleotide<br>1..20<br>mol_type = other DNA<br>organism = synthetic construct | |

```
tatgcagcga agcggaatac                                                   20

SEQ ID NO: 124          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 124
tgaaatcatt ttctccgtat                                                   20

SEQ ID NO: 125          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 125
gaacggaaac gatggagctt                                                   20

SEQ ID NO: 126          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 126
aaacgatgga gcttgctcca                                                   20

SEQ ID NO: 127          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 127
tggagcttgc tccaggcgtc                                                   20

SEQ ID NO: 128          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 128
ttgctccagg cgtcgagtgg                                                   20

SEQ ID NO: 129          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 129
tgggaatctg cctttttgctg                                                  20

SEQ ID NO: 130          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 130
tctgcctttt gctggggat                                                    20

SEQ ID NO: 131          moltype = DNA   length = 20
FEATURE                 Location/Qualifiers
misc_feature            1..20
                        note = Synthetic Polynucleotide
source                  1..20
                        mol_type = other DNA
                        organism = synthetic construct
```

```
SEQUENCE: 131
ttttgctggg ggataacgta                                                      20

SEQ ID NO: 132           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 132
taataccgaa tgataaagtg                                                      20

SEQ ID NO: 133           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 133
cgaatgataa agtgtggcgc                                                      20

SEQ ID NO: 134           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 134
ataaagtgtg gcgcatgcca                                                      20

SEQ ID NO: 135           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 135
tgtggcgcat gccacgcttt                                                      20

SEQ ID NO: 136           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 136
gcatgccacg cttttgaaag                                                      20

SEQ ID NO: 137           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 137
cacgcttttg aaagatggtt                                                      20

SEQ ID NO: 138           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 138
aggctgttgc taatatcagc                                                      20

SEQ ID NO: 139           moltype = DNA  length = 20
FEATURE                  Location/Qualifiers
misc_feature             1..20
                         note = Synthetic Polynucleotide
source                   1..20
                         mol_type = other DNA
```

```
                            organism = synthetic construct
SEQUENCE: 139
taatatcagc ggctgatgac                                                    20

SEQ ID NO: 140          moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 140
gcatctgata ctggca                                                        16

SEQ ID NO: 141          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 141
tgtcactttc aacatacaat                                                    20

SEQ ID NO: 142          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 142
tgaagaaatt gtatttaagg                                                    20

SEQ ID NO: 143          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 143
gtaacagcac ttattaataa                                                    20

SEQ ID NO: 144          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 144
aataaaacag tgaagcaacc                                                    20

SEQ ID NO: 145          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 145
tacggattgc ttcactgttt                                                    20

SEQ ID NO: 146          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 146
ttcatctata tcgtattttt                                                    20

SEQ ID NO: 147          moltype = DNA  length = 20
FEATURE                 Location/Qualifiers
misc_feature            1..20
                        note = Synthetic Polynucleotide
source                  1..20
```

```
                    mol_type = other DNA
                    organism = synthetic construct
SEQUENCE: 147
ccgttctcat atagctcatc                                                    20

SEQ ID NO: 148      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 148
ctttacctga gattttggca                                                    20

SEQ ID NO: 149      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 149
gctagccatt cctttatctt                                                    20

SEQ ID NO: 150      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 150
tctttaacat taatagccat                                                    20

SEQ ID NO: 151      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 151
tgtttggatt atctttatca                                                    20

SEQ ID NO: 152      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 152
tataaaccac ccaatttgtc                                                    20

SEQ ID NO: 153      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 153
gtttctcctt gtttcatttt                                                    20

SEQ ID NO: 154      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 154
ctgcagtacc ggatttgcca                                                    20

SEQ ID NO: 155      moltype = DNA   length = 20
FEATURE             Location/Qualifiers
misc_feature        1..20
                    note = Synthetic Polynucleotide
```

```
source                  1..20
                        mol_type = other DNA
                        organism = synthetic construct
SEQUENCE: 155
gtttgcataa gatctataaa                                                      20

SEQ ID NO: 156          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 156
tctttatgtg ttttatttac                                                      20

SEQ ID NO: 157          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 157
tgtttggatt atctttatca                                                      20

SEQ ID NO: 158          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 158
gttgcatacc atcagttaat                                                      20

SEQ ID NO: 159          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 159
gatattttct ttggaaataa                                                      20

SEQ ID NO: 160          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 160
ttcttccaaa ctttgttttt                                                      20

SEQ ID NO: 161          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 161
cttttaataa gtgaggtgcg                                                      20

SEQ ID NO: 162          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 162
attgccatta ttttctaatg                                                      20

SEQ ID NO: 163          moltype = DNA  length = 20
FEATURE                 Location/Qualifiers
misc_feature            1..20
```

```
                    note = Synthetic Polynucleotide
source              1..20
                    mol_type = other DNA
                    organism = synthetic construct
SEQUENCE: 163
tagattgaaa ggatctgtac                                                  20

SEQ ID NO: 164      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 164
taatcagtat ttcaccttgt                                                  20

SEQ ID NO: 165      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 165
acctgaatca gctaataata                                                  20

SEQ ID NO: 166      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 166
ttatctaaat ttttgtttga                                                  20

SEQ ID NO: 167      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 167
gagcattata aaatggataa                                                  20

SEQ ID NO: 168      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 168
tggtatatct tcaccaacac                                                  20

SEQ ID NO: 169      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 169
tttttcatgc cttttttcaaa                                                 20

SEQ ID NO: 170      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 170
tactgcctaa ttcgagtgct                                                  20

SEQ ID NO: 171      moltype = DNA   length = 20
FEATURE             Location/Qualifiers
```

```
                        1..20
misc_feature            note = Synthetic Polynucleotide
source                  1..20
                        mol_type = other DNA
                        organism = synthetic construct
SEQUENCE: 171
agcaaagaaa atgttatctg                                                  20

SEQ ID NO: 172          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 172
tctattgctt gttttaagtc                                                  20

SEQ ID NO: 173          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 173
taccatttac cacttcatat                                                  20

SEQ ID NO: 174          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 174
aacgttgtaa ccaccccaag                                                  20

SEQ ID NO: 175          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 175
tcttttgcc aacctttacc                                                   20

SEQ ID NO: 176          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 176
ttttataact tgttttatcg                                                  20

SEQ ID NO: 177          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 177
ctggtgaagt tgtaatctgg                                                  20

SEQ ID NO: 178          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 178
gttgagcaga ggttctttt                                                   20

SEQ ID NO: 179          moltype = DNA  length = 20
```

```
FEATURE                 Location/Qualifiers
misc_feature            1..20
                        note = Synthetic Polynucleotide
source                  1..20
                        mol_type = other DNA
                        organism = synthetic construct
SEQUENCE: 179
tcggttaatt tattatattc                                                    20

SEQ ID NO: 180          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 180
tactcatgcc atacataaat                                                    20

SEQ ID NO: 181          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 181
gacgtcatat gaaggtgtgc                                                    20

SEQ ID NO: 182          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 182
agtgctaata attcacctgt                                                    20

SEQ ID NO: 183          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 183
ggtggatagc agtacctgag                                                    20

SEQ ID NO: 184          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 184
atcatttttc atgttgttat                                                    20

SEQ ID NO: 185          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 185
ctcttttgaa ctttagcatc                                                    20

SEQ ID NO: 186          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 186
ttagttgaat atctttgcca                                                    20
```

```
SEQ ID NO: 187          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 187
tttctttttc tctattaatg                                                20

SEQ ID NO: 188          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 188
gcgattgtat tgctattatc                                                20

SEQ ID NO: 189          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 189
cgattgtgac acgatagcca                                                20

SEQ ID NO: 190          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 190
atgttggagc tttttatcgt                                                20

SEQ ID NO: 191          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 191
ttttcgagtc ccttttttacc                                               20

SEQ ID NO: 192          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 192
ctgcatcatc tttatagcct                                                20

SEQ ID NO: 193          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 193
ttcttttttgt tttaattctt                                               20

SEQ ID NO: 194          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 194
ttaatgggac caacataacc                                                20
```

```
SEQ ID NO: 195           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 195
gatgtgaagt cgcttttttct                                                   20

SEQ ID NO: 196           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 196
gaagtcgctt ttcctagagg                                                    20

SEQ ID NO: 197           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 197
atagttacga ctttctgttt                                                    20

SEQ ID NO: 198           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 198
gttgtaagat gaaattttt                                                     20

SEQ ID NO: 199           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 199
aatcacttaa atattcatcc                                                    20

SEQ ID NO: 200           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 200
aatctcttaa atattcatcc                                                    20

SEQ ID NO: 201           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 201
tttaacggtt ttaagtggaa                                                    20

SEQ ID NO: 202           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 202
```

```
                                  -continued
gtatcatctt gtacccaatt                                            20

SEQ ID NO: 203          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 203
ccatttgttg tttgatatag                                            20

SEQ ID NO: 204          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 204
agaaatactt agttctttag                                            20

SEQ ID NO: 205          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 205
gctttataat cttttttaga                                            20

SEQ ID NO: 206          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 206
tctttggaac gatgcctatc                                            20

SEQ ID NO: 207          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 207
tgctgttcct gtattggcca                                            20

SEQ ID NO: 208          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 208
acattgtttc ggtctaaaat                                            20

SEQ ID NO: 209          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 209
cacgttctga ttttaaattt                                            20

SEQ ID NO: 210          moltype = DNA  length = 20
FEATURE                 Location/Qualifiers
misc_feature            1..20
                        note = Synthetic Polynucleotide
source                  1..20
                        mol_type = other DNA
                        organism = synthetic construct
```

```
SEQUENCE: 210
atgtatgctt tggtctttct                                                     20

SEQ ID NO: 211          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 211
cctggaataa tgacgctatg                                                     20

SEQ ID NO: 212          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 212
aatctaactt ccacatacca                                                     20

SEQ ID NO: 213          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 213
tttaacaaaa ttaaattgaa                                                     20

SEQ ID NO: 214          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 214
cgatcaatgt taccgtagtt                                                     20

SEQ ID NO: 215          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 215
taattttata ttgagcatct                                                     20

SEQ ID NO: 216          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 216
tttttttattt ttagatactt                                                    20

SEQ ID NO: 217          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 217
atgaaaaaaa tttatattag                                                     20

SEQ ID NO: 218          moltype = DNA  length = 20
FEATURE                 Location/Qualifiers
misc_feature            1..20
                        note = Synthetic Polynucleotide
source                  1..20
                        mol_type = other DNA
```

```
                    organism = synthetic construct
SEQUENCE: 218
gtgttctagt tcttttgcta                                               20

SEQ ID NO: 219        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 219
tagttctttt actaattatg                                               20

SEQ ID NO: 220        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 220
aataacttgg ttattcaaag                                               20

SEQ ID NO: 221        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 221
ttattcagag ataacgatat                                               20

SEQ ID NO: 222        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 222
gatattgaga aaacaattag                                               20

SEQ ID NO: 223        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 223
gaaaacaatt aattctattg                                               20

SEQ ID NO: 224        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 224
ttgaaaaagg aaactataac                                               20

SEQ ID NO: 225        moltype = DNA  length = 20
FEATURE               Location/Qualifiers
misc_feature          1..20
                      note = Synthetic Polynucleotide
source                1..20
                      mol_type = other DNA
                      organism = synthetic construct
SEQUENCE: 225
aaactataac aaagtatata                                               20

SEQ ID NO: 226        moltype = DNA  length = 20
FEATURE               Location/Qualifiers
misc_feature          1..20
                      note = Synthetic Polynucleotide
source                1..20
```

```
                    mol_type = other DNA
                    organism = synthetic construct
SEQUENCE: 226
atataaaaat agttcagaaa                                              20

SEQ ID NO: 227      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 227
tagttcagaa gcatctaaac                                              20

SEQ ID NO: 228      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 228
aaactggcat atggagaaga                                              20

SEQ ID NO: 229      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 229
agaagaaatt atagatagga                                              20

SEQ ID NO: 230      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 230
ttgtagatag gaataaaaaa                                              20

SEQ ID NO: 231      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 231
caaagattta agtgtcaata                                              20

SEQ ID NO: 232      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 232
aaaattacta atcatgaaat                                              20

SEQ ID NO: 233      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 233
cataaaacta aaaaaatcgg                                              20

SEQ ID NO: 234      moltype = DNA   length = 20
FEATURE             Location/Qualifiers
misc_feature        1..20
                    note = Synthetic Polynucleotide
```

```
source                    1..20
                          mol_type = other DNA
                          organism = synthetic construct
SEQUENCE: 234
aaactggaaa agataaaaag                                                    20

SEQ ID NO: 235            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 235
agttgatgtt agatataaca                                                    20

SEQ ID NO: 236            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 236
tgatgttaaa tataacatat                                                    20

SEQ ID NO: 237            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 237
atggaaatat acgccgtaat                                                    20

SEQ ID NO: 238            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 238
aaatatggaa ctatacgacg                                                    20

SEQ ID NO: 239            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 239
ttatgaagaa aagcattgga                                                    20

SEQ ID NO: 240            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 240
cacaattaaa ctttatttat                                                    20

SEQ ID NO: 241            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 241
tggaccaggg agtaataata                                                    20

SEQ ID NO: 242            moltype = DNA  length = 20
FEATURE                   Location/Qualifiers
misc_feature              1..20
```

```
                    note = Synthetic Polynucleotide
source              1..20
                    mol_type = other DNA
                    organism = synthetic construct
SEQUENCE: 242
taagcattgg aaattagatt                                                    20

SEQ ID NO: 243      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 243
ggattgaaaa ataggcaaaa                                                    20

SEQ ID NO: 244      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 244
ccagacgtaa tagtacctgg                                                    20

SEQ ID NO: 245      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 245
aaaatggaca gaaaattaat                                                    20

SEQ ID NO: 246      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 246
taaaatcaga acgaggcaaa                                                    20

SEQ ID NO: 247      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 247
aacattaaaa tcagagcgag                                                    20

SEQ ID NO: 248      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 248
ataaagata gaaatggtat                                                     20

SEQ ID NO: 249      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 249
gtatagagtt ggctaaaact                                                    20

SEQ ID NO: 250      moltype = DNA  length = 20
FEATURE             Location/Qualifiers
```

```
misc_feature              1..20
                          note = Synthetic Polynucleotide
source                    1..20
                          mol_type = other DNA
                          organism = synthetic construct
SEQUENCE: 250
tagctaaaac tggaaataca                                                    20

SEQ ID NO: 251            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 251
aatcggtatt gtccctaaca                                                    20

SEQ ID NO: 252            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 252
gaaatacata cgaaatcggt                                                    20

SEQ ID NO: 253            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 253
taaaacaccc aaaaataagt                                                    20

SEQ ID NO: 254            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 254
cccaaagaaa aatatgatga                                                    20

SEQ ID NO: 255            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 255
gacgatattg ctcgtggttt                                                    20

SEQ ID NO: 256            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 256
ctcgtgactt acaaattgat                                                    20

SEQ ID NO: 257            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 257
agctataacc aataaagtta                                                    20

SEQ ID NO: 258            moltype = DNA  length = 20
```

```
FEATURE              Location/Qualifiers
misc_feature         1..20
                     note = Synthetic Polynucleotide
source               1..20
                     mol_type = other DNA
                     organism = synthetic construct
SEQUENCE: 258
aaatggttc agccagattc                                                  20

SEQ ID NO: 259       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 259
aaaatgggta cagccagatt                                                 20

SEQ ID NO: 260       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 260
taccaattaa aaagataaat                                                 20

SEQ ID NO: 261       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 261
agatgaatat atagacaaat                                                 20

SEQ ID NO: 262       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 262
ataaaaagac gaatctatag                                                 20

SEQ ID NO: 263       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 263
aaatcataca atttacaaat                                                 20

SEQ ID NO: 264       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 264
ctataaaaag ccgtgtttat                                                 20

SEQ ID NO: 265       moltype = DNA  length = 20
FEATURE              Location/Qualifiers
misc_feature         1..20
                     note = Synthetic Polynucleotide
source               1..20
                     mol_type = other DNA
                     organism = synthetic construct
SEQUENCE: 265
aaatactgta aaaagtcgtg                                                 20
```

| | | |
|---|---|---|
| SEQ ID NO: 266
FEATURE
misc_feature
source

SEQUENCE: 266
gaacgaagca acagtacacc | moltype = DNA   length = 20
Location/Qualifiers
1..20
note = Synthetic Polynucleotide
1..20
mol_type = other DNA
organism = synthetic construct | 20 |
| SEQ ID NO: 267
FEATURE
misc_feature
source SEQUENCE: 267
tatccattga atgaagcaac | moltype = DNA   length = 20
Location/Qualifiers
1..20
note = Synthetic Polynucleotide
1..20
mol_type = other DNA
organism = synthetic construct | 20 |
| SEQ ID NO: 268
FEATURE
misc_feature
source SEQUENCE: 268
ggttatgtgg gtccaattaa | moltype = DNA   length = 20
Location/Qualifiers
1..20
note = Synthetic Polynucleotide
1..20
mol_type = other DNA
organism = synthetic construct | 20 |
| SEQ ID NO: 269
FEATURE
misc_feature
source SEQUENCE: 269
tatgtgggcc ccattaattc | moltype = DNA   length = 20
Location/Qualifiers
1..20
note = Synthetic Polynucleotide
1..20
mol_type = other DNA
organism = synthetic construct | 20 |
| SEQ ID NO: 270
FEATURE
misc_feature
source SEQUENCE: 270
acgagttaaa aagtaagcaa | moltype = DNA   length = 20
Location/Qualifiers
1..20
note = Synthetic Polynucleotide
1..20
mol_type = other DNA
organism = synthetic construct | 20 |
| SEQ ID NO: 271
FEATURE
misc_feature
source SEQUENCE: 271
taagcaattt ggaaactata | moltype = DNA   length = 20
Location/Qualifiers
1..20
note = Synthetic Polynucleotide
1..20
mol_type = other DNA
organism = synthetic construct | 20 |
| SEQ ID NO: 272
FEATURE
misc_feature
source SEQUENCE: 272
aaactatagc aaaaatactg | moltype = DNA   length = 20
Location/Qualifiers
1..20
note = Synthetic Polynucleotide
1..20
mol_type = other DNA
organism = synthetic construct | 20 |
| SEQ ID NO: 273
FEATURE
misc_feature
source SEQUENCE: 273
ggaaaaaaag gcttagaacg | moltype = DNA   length = 20
Location/Qualifiers
1..20
note = Synthetic Polynucleotide
1..20
mol_type = other DNA
organism = synthetic construct | 20 |

```
SEQ ID NO: 274           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 274
aaaaagggga ttagagcgcc                                                       20

SEQ ID NO: 275           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 275
atgataaaca attgcaaaac                                                       20

SEQ ID NO: 276           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 276
tggttttaag gtatccattg                                                       20

SEQ ID NO: 277           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 277
tttagggtat ccattgctaa                                                       20

SEQ ID NO: 278           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 278
acttatgaca ataaaccttt                                                       20

SEQ ID NO: 279           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 279
acttacgata ataaatcttt                                                       20

SEQ ID NO: 280           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 280
cattattgga gaaaaaggct                                                       20

SEQ ID NO: 281           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 281
```

```
agaaaaaagc taaaaacgga                                                   20

SEQ ID NO: 282          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 282
cggaaaagat cttcatttaa                                                   20

SEQ ID NO: 283          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 283
aacaatagat gctagggtac                                                   20

SEQ ID NO: 284          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 284
gatgctagag tacaagaaag                                                   20

SEQ ID NO: 285          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 285
gtatttataa tcatatgaaa                                                   20

SEQ ID NO: 286          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 286
ataaacatat gaaaatgac                                                    20

SEQ ID NO: 287          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 287
aaaaatgact ttggatctgg                                                   20

SEQ ID NO: 288          moltype =     length =
SEQUENCE: 288
000

SEQ ID NO: 289          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 289
atctggtaca gcattacaac                                                   20

SEQ ID NO: 290          moltype = DNA  length = 20
FEATURE                 Location/Qualifiers
misc_feature            1..20
```

```
                    note = Synthetic Polynucleotide
source              1..20
                    mol_type = other DNA
                    organism = synthetic construct
SEQUENCE: 290
actggagaaa ttttagcttt                                                   20

SEQ ID NO: 291      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 291
caacctaaaa ctggggaaat                                                   20

SEQ ID NO: 292      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 292
gtaccccatc gtacgatgtt                                                   20

SEQ ID NO: 293      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 293
taccccttca tatgatgttt                                                   20

SEQ ID NO: 294      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 294
attcatgaat ggattaagca                                                   20

SEQ ID NO: 295      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 295
tcattaatgg aattagcaat                                                   20

SEQ ID NO: 296      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 296
aatcatgatt atcataaatt                                                   20

SEQ ID NO: 297      moltype = DNA   length = 20
FEATURE             Location/Qualifiers
misc_feature        1..20
                    note = Synthetic Polynucleotide
source              1..20
                    mol_type = other DNA
                    organism = synthetic construct
SEQUENCE: 297
gactaccgta aattaactaa                                                   20

SEQ ID NO: 298      moltype = DNA   length = 20
FEATURE             Location/Qualifiers
```

```
misc_feature              1..20
                          note = Synthetic Polynucleotide
source                    1..20
                          mol_type = other DNA
                          organism = synthetic construct
SEQUENCE: 298
aaaaagagcc tttgctcaac                                              20

SEQ ID NO: 299            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 299
gagccgttac tcaataaatt                                              20

SEQ ID NO: 300            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 300
tcaaatcact acatcaccag                                              20

SEQ ID NO: 301            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 301
acccaaaaaa tattaacatc                                              20

SEQ ID NO: 302            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 302
ctacatcacc gggttcaacc                                              20

SEQ ID NO: 303            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 303
attaacgtct attattgcct                                              20

SEQ ID NO: 304            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 304
tagccttaaa agaaaataaa                                              20

SEQ ID NO: 305            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 305
taaactagac gacaatacta                                              20

SEQ ID NO: 306            moltype = DNA   length = 20
```

```
FEATURE                 Location/Qualifiers
misc_feature            1..20
                        note = Synthetic Polynucleotide
source                  1..20
                        mol_type = other DNA
                        organism = synthetic construct SEQUENCE: 306
caaaaatact aattttgata                                                    20

SEQ ID NO: 307          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 307
ggtaagggtt ggcaaaaaga                                                    20

SEQ ID NO: 308          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 308
ttatggtaaa ggatggcaaa                                                    20

SEQ ID NO: 309          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 309
catgggggaa ttataatatc                                                    20

SEQ ID NO: 310          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 310
gatgtatctt ggggagatta                                                    20

SEQ ID NO: 311          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 311
atttaaagta gtagacggca                                                    20

SEQ ID NO: 312          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 312
taacaagatt taaagtggta                                                    20

SEQ ID NO: 313          moltype = DNA  length = 20
FEATURE                 Location/Qualifiers
misc_feature            1..20
                        note = Synthetic Polynucleotide
source                  1..20
                        mol_type = other DNA
                        organism = synthetic construct SEQUENCE: 313
gatttaaagc aagcaataga                                                    20
```

```
SEQ ID NO: 314           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 314
gacggtaaga tagatttaaa                                                  20

SEQ ID NO: 315           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 315
cagacaacat attttttgcc                                                  20

SEQ ID NO: 316           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 316
ttttttgcac gtattgcatt                                                  20

SEQ ID NO: 317           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 317
tgcattagca ttaggagcca                                                  20

SEQ ID NO: 318           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 318
tagctttagg agctaaaaaa                                                  20

SEQ ID NO: 319           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 319
tttgagcaag gtatgcaaga                                                  20

SEQ ID NO: 320           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 320
aagatttagg tgttggtgaa                                                  20

SEQ ID NO: 321           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 321
gaatcggtga aaatatcccg                                                  20
```

| | | |
|---|---|---|
| SEQ ID NO: 322<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 322<br>tcccgagcga ttacccctttt | | 20 |
| SEQ ID NO: 323<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 323<br>ttatcccttt tataaagcac | | 20 |
| SEQ ID NO: 324<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 324<br>gcacaaattt caaatagtaa | | 20 |
| SEQ ID NO: 325<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 325<br>tcaaatagta atttaaaaaa | | 20 |
| SEQ ID NO: 326<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 326<br>tattattagc agattcagga | | 20 |
| SEQ ID NO: 327<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 327<br>aaataatgac atattactag | | 20 |
| SEQ ID NO: 328<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 328<br>ccaaggcgag atactagtaa | | 20 |
| SEQ ID NO: 329<br>FEATURE<br>misc_feature<br><br>source | moltype = DNA  length = 20<br>Location/Qualifiers<br>1..20<br>note = Synthetic Polynucleotide<br>1..20<br>mol_type = other DNA<br>organism = synthetic construct | |
| SEQUENCE: 329 | | |

```
tactagtaaa tcctatacaa                                                     20

SEQ ID NO: 330          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 330
atacaaattt tatcaatata                                                     20

SEQ ID NO: 331          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 331
aattttgtca atctacagtg                                                     20

SEQ ID NO: 332          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 332
ctttagaaaa taacggaaat                                                     20

SEQ ID NO: 333          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 333
aaataacggg aatatacaaa                                                     20

SEQ ID NO: 334          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 334
aaatcctcat gttttacgta                                                     20

SEQ ID NO: 335          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 335
ttacgtgaaa caaagtctca                                                     20

SEQ ID NO: 336          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 336
aaatctcaaa tatggaaaaa                                                     20

SEQ ID NO: 337          moltype = DNA   length = 20
FEATURE                 Location/Qualifiers
misc_feature            1..20
                        note = Synthetic Polynucleotide
source                  1..20
                        mol_type = other DNA
                        organism = synthetic construct
```

```
SEQUENCE: 337
ttggaaaaag tctattatat                                                     20

SEQ ID NO: 338          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 338
ttatacctaa aaaagacata                                                     20

SEQ ID NO: 339          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 339
attaactaat ggtatggaac                                                     20

SEQ ID NO: 340          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 340
acgtgtagtg actaaaacac                                                     20

SEQ ID NO: 341          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 341
gttaataaaa cacataggga                                                     20

SEQ ID NO: 342          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 342
tagagatgat atctacaaaa                                                     20

SEQ ID NO: 343          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 343
tatacaaaaa ttatgcccga                                                     20

SEQ ID NO: 344          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 344
cccgaattat aggtaaatct                                                     20

SEQ ID NO: 345          moltype = DNA  length = 20
FEATURE                 Location/Qualifiers
misc_feature            1..20
                        note = Synthetic Polynucleotide
source                  1..20
                        mol_type = other DNA
```

-continued

```
                            organism = synthetic construct
SEQUENCE: 345
tggtaaatct ggcacagcag                                              20

SEQ ID NO: 346          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 346
aaaatgaatc aaggggaaac                                              20

SEQ ID NO: 347          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 347
tgaaacaagg tgaaaccgga                                              20

SEQ ID NO: 348          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 348
gacaaatagg ttggtttgtt                                              20

SEQ ID NO: 349          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 349
taataaaaat aatcctaata                                              20

SEQ ID NO: 350          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 350
atgataaaca taaccccaat                                              20

SEQ ID NO: 351          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 351
atggcgatta atgttaaaga                                              20

SEQ ID NO: 352          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 352
tatgctaatg gcaattaatg                                              20

SEQ ID NO: 353          moltype = DNA  length = 20
FEATURE                 Location/Qualifiers
misc_feature            1..20
                        note = Synthetic Polynucleotide
source                  1..20
```

```
                          mol_type = other DNA
                          organism = synthetic construct
SEQUENCE: 353
aaaataaagg gatggccagc                                                  20

SEQ ID NO: 354            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 354
ggctagctat aatgctgcta                                                  20

SEQ ID NO: 355            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 355
tgctactata tctggaaaag                                                  20

SEQ ID NO: 356            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 356
gatgatttgt atgataatgg                                                  20

SEQ ID NO: 357            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 357
atgatttata tgattatgga                                                  20

SEQ ID NO: 358            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 358
ctcaatttga tatagatcag                                                  20

SEQ ID NO: 359            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 359
ctaaatttga catagatgag                                                  20

SEQ ID NO: 360            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 360
gaagcaatag aatcatcaga                                                  20

SEQ ID NO: 361            moltype = DNA   length = 20
FEATURE                   Location/Qualifiers
misc_feature              1..20
                          note = Synthetic Polynucleotide
```

```
source                    1..20
                          mol_type = other DNA
                          organism = synthetic construct
SEQUENCE: 361
aatgaaatat tattagcaga                                                   20

SEQ ID NO: 362            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 362
atcaccaggt tcaacccaaa                                                   20

SEQ ID NO: 363            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 363
attttacgat cctgaatgtt                                                   20

SEQ ID NO: 364            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 364
ctttaacgcc taaactatta                                                   20

SEQ ID NO: 365            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 365
ttttatcgga cgttcagtca                                                   20

SEQ ID NO: 366            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 366
acttcaccat tatcgctttt                                                   20

SEQ ID NO: 367            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 367
tataactgct atctttataa                                                   20

SEQ ID NO: 368            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 368
tttgaaattt ttatcttcaa                                                   20

SEQ ID NO: 369            moltype = DNA  length = 20
FEATURE                   Location/Qualifiers
misc_feature              1..20
```

```
                    note = Synthetic Polynucleotide
source              1..20
                    mol_type = other DNA
                    organism = synthetic construct
SEQUENCE: 369
tcaatagtat tattaatttc                                                    20

SEQ ID NO: 370      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 370
cttttgaagc ataaaaatat                                                    20

SEQ ID NO: 371      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 371
aaacccgaca actacaacta                                                    20

SEQ ID NO: 372      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 372
ataagtggaa caatttttat                                                    20

SEQ ID NO: 373      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 373
atgaatagaa taaaagttgc                                                    20

SEQ ID NO: 374      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 374
tgtttgggggg ttgctcagag                                                   20

SEQ ID NO: 375      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 375
tgacgtatcg gtaaaatctg                                                    20

SEQ ID NO: 376      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 376
gagatagccg ctaacattaa                                                    20

SEQ ID NO: 377      moltype = DNA  length = 20
FEATURE             Location/Qualifiers
```

```
misc_feature              1..20
                          note = Synthetic Polynucleotide
source                    1..20
                          mol_type = other DNA
                          organism = synthetic construct
SEQUENCE: 377
aaaaatacga gccgttatac                                                    20

SEQ ID NO: 378            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 378
aattacgaaa tctggtgtat                                                    20

SEQ ID NO: 379            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 379
atgtgcgaaa aaccttgcgc                                                    20

SEQ ID NO: 380            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 380
gggaaaacga caattgctat                                                    20

SEQ ID NO: 381            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 381
tgtactctcg ccggataaaa                                                    20

SEQ ID NO: 382            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 382
cacggattac ttgttaaaaa                                                    20

SEQ ID NO: 383            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 383
atgaatatga aatcaaccat                                                    20

SEQ ID NO: 384            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 384
tgtagcattt tcagctttgc                                                    20

SEQ ID NO: 385            moltype = DNA  length = 20
```

```
FEATURE              Location/Qualifiers
misc_feature         1..20
                     note = Synthetic Polynucleotide
source               1..20
                     mol_type = other DNA
                     organism = synthetic construct
SEQUENCE: 385
aagtcaggtg aagatggatc                                                   20

SEQ ID NO: 386       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 386
aaggtctgtt tgaattgtcc                                                   20

SEQ ID NO: 387       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 387
ccctttgta ggctgcgata                                                    20

SEQ ID NO: 388       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 388
agctcagcaa tttgtatgga                                                   20

SEQ ID NO: 389       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 389
cgttgacata catcgttgcg                                                   20

SEQ ID NO: 390       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 390
tgctgggata gctactcccg                                                   20

SEQ ID NO: 391       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 391
tgggttatta ataaagatga                                                   20

SEQ ID NO: 392       moltype = DNA   length = 20
FEATURE              Location/Qualifiers
misc_feature         1..20
                     note = Synthetic Polynucleotide
source               1..20
                     mol_type = other DNA
                     organism = synthetic construct
SEQUENCE: 392
tgtttttgtt aagccggcgc                                                   20
```

| | |
|---|---|
| SEQ ID NO: 393<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 393
ggctcatcct tcggtgtgaa                                               20

| | |
|---|---|
| SEQ ID NO: 394<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 394
tcaatagcgc ggacgaattg                                               20

| | |
|---|---|
| SEQ ID NO: 395<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 395
cgcaattgaa tcggcaagac                                               20

| | |
|---|---|
| SEQ ID NO: 396<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 396
gacagcaaaa tcttaattga                                               20

| | |
|---|---|
| SEQ ID NO: 397<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 397
ctgtttcggg ctgtgaggtc                                               20

| | |
|---|---|
| SEQ ID NO: 398<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 398
tgcggtattg ggaaacagtg                                               20

| | |
|---|---|
| SEQ ID NO: 399<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 399
ttagctgttg gcgaggtgga                                               20

| | |
|---|---|
| SEQ ID NO: 400<br>FEATURE<br>misc_feature<br>source | moltype = DNA   length = 20<br>Location/Qualifiers<br>1..20<br>note = Synthetic Polynucleotide<br>1..20<br>mol_type = other DNA<br>organism = synthetic construct |

SEQUENCE: 400
tcaggctgca gtacggaatc                                               20

```
SEQ ID NO: 401           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 401
tattcatcag gaagtcgagc                                              20

SEQ ID NO: 402           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 402
aaaggctctg aaaacgcagt                                              20

SEQ ID NO: 403           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 403
ccgttcccgc agacctttca                                              20

SEQ ID NO: 404           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 404
ggagcgagga cggatacagg                                              20

SEQ ID NO: 405           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 405
gcaaaaaaaa tatataaagc                                              20

SEQ ID NO: 406           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 406
gctgtagagg tctagcccgt                                              20

SEQ ID NO: 407           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 407
tatgttttta caagataacg                                              20

SEQ ID NO: 408           moltype = DNA  length = 20
FEATURE                  Location/Qualifiers
misc_feature             1..20
                         note = Synthetic Polynucleotide
source                   1..20
                         mol_type = other DNA
                         organism = synthetic construct
SEQUENCE: 408
```

```
attgtactga acgaagtcaa                                              20

SEQ ID NO: 409         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 409
tgcccggttt cacgtcatac                                              20

SEQ ID NO: 410         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 410
ttatccccgt atgatggccg                                              20

SEQ ID NO: 411         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 411
ggtattgcac ttcccgaact                                              20

SEQ ID NO: 412         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 412
accgcttgat cgtattagcg                                              20

SEQ ID NO: 413         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 413
ggctgtgata ttcaaagctc                                              20

SEQ ID NO: 414         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 414
ggctgcgata ttcaaagctc                                              20

SEQ ID NO: 415         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 415
aaaaatctta attgagcaag                                              20

SEQ ID NO: 416         moltype = DNA  length = 20
FEATURE                Location/Qualifiers
misc_feature           1..20
                       note = Synthetic Polynucleotide
source                 1..20
                       mol_type = other DNA
                       organism = synthetic construct
```

```
SEQUENCE: 416
tgattacatt ggcgttaaag                                                    20

SEQ ID NO: 417          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 417
tgattacatt ggcgataaag                                                    20

SEQ ID NO: 418          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 418
atttcggtct gtgaggtcgg                                                    20

SEQ ID NO: 419          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 419
cgagccggaa aaaggctctg                                                    20

SEQ ID NO: 420          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 420
atgaatagaa taaaagtcgc                                                    20

SEQ ID NO: 421          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 421
atgaataaaa taaaagtcgc                                                    20

SEQ ID NO: 422          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 422
gtcgcaatca tcttcggcgg                                                    20

SEQ ID NO: 423          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 423
gtcgcaatta tcttcggcgg                                                    20

SEQ ID NO: 424          moltype = DNA  length = 20
FEATURE                 Location/Qualifiers
misc_feature            1..20
                        note = Synthetic Polynucleotide
source                  1..20
                        mol_type = other DNA
```

-continued

```
                        organism = synthetic construct
SEQUENCE: 424
gtcgcaacta tcttcggcgg                                                    20

SEQ ID NO: 425          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 425
tcttcggcgg ttgctcggag                                                    20

SEQ ID NO: 426          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 426
tgatgtgtcg gtaaaatccg                                                    20

SEQ ID NO: 427          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 427
gaaattgctg cgaacattga                                                    20

SEQ ID NO: 428          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 428
gaacattgat acggaaaaat                                                    20

SEQ ID NO: 429          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 429
gaacattaat actgaaaaat                                                    20

SEQ ID NO: 430          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 430
aaaaattcga tccgcactac                                                    20

SEQ ID NO: 431          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 431
aattacaaaa aacggtgtat                                                    20

SEQ ID NO: 432          moltype = DNA   length = 20
FEATURE                 Location/Qualifiers
misc_feature            1..20
                        note = Synthetic Polynucleotide
source                  1..20
```

```
                        mol_type = other DNA
                        organism = synthetic construct
SEQUENCE: 432
aattacaaaa aacggcgtat                                                20

SEQ ID NO: 433          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 433
ctatgcaaga agccatgtac                                                20

SEQ ID NO: 434          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 434
gggaagccga cagtctcccc                                                20

SEQ ID NO: 435          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 435
gggaagccga tagtctcccc                                                20

SEQ ID NO: 436          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 436
atactctccc cggataggaa                                                20

SEQ ID NO: 437          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 437
atattctccc cggataggaa                                                20

SEQ ID NO: 438          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 438
gcatgggctg cttgtcatga                                                20

SEQ ID NO: 439          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 439
gcatggtctg cttgtcatga                                                20

SEQ ID NO: 440          moltype = DNA   length = 20
FEATURE                 Location/Qualifiers
misc_feature            1..20
                        note = Synthetic Polynucleotide
```

```
source                  1..20
                        mol_type = other DNA
                        organism = synthetic construct
SEQUENCE: 440
aaagcgaata cgaaacacgg                                                   20

SEQ ID NO: 441          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 441
aaagagaata cgaaactcgg                                                   20

SEQ ID NO: 442          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 442
gcgtattgat gtggctttcc                                                   20

SEQ ID NO: 443          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 443
gcgtattgac gtggctttcc                                                   20

SEQ ID NO: 444          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 444
ggctttcccg gttttgcatg                                                   20

SEQ ID NO: 445          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 445
aaatgcgggg aggatggtgc                                                   20

SEQ ID NO: 446          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 446
agggctgtt tgtattgtct                                                    20

SEQ ID NO: 447          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 447
agggtctgtt tgaattgtct                                                   20

SEQ ID NO: 448          moltype = DNA   length = 20
FEATURE                 Location/Qualifiers
misc_feature            1..20
```

```
                    note = Synthetic Polynucleotide
source              1..20
                    mol_type = other DNA
                    organism = synthetic construct
SEQUENCE: 448
ctatgtgggc tgtgatattc                                               20

SEQ ID NO: 449      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 449
ctatgtaggc tgcgatattc                                               20

SEQ ID NO: 450      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 450
tccgcagctt gcatggacaa                                               20

SEQ ID NO: 451      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 451
tggcctacat tcttacaaaa                                               20

SEQ ID NO: 452      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 452
gggcatcgcc gttcccgaat                                               20

SEQ ID NO: 453      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 453
gggcatcgcc gtccccgaat                                               20

SEQ ID NO: 454      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 454
ttcaaatgat tgataaaggt                                               20

SEQ ID NO: 455      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 455
ttcaaattat tgataaaggt                                               20

SEQ ID NO: 456      moltype = DNA  length = 20
FEATURE             Location/Qualifiers
```

```
misc_feature            1..20
                        note = Synthetic Polynucleotide
source                  1..20
                        mol_type = other DNA
                        organism = synthetic construct
SEQUENCE: 456
ttcaaatgat tgaaaaaggt                                                    20

SEQ ID NO: 457          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 457
caagccggag gcgggtgcgc                                                    20

SEQ ID NO: 458          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 458
caaaccggag gcgaggacgc                                                    20

SEQ ID NO: 459          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 459
aggcgggtgc gcttacctac                                                    20

SEQ ID NO: 460          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 460
ctttgtgaag ccggcacggt                                                    20

SEQ ID NO: 461          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 461
tcgtcctttg gcgtaaccaa                                                    20

SEQ ID NO: 462          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 462
gatagaagcg gcaggacaat                                                    20

SEQ ID NO: 463          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 463
gatagaagca gcaggacaat                                                    20

SEQ ID NO: 464          moltype = DNA  length = 20
```

```
                              -continued

FEATURE             Location/Qualifiers
misc_feature        1..20
                    note = Synthetic Polynucleotide
source              1..20
                    mol_type = other DNA
                    organism = synthetic construct
SEQUENCE: 464
gaaaaatctt aattgagcaa                                               20

SEQ ID NO: 465      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 465
ctgtgaggtc gggtgtgcgg                                               20

SEQ ID NO: 466      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 466
ctgtgaggtc ggctgcgcgg                                               20

SEQ ID NO: 467      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 467
ggtcatggga aacgaggatg                                               20

SEQ ID NO: 468      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 468
ggtcatgggg aacgaggatg                                               20

SEQ ID NO: 469      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 469
attgtcggcg aagtggatca                                               20

SEQ ID NO: 470      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 470
ccggctgagc cacggtatct                                               20

SEQ ID NO: 471      moltype = DNA  length = 20
FEATURE             Location/Qualifiers
misc_feature        1..20
                    note = Synthetic Polynucleotide
source              1..20
                    mol_type = other DNA
                    organism = synthetic construct
SEQUENCE: 471
ccggttgagc cacggtatct                                               20
```

```
SEQ ID NO: 472         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 472
ccatcaggaa aacgagccgg                                                    20

SEQ ID NO: 473         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 473
ggctcagaaa atgcgatgat                                                    20

SEQ ID NO: 474         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 474
ggctcagaga atgcgatgat                                                    20

SEQ ID NO: 475         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 475
attacagttc ccgcagacat                                                    20

SEQ ID NO: 476         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 476
attatcgttc cagcagacat                                                    20

SEQ ID NO: 477         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 477
atcacgcttc ctgcactgat                                                    20

SEQ ID NO: 478         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 478
atcacgcttc ccgcactaat                                                    20

SEQ ID NO: 479         moltype = DNA   length = 20
FEATURE                Location/Qualifiers
misc_feature           1..20
                       note = Synthetic Polynucleotide
source                 1..20
                       mol_type = other DNA
                       organism = synthetic construct
SEQUENCE: 479
acattccggt cgaggaacga                                                    20
```

```
SEQ ID NO: 480            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 480
atcgggtgca agagacggca                                                     20

SEQ ID NO: 481            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 481
atcgggtgca agaaacggca                                                     20

SEQ ID NO: 482            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 482
atcgggtgca ggaaacggca                                                     20

SEQ ID NO: 483            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 483
aagaaagtat atcgggtgct                                                     20

SEQ ID NO: 484            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 484
gcagagggct tgcccgtgtt                                                     20

SEQ ID NO: 485            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 485
gcagagggct tgctcgtgtt                                                     20

SEQ ID NO: 486            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 486
tttttttgcag gaggatggcg                                                    20

SEQ ID NO: 487            moltype = DNA  length = 20
FEATURE                   Location/Qualifiers
misc_feature              1..20
                          note = Synthetic Polynucleotide
source                    1..20
                          mol_type = other DNA
                          organism = synthetic construct
SEQUENCE: 487
```

```
gttctaaatg aggtcaatac                                               20

SEQ ID NO: 488          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 488
gttctaaacg aggtcaatac                                               20

SEQ ID NO: 489          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 489
caataccatg cccggtttta                                               20

SEQ ID NO: 490          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 490
caataccatg ccaggtttta                                               20

SEQ ID NO: 491          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 491
tacccacgta tggtggccgc                                               20

SEQ ID NO: 492          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 492
tatccacgca tggcggctgc                                               20

SEQ ID NO: 493          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 493
tacccacgta tgatggccgc                                               20

SEQ ID NO: 494          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 494
ggtatcagta ttcagtagtc                                               20

SEQ ID NO: 495          moltype = DNA  length = 20
FEATURE                 Location/Qualifiers
misc_feature            1..20
                        note = Synthetic Polynucleotide
source                  1..20
                        mol_type = other DNA
                        organism = synthetic construct
```

```
SEQUENCE: 495
agtattcagt agtcagaggt                                                    20

SEQ ID NO: 496         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 496
cagtagtcag aggtgaaatt                                                    20

SEQ ID NO: 497         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 497
cagaatgaaa agtgcttaac                                                    20

SEQ ID NO: 498         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 498
tgcatttttt cttacacatg                                                    20

SEQ ID NO: 499         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 499
ggtaggcctt ctatatgggg                                                    20

SEQ ID NO: 500         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 500
taatgtcaac cgattattta                                                    20

SEQ ID NO: 501         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 501
ggccggtcca tctttctgat                                                    20

SEQ ID NO: 502         moltype = DNA  length = 20
FEATURE                Location/Qualifiers
misc_feature           1..20
                       note = Synthetic Polynucleotide
source                 1..20
                       mol_type = other DNA
                       organism = synthetic construct
SEQUENCE: 502
tccatctttc tgatgcgtac                                                    20

SEQ ID NO: 503         moltype = DNA  length = 20
FEATURE                Location/Qualifiers
misc_feature           1..20
                       note = Synthetic Polynucleotide
source                 1..20
                       mol_type = other DNA
```

```
                        organism = synthetic construct
SEQUENCE: 503
tttctgatgc gtactggacc                                                   20

SEQ ID NO: 504          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 504
ctgatttgct taattgcacc                                                   20

SEQ ID NO: 505          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 505
acatgtgttt tttattgaac                                                   20

SEQ ID NO: 506          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 506
aaatttcttt ggtggcggga                                                   20

SEQ ID NO: 507          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 507
gcaatcctac cgccagaggt                                                   20

SEQ ID NO: 508          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 508
tataactaaa ccaaactttt                                                   20

SEQ ID NO: 509          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 509
tatttacagt caaacttgat                                                   20

SEQ ID NO: 510          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 510
ttattattac aatagtcaaa                                                   20

SEQ ID NO: 511          moltype = DNA  length = 20
FEATURE                 Location/Qualifiers
misc_feature            1..20
                        note = Synthetic Polynucleotide
source                  1..20
```

```
                        mol_type = other DNA
                        organism = synthetic construct
SEQUENCE: 511
gggttttgga gggaggtcca                                                     20

SEQ ID NO: 512          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 512
gggaggtcca cctcacggtg                                                     20

SEQ ID NO: 513          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 513
cctcacggtg agtacttcca                                                     20

SEQ ID NO: 514          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 514
gtacttccat atccaagacc                                                     20

SEQ ID NO: 515          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 515
tatccaagac ctttcctctg                                                     20

SEQ ID NO: 516          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 516
ctttcctctg cttcctcgca                                                     20

SEQ ID NO: 517          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 517
tgatattttg catacacact                                                     20

SEQ ID NO: 518          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 518
tgatttggat tttaaaacta                                                     20

SEQ ID NO: 519          moltype = DNA   length = 20
FEATURE                 Location/Qualifiers
misc_feature            1..20
                        note = Synthetic Polynucleotide
```

```
source                  1..20
                        mol_type = other DNA
                        organism = synthetic construct
SEQUENCE: 519
aacccaacgt taagttcaac                                                   20

SEQ ID NO: 520          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 520
ctaaaacaaa aacataaaac                                                   20

SEQ ID NO: 521          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 521
tcctcctcct cttagcaata                                                   20

SEQ ID NO: 522          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 522
cttagcaata agaggaggac                                                   20

SEQ ID NO: 523          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 523
agaggaggac tgttactttg                                                   20

SEQ ID NO: 524          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 524
aaaaatacat tacacattgt                                                   20

SEQ ID NO: 525          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 525
tgtttttgcg aacaaaaaaa                                                   20

SEQ ID NO: 526          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 526
aaataaattt ttttattcga                                                   20

SEQ ID NO: 527          moltype = DNA  length = 20
FEATURE                 Location/Qualifiers
misc_feature            1..20
```

```
                          note = Synthetic Polynucleotide
source                    1..20
                          mol_type = other DNA
                          organism = synthetic construct
SEQUENCE: 527
ttcgaatttc ttaatatcaa                                                         20

SEQ ID NO: 528            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 528
ctttgggtct ggttggccgg                                                         20

SEQ ID NO: 529            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 529
ccggtccgat tttatgtcgc                                                         20

SEQ ID NO: 530            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 530
tcgcgcactg gttttcaacc                                                         20

SEQ ID NO: 531            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 531
aaccggatct ttccttctgg                                                         20

SEQ ID NO: 532            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 532
ctggctaacc tgtactcctt                                                         20

SEQ ID NO: 533            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 533
ccttgtgggt gcaggcgaac                                                         20

SEQ ID NO: 534            moltype = DNA   length = 20
FEATURE                   Location/Qualifiers
misc_feature              1..20
                          note = Synthetic Polynucleotide
source                    1..20
                          mol_type = other DNA
                          organism = synthetic construct
SEQUENCE: 534
agcaggcgaa agctcgaata                                                         20

SEQ ID NO: 535            moltype = DNA   length = 20
FEATURE                   Location/Qualifiers
```

```
misc_feature               1..20
                           note = Synthetic Polynucleotide
source                     1..20
                           mol_type = other DNA
                           organism = synthetic construct
SEQUENCE: 535
gatcgtctga acaaggcctg                                                    20

SEQ ID NO: 536             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 536
gccagttctt gattctctgc                                                    20

SEQ ID NO: 537             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 537
agttttctat ttctcatcct                                                    20

SEQ ID NO: 538             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 538
aacaatattt tgtattatga                                                    20

SEQ ID NO: 539             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 539
ctattatact ataaaattta                                                    20

SEQ ID NO: 540             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 540
tggctaacca ttcgcccttg                                                    20

SEQ ID NO: 541             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 541
gaaattctta gatttactga                                                    20

SEQ ID NO: 542             moltype = DNA  length = 20
FEATURE                    Location/Qualifiers
misc_feature               1..20
                           note = Synthetic Polynucleotide
source                     1..20
                           mol_type = other DNA
                           organism = synthetic construct
SEQUENCE: 542
ttaattattt ttacagttag                                                    20

SEQ ID NO: 543             moltype = DNA  length = 20
```

```
FEATURE                 Location/Qualifiers
misc_feature            1..20
                        note = Synthetic Polynucleotide
source                  1..20
                        mol_type = other DNA
                        organism = synthetic construct
SEQUENCE: 543
atttttacag ttagtcaaat                                                    20

SEQ ID NO: 544          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 544
acagttagtc aaattttgaa                                                    20

SEQ ID NO: 545          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 545
ttcgacgcat ctgagggtc                                                     20

SEQ ID NO: 546          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 546
ggtgcgtact ctgagggtgc                                                    20

SEQ ID NO: 547          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 547
gcgccttgcg gcaagccaga                                                    20

SEQ ID NO: 548          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 548
aacaacaata caactttgtg                                                    20

SEQ ID NO: 549          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 549
tgtgtctgaa caataacttc                                                    20

SEQ ID NO: 550          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 550
cttcaagtac cgatcatcaa                                                    20
```

```
SEQ ID NO: 551          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 551
catcaaattg ttaaaacaaa                                             20

SEQ ID NO: 552          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 552
agtattcttt ttgccagcgc                                             20

SEQ ID NO: 553          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 553
ttaattgcgc ggcgaaaaaa                                             20

SEQ ID NO: 554          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 554
ccttacacac agtgttttt                                              20

SEQ ID NO: 555          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 555
gttattacaa gaactttgc                                              20

SEQ ID NO: 556          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 556
tttggtctgg actagaaata                                             20

SEQ ID NO: 557          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 557
gtttgggcca gaggtttact                                             20

SEQ ID NO: 558          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 558
gaactaaact tcaatattta                                             20
```

```
SEQ ID NO: 559          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 559
tattgaattg ttacttattt                                                        20

SEQ ID NO: 560          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 560
aattgtcaat ttgttgatta                                                        20

SEQ ID NO: 561          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 561
aattcaaaaa atcttcaaaa                                                        20

SEQ ID NO: 562          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 562
ctgtgattta aacttctttc                                                        20

SEQ ID NO: 563          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 563
ttacaccgcg tgagcgcaca                                                        20

SEQ ID NO: 564          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 564
acaacaccta aacacgaata                                                        20

SEQ ID NO: 565          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 565
accatgtcac ccagagaaaa                                                        20

SEQ ID NO: 566          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 566
```
aaatctcaaa cgagaagaaa                                                    20

SEQ ID NO: 567          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 567
tgtgatttta acatctttac                                                    20

SEQ ID NO: 568          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 568
acactgcgtg agcgcacaac                                                    20

SEQ ID NO: 569          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 569
acaacaccta aacatgaata                                                    20

SEQ ID NO: 570          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 570
tacttactag tcactaagaa                                                    20

SEQ ID NO: 571          moltype = DNA   length = 20
FEATURE                 Location/Qualifiers
misc_feature            1..20
                        note = Synthetic Polynucleotide
source                  1..20
                        mol_type = other DNA
                        organism = synthetic construct
SEQUENCE: 571
gaaaaatcta aagaaataa                                                     20

SEQ ID NO: 572          moltype = DNA   length = 34
FEATURE                 Location/Qualifiers
misc_feature            1..34
                        note = Synthetic Polynucleotide
source                  1..34
                        mol_type = other DNA
                        organism = synthetic construct
SEQUENCE: 572
ccccccctc agttatcgtt tatttgatag tacc                                     34

SEQ ID NO: 573          moltype = DNA   length = 34
FEATURE                 Location/Qualifiers
misc_feature            1..34
                        note = Synthetic Polynucleotide
source                  1..34
                        mol_type = other DNA
                        organism = synthetic construct
SEQUENCE: 573
ccccccctc agttatcgtt tatttgatag ttcc                                     34

SEQ ID NO: 574          moltype = DNA   length = 28
FEATURE                 Location/Qualifiers
misc_feature            1..28
                        note = Synthetic Polynucleotide
source                  1..28
                        mol_type = other DNA
                        organism = synthetic construct

```
SEQUENCE: 574
cccttcccag agtttgatca tggctcag                                       28

SEQ ID NO: 575         moltype = DNA  length = 27
FEATURE                Location/Qualifiers
misc_feature           1..27
                       note = Synthetic Polynucleotide
source                 1..27
                       mol_type = other DNA
                       organism = synthetic construct
SEQUENCE: 575
cccttccaga gtttgatcct ggctcag                                        27

SEQ ID NO: 576         moltype = DNA  length = 25
FEATURE                Location/Qualifiers
misc_feature           1..25
                       note = Synthetic Polynucleotide
source                 1..25
                       mol_type = other DNA
                       organism = synthetic construct
SEQUENCE: 576
cccccggtt accttgttac gactt                                           25

SEQ ID NO: 577         moltype = DNA  length = 24
FEATURE                Location/Qualifiers
misc_feature           1..24
                       note = Synthetic Polynucleotide
source                 1..24
                       mol_type = other DNA
                       organism = synthetic construct
SEQUENCE: 577
cccccggcta ccttgttacg actt                                           24

SEQ ID NO: 578         moltype = DNA  length = 27
FEATURE                Location/Qualifiers
misc_feature           1..27
                       note = Synthetic Polynucleotide
source                 1..27
                       mol_type = other DNA
                       organism = synthetic construct
SEQUENCE: 578
cccttccctg atgactcgtg cctacta                                        27

SEQ ID NO: 579         moltype = DNA  length = 28
FEATURE                Location/Qualifiers
misc_feature           1..28
                       note = Synthetic Polynucleotide
source                 1..28
                       mol_type = other DNA
                       organism = synthetic construct
SEQUENCE: 579
ccctctccct gatgacttgc gcttacta                                       28

SEQ ID NO: 580         moltype = DNA  length = 21
FEATURE                Location/Qualifiers
misc_feature           1..21
                       note = Synthetic Polynucleotide
source                 1..21
                       mol_type = other DNA
                       organism = synthetic construct
SEQUENCE: 580
tgttgcaaga atacggactc a                                              21

SEQ ID NO: 581         moltype = DNA  length = 18
FEATURE                Location/Qualifiers
misc_feature           1..18
                       note = Synthetic Polynucleotide
source                 1..18
                       mol_type = other DNA
                       organism = synthetic construct
SEQUENCE: 581
cttcacagag ccaccgta                                                  18

SEQ ID NO: 582         moltype = DNA  length = 20
FEATURE                Location/Qualifiers
misc_feature           1..20
                       note = Synthetic Polynucleotide
source                 1..20
                       mol_type = other DNA
```

```
                        organism = synthetic construct
SEQUENCE: 582
cggctacctt gttacgactt                                                    20

SEQ ID NO: 583          moltype = DNA  length = 19
FEATURE                 Location/Qualifiers
misc_feature            1..19
                        note = Synthetic Polynucleotide
source                  1..19
                        mol_type = other DNA
                        organism = synthetic construct
SEQUENCE: 583
gagtttgatc ctggctcag                                                     19

SEQ ID NO: 584          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 584
ggctgcgata ttcaaagctc                                                    20

SEQ ID NO: 585          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 585
ggctgtgata ttcaaagctc                                                    20

SEQ ID NO: 586          moltype = DNA  length = 16
FEATURE                 Location/Qualifiers
misc_feature            1..16
                        note = Synthetic Polynucleotide
source                  1..16
                        mol_type = other DNA
                        organism = synthetic construct
SEQUENCE: 586
gccttttcc ggctcg                                                         16

SEQ ID NO: 587          moltype = DNA  length = 20
FEATURE                 Location/Qualifiers
misc_feature            1..20
                        note = Synthetic Polynucleotide
source                  1..20
                        mol_type = other DNA
                        organism = synthetic construct
SEQUENCE: 587
acttgttgag cagaggttct                                                    20

SEQ ID NO: 588          moltype = DNA  length = 21
FEATURE                 Location/Qualifiers
misc_feature            1..21
                        note = Synthetic Polynucleotide
source                  1..21
                        mol_type = other DNA
                        organism = synthetic construct
SEQUENCE: 588
gtaacattga tcgcaacgtt c                                                  21
```